United States Patent [19]

Imanaka et al.

[11] Patent Number: 5,754,843
[45] Date of Patent: May 19, 1998

[54] DATA RETRIEVAL APPARATUS, EVALUATION ENTRY APPARATUS AND SENSIBILITY ENTRY APPARATUS

[75] Inventors: Takeshi Imanaka, Nara; Atsushi Tanaka, Neyagawa; Satoshi Matsuura, Osaka; Tetsuji Abe, Neyagawa; Masayuki Mukai, Toyonaka, all of Japan

[73] Assignee: Matsushita Electric Industrial Co. Ltd., Osaka, Japan

[21] Appl. No.: 668,000

[22] Filed: Jun. 19, 1996

[30] Foreign Application Priority Data

Jun. 20, 1995 [JP] Japan ................................. 7-153468

[51] Int. Cl.[6] ............................................. G06F 17/30
[52] U.S. Cl. ................................. 395/605; 395/601
[58] Field of Search ......................... 395/601, 602, 395/603, 604, 605, 606, 607, 608, 609, 610, 611, 612, 613, 614, 615, 616, 617, 618, 619, 620

[56] References Cited

U.S. PATENT DOCUMENTS

| 5,379,419 | 1/1995 | Heffernan et al. | 395/604 |
| 5,471,677 | 11/1995 | Imanaka | 395/605 |
| 5,506,986 | 4/1996 | Healy | 395/620 |
| 5,551,027 | 8/1996 | Choy et al. | 395/617 |
| 5,659,742 | 8/1997 | Beattie et al. | 395/615 |

FOREIGN PATENT DOCUMENTS

44 40 419  5/1996  Germany.

OTHER PUBLICATIONS

European Search Report dated Oct. 21, 1996, Application No. EP 96109898.

Hartmut Wittig et al., "Intelligent Media Agents in Interactive Television Systems," Proceedings, International Conference on Multimedia Computing and Systems, Wash., D.C. (1995), IEEE Computer Society Press (pp. 182–189).

Fusako Hirabayashi et al., "Information Retrieval Using Desired Impression Factors," IEICE Transactions on Fundamentals of Electronics, Communications and Computer Sciences, E75–A, No. 2, (1992), Tokyo, JP (pp. 189–195).

Beerud Sheth et al., "Evolving Agents for Personalized Information Filtering," Proceedings, Ninth Conference on Artificial Intelligence for Applications, (1993), IEEE Computer Society Press (pp. 345–352).

E. Naito et al., "Construction of Fuzzy Retrieval System with Learning-type Fuzzy Connective Operator" *Conference Proceedings* (1991) *S4–1, Joint Conference of Electric/Information-related Societies*.

*Primary Examiner*—Thomas G. Black
*Assistant Examiner*—Ruay Lian Ho
*Attorney, Agent, or Firm*—Ratner & Prestia

[57] ABSTRACT

The invention provides a data retrieval apparatus which includes a sensibility database 2 for storing a plurality of title names, evaluation points on a plurality of evaluation items, and identifiers assigned to evaluators responsible for the evaluation points; an evaluation point input block 1 for accepting an evaluation on each of the plurality of evaluation items; an evaluation point correction process block 5 for correcting each of the evaluations accepted by the evaluation point input block 1 by using a plurality of evaluator difference data for each of the plurality of evaluators; a retrieval criteria generating process block 6 for selecting a title name from the sensibility database 2 on the basis of each corrected evaluation; and a data retrieval process block 7. With this data retrieval apparatus, flexible data retrieval can be conducted by just entering subjective evaluation points even for objects from which objective numeric values related to subjective evaluation criteria are difficult to extract.

23 Claims, 51 Drawing Sheets

| EVALUATOR IDENTIFIER | ENCOURAGING | MOVING | ENCHANTING | DELIGHTING | GORGEOUS | EXCITING |
|---|---|---|---|---|---|---|
| e1 | +0.2 | −0.1 | +0.3 | 0 | +0.1 | −0.1 |
| e2 | −0.1 | +0.2 | −0.2 | −0.1 | 0 | +0.1 |
| e3 | 0 | 0 | +0.1 | 0 | −0.2 | 0 |
| e4 | +0.1 | +0.1 | 0 | 0 | 0 | +0.1 |
| e5 | −0.1 | +0.1 | −0.2 | 0 | −0.1 | 0 |
| ... | ... | ... | ... | ... | ... | ... |

FIG. 5

| TITLE NAME | LEADING ACTOR | EVALUATOR IDENTIFIER | ENCOURAGING | MOVING | ENCHANTING | DELIGHTING | GORGEOUS | EXCITING |
|---|---|---|---|---|---|---|---|---|
| N1 | A1 | e1 | 0.2 | 0.2 | 0.3 | 0.8 | 0.6 | 0.2 |
| N2 | A2 | e2 | 0.5 | 0.5 | 0.2 | 0.9 | 0.5 | 0.3 |
| N3 | A2 | e3 | 0.1 | 0.1 | 0.1 | 0.9 | 0.3 | 0.5 |
| N4 | A4 | e2 | 0.2 | 0.4 | 0.2 | 0.1 | 0.9 | 0.2 |
| N5 | A5 | e3 | 0.6 | 0.8 | 0.0 | 1.0 | 0.8 | 0.2 |
| ... | ... | ... | ... | ... | ... | ... | ... | ... |

FIG. 6

| THE RESULTS OF THE RETRIEVAL | | |
|---|---|---|
| NO. | TITLE NAME | LEADING ACTOR |
| 1 | N2 | A2 |
| 2 | N5 | A5 |
| 3 | N19 | A5 |
| 4 | N24 | A9 |
| 5 | N59 | A2 |
| ⋮ | ⋮ | ⋮ |

FIG. 7

▷ ··· PLAY BACK BUTTON

□ ··· STOP BUTTON

❙❙ ··· PAUSE BUTTON

▷▷ ··· FAST FORWARD BUTTON

◁◁ ··· REWIND BUTTON

OFF ··· OFF BUTTON

PLEASE SELECT A USER IDENTIFIER.

1. FATHER

2. MOTHER

3. MYSELF

FIG. 15

| USER IDENTIFIER | EVALUATOR IDENTIFIER | ENCOURAGING | MOVING | ENCHANTING | DELIGHTING | GORGEOUS | EXCITING |
|---|---|---|---|---|---|---|---|
| FATHER | e1 | +0.2 | −0.1 | +0.3 | 0 | +0.1 | −0.1 |
| FATHER | e2 | −0.1 | +0.2 | −0.2 | −0.1 | 0 | +0.1 |
| FATHER | e3 | 0 | 0 | +0.1 | 0 | −0.2 | 0 |
| FATHER | e4 | +0.1 | +0.1 | 0 | 0 | 0 | +0.1 |
| FATHER | e5 | −0.1 | +0.1 | −0.2 | 0 | −0.1 | 0 |
| ... | ... | ... | ... | ... | ... | ... | ... |
| MOTHER | e1 | +0.3 | +0.1 | +0.4 | −0.3 | −0.1 | −0.2 |
| MOTHER | e2 | −0.2 | −0.1 | −0.2 | −0.1 | +0.1 | +0.3 |
| MOTHER | e3 | −0.1 | 0 | −0.1 | −0.1 | 0 | −0.1 |
| MOTHER | e4 | +0.1 | +0.2 | +0.1 | +0.1 | 0 | 0 |
| MOTHER | e5 | +0.1 | +0.1 | −0.1 | −0.1 | 0 | 0 |
| ... | ... | ... | ... | ... | ... | ... | ... |
| MYSELF | e1 | −0.1 | +0.1 | −0.1 | +0.1 | +0.1 | −0.1 |
| MYSELF | e2 | −0.1 | −0.2 | 0 | +0.1 | +0.2 | +0.1 |
| MYSELF | e3 | 0 | 0 | 0 | +0.1 | −0.1 | 0 |
| MYSELF | e4 | +0.1 | +0.1 | +0.1 | −0.1 | −0.1 | +0.1 |
| MYSELF | e5 | 0 | +0.2 | +0.3 | −0.2 | −0.2 | +0.1 |
| ... | ... | ... | ... | ... | ... | ... | ... |

FIG. 16

| TITLE NAME | LEADING ACTOR | EVALUATOR IDENTIFIER | ENCOURAGING | MOVING | ENCHANTING | DELIGHTING | GORGEOUS | EXCITING | STANDARD DATA |
|---|---|---|---|---|---|---|---|---|---|
| S1 | A2 | e1 | 0.8 | 0.8 | 0.3 | 0.8 | 0.2 | 0.6 | 1 |
| S1 | A2 | e2 | 0.8 | 0.2 | 0.4 | 0.9 | 0.6 | 0.2 | 1 |
| S1 | A2 | e3 | 0.8 | 0.3 | 0.7 | 0.7 | 0.8 | 0.6 | 1 |
| S2 | A1 | e1 | 0.8 | 0.5 | 0.6 | 0.3 | 0.2 | 0.8 | 1 |
| S2 | A1 | e2 | 0.6 | 0.5 | 0.7 | 0.9 | 1.0 | 0.8 | 1 |
| S2 | A1 | e3 | 0.1 | 0.5 | 0.9 | 0.2 | 0.2 | 0.5 | 1 |
| S3 | A5 | e1 | 0.8 | 0.7 | 0.7 | 0.5 | 0.3 | 0.8 | 1 |
| S3 | A5 | e2 | 0.7 | 0.9 | 0.9 | 0.2 | 0.3 | 0.2 | 1 |
| S3 | A5 | e3 | 0.2 | 0.4 | 1.0 | 0.5 | 0.4 | 0.5 | 1 |
| S4 | A7 | e1 | 0.1 | 1.0 | 0.3 | 0.7 | 0.8 | 0.2 | 1 |
| S4 | A7 | e2 | 0.2 | 0.9 | 0.1 | 0.9 | 0.3 | 0.2 | 1 |
| S4 | A7 | e3 | 0.1 | 1.0 | 0.2 | 0.9 | 0.3 | 0.5 | 1 |
| S5 | A4 | e1 | 0.2 | 0.2 | 0.3 | 0.2 | 0.2 | 0.3 | 1 |
| S5 | A4 | e2 | 0.5 | 0.5 | 0.2 | 0.3 | 0.3 | 0.3 | 1 |
| S5 | A4 | e3 | 0.2 | 0.2 | 0.1 | 0.1 | 0.2 | 0.2 | 1 |
| N1 | A1 | e1 | 0.2 | 0.2 | 0.3 | 0.8 | 0.6 | 0.2 | 0 |
| N2 | A2 | e2 | 0.5 | 0.5 | 0.2 | 0.9 | 0.5 | 0.3 | 0 |
| N3 | A2 | e3 | 0.1 | 0.1 | 0.1 | 0.9 | 0.3 | 0.5 | 0 |
| N4 | A4 | e2 | 0.2 | 0.4 | 0.2 | 0.1 | 0.9 | 0.2 | 0 |
| N5 | A5 | e3 | 0.1 | 0.8 | 0.0 | 1.0 | 0.8 | 0.2 | 0 |
| ⋮ | ⋮ | ⋮ | ⋮ | ⋮ | ⋮ | ⋮ | ⋮ | ⋮ | ⋮ |

PLEASE ENTER EVALUATION POINTS FOR THE FOLLOWING STANDARD DATA.

| | |
|---|---|
| EXCITING | ] ] ] ] ] |
| GORGEOUS | ] ] ] ] ] |
| DELIGHTING | ] ] ] ] ] |
| ENCHANTING | ] ] ] ] ] |
| MOVING | ] ] ] ] ] |
| ENCOURAGING | ] ] ] ] ] |
| LEADING ACTOR | A2 A1 A5 A7 A4 |
| TITLE NAME | S1 S2 S3 S4 S5 |

| XL | XH | YL | YH | ICON DATA |
|---|---|---|---|---|
| 0.75 | 1.0 | 0 | 0.25 | (M1) |
| 0.75 | 1.0 | 0.25 | 0.5 | (M0) |
| 0.75 | 1.0 | 0.5 | 0.75 | (M0) |
| 0.75 | 1.0 | 0.75 | 1.0 | (M0) |
| .. | .. | .. | .. | .. |

FIG. 33

| XL | XH | YL | YH | ENCOURAGING | MOVING | ENCHANTING | DELIGHTING | GORGEOUS | EXCITING |
|---|---|---|---|---|---|---|---|---|---|
| -1.0 | -0.75 | -1.0 | -0.75 | 0.9 | 0.9 | 0.9 | 0.9 | 0.1 | 0.1 |
| -1.0 | -0.75 | -0.75 | -0.5 | 0.9 | 0.7 | 0.8 | 0.9 | 0.2 | 0.2 |
| -1.0 | -0.75 | -0.5 | -0.25 | 0.9 | 0.5 | 0.7 | 0.9 | 0.3 | 0.2 |
| -1.0 | ... | -0.25 | 0 | 0.9 | 0.2 | 0.5 | ... | 0.4 | 0.3 |
| ... | ... | ... | ... | ... | ... | ... | ... | ... | ... |

FIG. 38

| TITLE NAME | LEADING ACTOR | ENCOURAGING | MOVING | ENCHANTING | DELIGHTING | GORGEOUS | EXCITING |
|---|---|---|---|---|---|---|---|
| N1 | A1 | 0.2 | 0.2 | 0.3 | 0.8 | 0.6 | 0.2 |
| N2 | A2 | 0.5 | 0.5 | 0.2 | 0.9 | 0.5 | 0.3 |
| N3 | A2 | 0.2 | 0.7 | 0.1 | 0.9 | 0.3 | 0.5 |
| N4 | A4 | 0.2 | 0.4 | 0.2 | 0.1 | 0.9 | 0.2 |
| N5 | A5 | 0.3 | 0.8 | 0.0 | 1.0 | 0.4 | 0.3 |
| ... | ... | ... | ... | ... | ... | ... | ... |

FIG. 39

| TITLE NAME | LEADING ACTOR | EVALUATOR IDENTIFIER | ENCOURAGING | MOVING | ENCHANTING | DELIGHTING | GORGEOUS | EXCITING | NUMBER OF RETRIEVAL |
|---|---|---|---|---|---|---|---|---|---|
| N1 | A1 | e1 | 0.2 | 0.2 | 0.3 | 0.8 | 0.6 | 0.2 | 105 |
| N2 | A2 | e2 | 0.5 | 0.5 | 0.2 | 0.9 | 0.5 | 0.3 | 214 |
| N3 | A2 | e3 | 0.1 | 0.1 | 0.1 | 0.9 | 0.3 | 0.5 | 89 |
| N4 | A4 | e2 | 0.2 | 0.4 | 0.2 | 0.1 | 0.9 | 0.2 | 518 |
| N5 | A5 | e3 | 0.1 | 0.8 | 0.0 | 1.0 | 0.8 | 0.2 | 12 |
| ... | ... | ... | ... | ... | ... | ... | ... | ... | ... |

FIG. 46

THE RESULTS OF THE RETRIEVAL

| NO. | TITLE NAME | LEADING ACTOR | RETRIEVE COUNT |
|---|---|---|---|
| 1 | N2 | A2 | 214 |
| 2 | N5 | A5 | 12 |
| 3 | N19 | A5 | 23 |
| 4 | N24 | A9 | 102 |
| 5 | N59 | A2 | 350 |
| : | : | : | : |

RETRIEVE AGAIN

FIG. 47

DATA RETRIEVAL APPARATUS, EVALUATION ENTRY APPARATUS AND SENSIBILITY ENTRY APPARATUS

BACKGROUND OF THE INVENTION

1. Field of the Invention

The present invention relates to a data retrieval technique, and more particularly to a data retrieval apparatus that performs data retrieval based on user's subjective evaluation criteria, and also to an evaluation entry apparatus and a sensibility entry apparatus for use with the same.

2. Related Art of the Invention

Recent years have seen the introduction of data retrieval techniques in which data is retrieved by conducting retrieval using criteria determined by a person's subjective evaluation such as "suitable", "convenient", etc. According to such data retrieval techniques, a retrieval apparatus acquires evaluation criteria that match the subjective evaluation of the user, and performs data retrieval using such criteria. For example, a technique using a learning-type fuzzy coupling operator is disclosed in "Construction of a Fuzzy Retrieval System Using a Learning-type Fuzzy Coupling Operator" (Conference Proceedings (1991) S4-1, Joint Conference of Electric/Information-related Societies). This fuzzy coupling operator is defined by the equation shown in Equation 1 below.

Equation 1:
$$f(\vec{X}) = m \cdot S + (1 - m) \cdot T$$
$$\vec{x} = (X_1, \ldots, X_n)$$
$$m = p_1 - \sum_{j=1}^{n} (P_j - P_{j+1}) X_j$$
$$0 \leq P_1, \ldots, P_{n+1} \leq 1, 0 \leq -(n-1) P_1 + \sum_{j=1}^{n} P_j \leq 1$$

S and T in the Equation 1 are defined as shown in Equation 2 below.

Equation 2:
$$T = 1 - \left[ 1 - \prod_{j=1}^{n} \{1 - (1 - X_j)^{P_{n+3}}\} \right]^{\frac{1}{P_{n+3}}}$$

$$S = \left[ 1 - \prod_{j=1}^{n} (1 - X_j^{P_{n+2}}) \right]^{\frac{1}{P_{n+2}}}$$

$$P_{n+2}, P_{n+3} > 0$$

In the fuzzy coupling operator of the Equation 1, the contents of the operation can be adjusted by varying the parameters, $p_1, p_2, \ldots, p_{n+3}$ used for learning for achieving fitness to subjective evaluation criteria. Here, $(X_1, \ldots, X_n)$ represents input data.

FIG. 51 is a diagram showing a configuration for implementing the data retrieval technique using the learning-type fuzzy coupling operator. In the figure, reference numeral 101 is a membership function input block for accepting a user input of a membership function that constitutes part of subjective evaluation criteria; 102 is a storage block for storing the membership function; 103 is a data storage block for storing data consisting only of quantitative attributes, such as NUMBER OF EMPLOYEES and SALARY; 104 is a goodness-of-fit calculating block for calculating goodness-of-fit of each attribute value of the data with respect to the membership function; 105 is a coupling block for coupling the thus calculated goodness-of-fits using a fuzzy coupling operator; 106 is a retrieval result display block for retrieving data in which the output value obtained by coupling satisfies a prescribed condition, and for displaying retrieval results along with the output value; 107 is a user evaluation input block via which the user inputs an evaluation value which constitutes part of his subjective evaluation criteria when the displayed output value does not match his subjective evaluation; and 108 is an adjusting block for adjusting the parameters of the fuzzy coupling operator on the basis of the thus input evaluation value.

Next, the operation of the data retrieval apparatus having the configuration shown in FIG. 51 will be described. First, the user describes his subjective evaluation criteria in the form of a membership function, and enters it to the data retrieval apparatus via the membership function input block 101. The membership function thus entered is stored in the storage block 102. For example, suppose that data about hotels are stored, and that the user wants to retrieve "convenient hotels for business trip". Then, the user enters some of his subjective evaluation criteria necessary to evaluate the convenience of the hotel, such as "nearness to the place he is visiting" and "reasonableness of hotel charges", in the form of a membership function to the data retrieval apparatus via the membership function input block 101.

Next, using the membership function stored in the storage block 102, the goodness-of-fit calculating block 104 in the data retrieval apparatus calculates the goodness-of-fit of each attribute value of the data stored in the data storage block 103. In the above example, the goodness-of-fit is calculated for each attribute value of the stored data with respect to the input membership function, such as "nearness to the place he is visiting" and "reasonableness of hotel charges". After the goodness-of-fits are calculated, the goodness-of-fits of the attribute values are coupled in the coupling block 105 by using the fuzzy coupling operator shown in the Equation 1. With the output value obtained by this coupling operation, retrieval is made for data that satisfies a prescribed condition (for example, those greater than a prescribed value), and only the data that satisfies the prescribed condition is displayed on the retrieval result display block 106. The retrieval result display block 106 also presents the user with the output value obtained through coupling by the fuzzy coupling operator. The user checks the displayed data as well as the output value, and if the data matches his subjective evaluation, the displayed data is retrieved as a final result.

On the other hand, if the output data thus displayed does not match his subjective evaluation, the user then enters an evaluation value based on his subjective evaluation via the user evaluation input block 107. When the evaluation value is input, the adjusting block 108 in the data retrieval apparatus adjusts the parameters, $p_1, p_2, \ldots, p_{n+3}$, of the fuzzy coupling operator of the Equation 1 so that an evaluation value that matches the user's subjective evaluation criteria is output.

As described above, according to this data retrieval technique, the parameters of the fuzzy coupling operator are varied based on the evaluation value that the user enters against the displayed retrieval results. By performing data retrieval using the fuzzy coupling operator in this way, data can be retrieved on the basis of the user's subjective evaluation criteria.

In the above data retrieval technique, each data item stored in a database is expressed in terms of an objective numeric value such as "distance from the station", and the magnitude of the numeric value is strongly related to the subjective evaluation criteria such as "convenience" when retrieving "hotels convenient for business trip". In fact, a shorter distance from the station means a shorter time to walk from the hotel to the station to take a train, which constitutes a significant factor in determining the subjective evaluation criteria such as "convenience".

However, if such a retrieval technique is applied to a video library (a database storing a large number of videos such as movies), for example, when selecting a video it is very difficult to extract an objective numeric value that is strongly related to subjective evaluation criteria such as "emotionally moving". Whether a person is moved by watching a video is largely dependent on factors such as the story of the movie or the like recorded on the video, the performance of the director, and the performance of the actors, and these factors cannot be extracted in advance as numeric values from the video. Further, if it is attempted to express these factors using symbols other than numeric values, at the present state of technology it is not possible to objectively express the development of a story, etc. in the form that can be stored in a database. Accordingly, in the case of a video library or the like, the above-described technique, which requires expressing data in terms of objective numeric values, is difficult to apply. Furthermore, in dealing with actual problems, there are very many instances where it is difficult to extract objective numeric values strongly related to subjective evaluation criteria when performing data retrieval based on subjective evaluation criteria, for example, when retrieving a large number of videos for the one that matches the user's taste, or when retrieving a large number of works of art for the one that matches the user's taste. It can therefore be said that the above-described prior art technique has been able to solve only a limited number of problems out of the problems that data retrieval based on subjective evaluation criteria is intended for.

In weeklies and other magazines, we often see articles of video reviews. For example, movie critics write reviews of movie videos for magazines. In preparing such reviews, critics actually watch videos and give ratings based on their subjective evaluations. That is, for videos and the like, although it is difficult to extract objective numeric values, it is possible to have a designated critic give his subjective evaluation points.

One possibility, therefore, is to prestore evaluation points based on the subjective evaluation of a designated critic in a database, and to have a user enter his evaluation points and conduct retrieval based on the user's evaluation points. However, if such database retrieval is to be implemented, it must be taken into account that subjective evaluation involves a quantity representing a degree, and also that subjective evaluation differs from one critic to another. For example, when a user conducts retrieval by using criteria such as "emotionally moving video", the degree of "moving" must be considered since the statement "moving" ranges from "very much moving" to "slightly moving". Furthermore, the subjective evaluation of the user may differ from that of the critic that gave evaluation points to the data stored in the database. For example, consider the case where the critic that gave the evaluation points for the database has a disposition to be much more easily moved than the user. In such a case, if the user retrieves data by using the retrieval criteria of "very much moving video title", data not so moving for the user may be retrieved as "very much moving" data, since the critic that gave the evaluation points for the database has a disposition to be easily moved.

As is clear from the above description, for data from which it is difficult to extract objective numeric values related to subjective evaluation criteria, a technique is required in which not only subjective evaluation points by a designated critic are quantified for storage in a database but data retrieval is performed by taking into account differences in subjective evaluation criteria between user and critic.

In video sale stores, video rental stores, etc., the recent tendency is that customers visit the stores without deciding in advance what video title they will buy or rent, and choose a video title at the spot. Furthermore, video on demand or the like is expected to spread in the future, enabling viewers to choose a video from among a large number of video titles for viewing in homes, and there may arise cases where the viewer does not have in mind a particular video title he wants to watch, but wants to watch a video since he has plenty of time and has nothing else to do. In such cases, it will be very convenient for the user if he can quickly select a video title based on his subjective evaluation criteria at the spot. There is, therefore, a need for the development of an apparatus for retrieving video titles based on subjective evaluation criteria.

If such data retrieval apparatus or video title retrieval apparatus is for personal use, the number of users is usually one for one apparatus, but in the case of using one apparatus among a plurality of users, differences in subjective evaluation criteria between user and critic need to be considered on a user-by-user basis, and the development of a technique for implementing this is needed.

In performing data retrieval by considering the differences in subjective evaluation criteria between user and critic, there may be cases where the differences in the subjective evaluation criteria cannot be prestored as data. For example, if different critics dynamically enter their data to a database, it is not possible to predefine all the critics that enter their data to the database; therefore, a technique must be developed that can dynamically generate the differences in subjective evaluation criteria between critic and user when performing retrieval. Furthermore, in video sale stores, video rental stores, etc., many users tend to visit the stores without deciding in advance what video title they want to buy or rent, and choose a video title at the spot. There is, therefore, a need for an apparatus that can retrieve a video title accurately reflecting the subjective evaluation criteria of a user, by determining the difference in subjective evaluation criteria between the critic and user at the spot, and by selecting a video based on the difference thus determined.

One way this is done is to have a user enter his subjective evaluation criteria by combining a word with a degree, such as "moving: 0.8" or "encouraging: 0.6.". This, however, has the problem of being difficult to understand intuitively when entering the criteria. To solve this problem, an interface technique must be developed that makes it easy for the user to enter his subjective evaluation criteria.

For a data retrieval technique in which data is retrieved based on subjective evaluation criteria, it is necessary to provide an interface that enables the user to enter his subjective evaluation criteria in a way that is easy to understand intuitively, and to develop a technique for retrieving data based on the subjective evaluation criteria entered via the interface. In video sale or rental store or video-on-demand situations, most users are usually not familiar with database retrieval. There is, therefore, a need for a video title retrieval apparatus equipped with an interface that enables ordinary users to enter their subjective evaluation criteria in a way that is easy to understand intuitively.

In database retrieval, there are cases where large volumes of data are shared for use among a plurality of users. In such cases, criteria such as "data used by many users" may be considered as subjective evaluation criteria. There is, therefore, a need for a technique that considers criteria such as "data used by many users", in addition to the retrieval criteria specified by a user, when retrieving data based on subjective evaluation criteria. There is, for example, a case where the user wants to retrieve video titles in order of popularity. In particular, for video title retrieval, a technique is required which can use "the degree of popularity" as data retrieval criteria, such as "all-American No. 1 hit movie" as appears in an advertisement copy.

SUMMARY OF THE INVENTION

It is an object of the present invention to provide a data retrieval apparatus that can perform data retrieval based on subjective criteria It is another object of the present invention to provide an evaluation entry apparatus and a sensibility entry apparatus by which subjective evaluation can be entered easily.

To achieve the above objects, the invention provides a data retrieval apparatus comprising storing means for storing a plurality of names each of which is given for each of a plurality of evaluation targets, and a plurality of evaluations each of which is given in advance by a designated evaluator on a prescribed evaluation item for each of the plurality of evaluation targets; selection key receiving means for receiving an evaluation given by a user on the evaluation item for a particular evaluation target; selection key correction means for correcting the evaluation received by the selection key receiving means by using an evaluation gap obtained on the basis of the evaluations given by the evaluator and the user on the evaluation item for the particular evaluation target; and selecting means for selecting information concerning the evaluation target on the basis of the evaluation corrected by the selection key correction means.

More, to achieve the above objects, the invention provides a data retrieval apparatus comprising storing means for storing a plurality of evaluations given by any evaluator of a plurality of evaluators on a plurality of evaluation items and an identifier assigned to the evaluator responsible for the plurality of the evaluations, together with each of a plurality of names each of which is given for each of a plurality of evaluation targets; selection key receiving means for receiving a plurality of evaluations given by a user on the plurality of evaluation items; selecting means for selecting the information concerning the evaluation target; selection result display means for, when the information concerning at least one evaluation target is selected by the selecting means, displaying the information; and specifying means for receiving the information selected by the user from the information displayed on the selection result display means, and wherein the storing means further stores a reception count together with each of the plurality of names, the reception count being the number of receptions made by the specifying means, the selecting means selects the information concerning the evaluation target, based on reception counts and the plurality of evaluations received by the selection key receiving means, and when the information is received by the specifying means, the reception count specified by the information received by the specifying means is updated.

Further, to achieve the above objects, the invention provides an evaluation entry apparatus comprising evaluation region display means for displaying a region showing each evaluation on at least one evaluation item for an evaluation target, and for displaying an object capable of moving the region, pointing input means for receiving a position, selected by a user, of the object in the region, and evaluation receiving means for receiving the evaluation on the at least one evaluation item on the basis of the position of the object received by the pointing input means.

Furthermore, to achieve the above objects, the invention provides a sensibility entry apparatus comprising sensibility input region display means for displaying sensibility input region in which a region for expressing a prescribed sensibility is expressed in a coordinate system, and an object that can be moved around in the sensibility input region; and pointing input means for receiving a position of the object moved by a user operation in the sensibility input region displayed by the sensibility input region display means, on the basis of the user operation.

BRIEF DESCRIPTION OF THE DRAWINGS

These and other objects, advantages, features, and uses will become more apparent as the description proceeds, when considered with the accompanying drawings in which:

FIG. 5 is a diagram showing an example of evaluator difference data stored in an evaluator difference data storing block 3 according to the same embodiment;

FIG. 6 is a diagram showing an example of data stored in a sensibility database 2 according to the same embodiment;

FIG. 7 is a diagram showing an example of display showing retrieval results from the sensibility database according to the same embodiment;

FIG. 15 is a diagram showing an example of an identifier input screen according to the same embodiment;

FIG. 16 is a diagram showing an example of user-by-user evaluator difference data according to the same embodiment;

FIG. 23 is a diagram showing an example of data stored in a sensibility database with standard data 41 according to the same embodiment;

FIG. 24 is a diagram showing an example of an evaluation point input screen according to the same embodiment;

FIG. 33 is a diagram showing an example of data stored in an icon storing block 53 according to the same embodiment;

FIG. 38 is a diagram showing an example of data stored in a criteria generation table according to the same embodiment;

FIG. 39 is a diagram showing an example of data stored in an evaluation point database 62 according to the same embodiment;

FIG. 46 is a diagram showing an example of data stored in a sensibility database with counts 71 according to the same embodiment;

FIG. 47 is a diagram showing an example of display showing retrieval results from the sensibility database with counts 71 according to the same embodiment;

DESCRIPTION OF THE PREFERRED EMBODIMENTS

Figure 1:
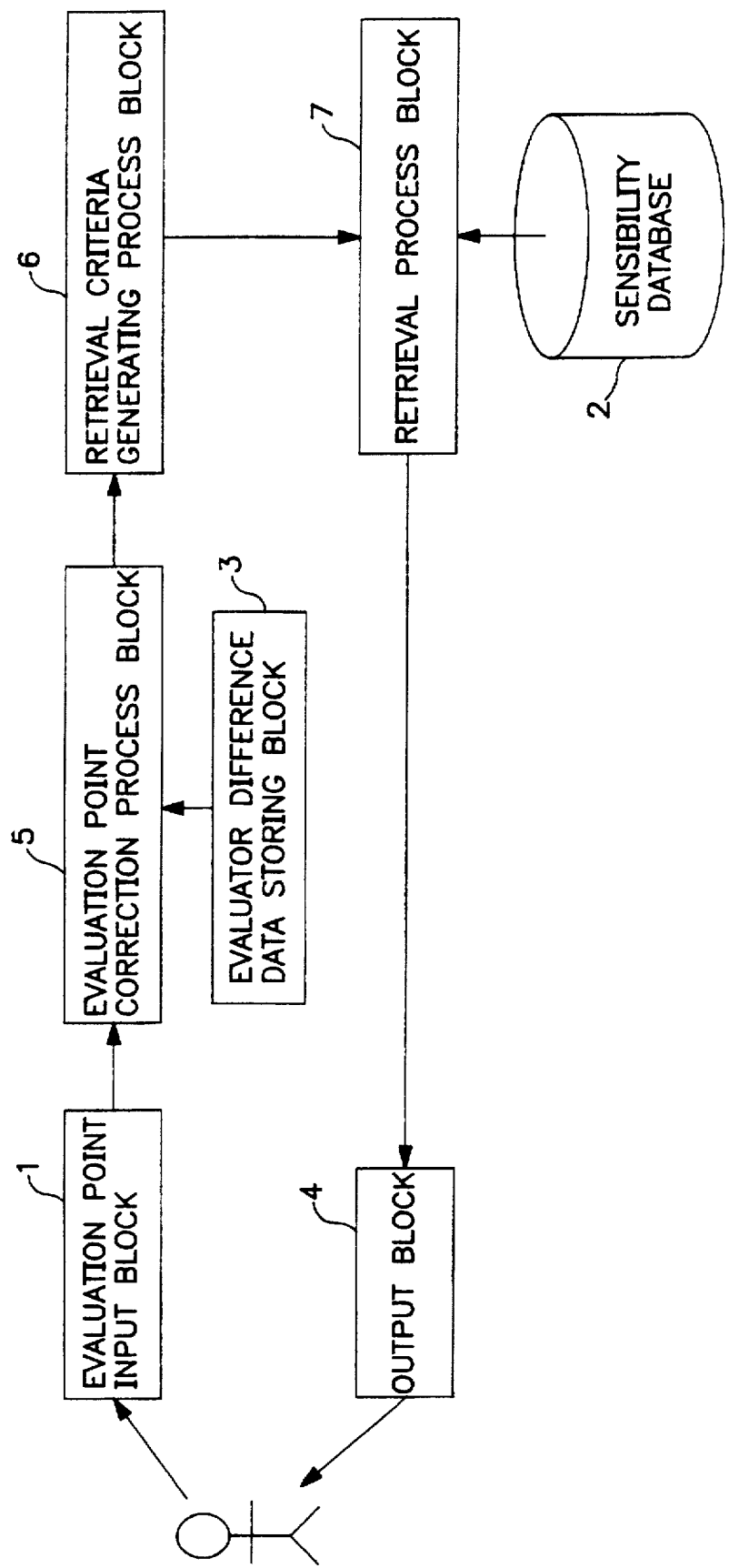
FIG. 1 is a block diagram showing a first embodiment of a data retrieval apparatus according to the present invention.

Referring now to FIG. 1, there is shown therein a block diagram showing a first embodiment of the data retrieval apparatus according to the present invention. In FIG. 1, reference numeral 1 is an evaluation point input block for accepting evaluation points entered by a user; 2 is a sensibility database for storing data paired with an evaluator's identifier and evaluation points; 3 is an evaluator difference data storing block for storing evaluator difference data which represents an evaluation gap between the user and evaluator for the same evaluation item on the same evaluation target; 4 is an output block for displaying retrieval results obtained by retrieving the sensibility database 2; 5 is an evaluation point correction process block for accepting evaluation points entered by the user from the evaluation point input block 1, and for correcting the evaluation points entered from the evaluation point input block 1, based on the accepted points and on the evaluator difference data stored in the evaluator difference data storing block 3; 6 is a retrieval criteria generating process block for generating database retrieval criteria based on the corrected evaluation points; and 7 is a retrieval process block for retrieving the sensibility database 2 based on the generated retrieval criteria, and for outputting retrieval results for display on the output block 4.

With reference to corresponding relationship between each block in FIG. 1 and each means in the data retrieval of the present invention, the evaluation point input block 1 corresponds to selection key receiving means, the sensibility database 2 corresponds to storing means, the evaluator difference data storing block 3 corresponds to evaluation gap storing means, the output block 4 corresponds to selection result display means, the evaluation point correction process block 5 corresponds to selection key correction means, the retrieval criteria generating process block 6 corresponds to retrieval criteria generating means, and the retrieval process block 7 corresponds to retrieving means. The retrieval criteria generating process block 6 and the retrieval process block 7 both correspond to selecting means.

Figure 2:
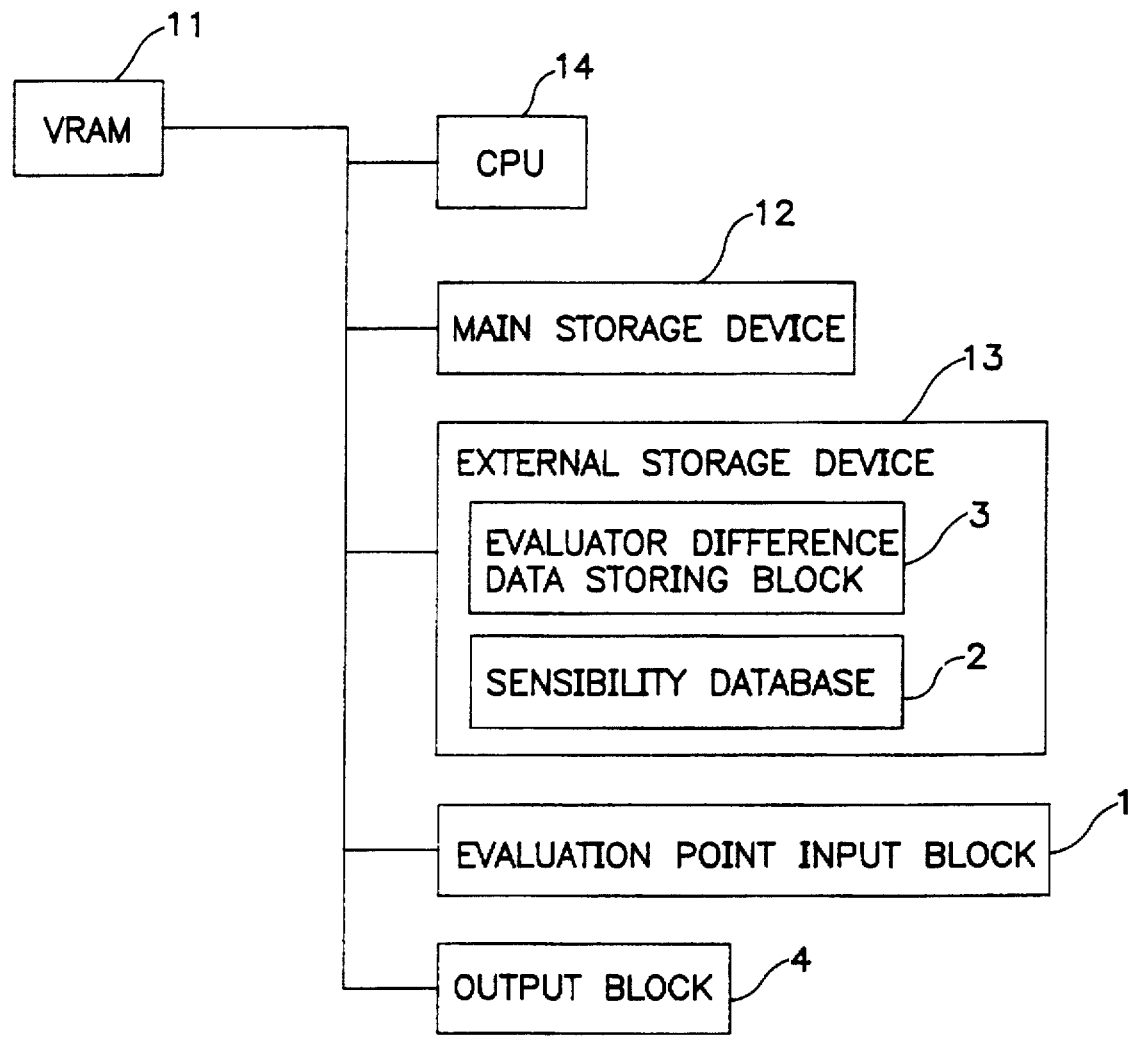
FIG. 2 is another block diagram illustrating the same embodiment.

FIG. 2 is another block diagram illustrating this embodiment, the configuration shown being fundamentally the same as that of a general-purpose computer system. The evaluation point input block 1, sensibility database 2, evaluator difference data storing block 3, and output block 4, which are shown in FIG. 1, are included. In FIG. 2, the same blocks as those shown in FIG. 1 are designated by the same reference numerals, and explanations of such blocks will not be repeated. In FIG. 2, reference numeral 11 is a VRAM for storing data for display; 12 is a main storage device for storing programs and data for processing during execution; 13 is an external storage device for storing programs and data; and 14 is a CPU for loading a program stored on the external storage device 13 into the main storage device 12 for execution.

Next, the operation of this embodiment will be described with reference to the flowchart of FIG. 3.

In step a1, the evaluation point input block 1 accepts evaluation points entered by the user. The evaluation points represents points for a set of words expressing sensibilities, such as ENCOURAGING, MOVING, ENCHANTING, DELIGHTING, GORGEOUS, and EXCITING. In this example, points are input by expressing the degree of each item by a numeric value between 0 and 1, for example, as (0.5, 0.7, 0.1, 0.9, 0.5, 0.3).

In this case, a bar graph may be used to illustrate the degrees of the respective items, and the degrees may be input by using a mouse or the like.

In this embodiment, six kinds of words are selected for use, but it will be appreciated that the kinds of words may be increased or reduced or other kinds of words may be used. However, these words must correspond to attributes of data in the database 2. For example, the above six words assume the use of a sensibility database such as the one shown in FIG. 6.

The data attributes of the sensibility database 2 are each constructed from an evaluation criterion based on which subjective evaluation is performed on an evaluation target. Unlike objective evaluation that yields the same result regardless of the evaluator, a subjective evaluation criterion concerns one that yields a different result for a different evaluator; examples include ENCOURAGING, MOVING, ENCHANTING, DELIGHTING, GORGEOUS, and EXCITING shown in the sensibility database of FIG. 6. With such subjective evaluation criteria, different evaluation results are obtained from different people; for example, when watching the same video, some people may be very much moved, but others may not. When we evaluate video titles or books in our daily life, we use many other subjective evaluation criteria such as THRILLING, SURPRISING, REFRESHING, BEAUTIFUL, GENTLE, NAIVE, etc. That is, there are very many subjective evaluation criteria we use in our daily life when we evaluate something. If we expand the range of data retrieval, for example, to data of persons, we may use evaluation criteria, such as HIGHLY SPIRITED, CALM, OBEDIENT, AGGRESSIVE, and THOUGHTFUL, which are subjective because different evaluators may evaluate these qualities differently.

In step a2, a set of data is extracted from among the data stored in the evaluator difference data storing block 3. As shown in FIG. 5, in the evaluator difference data storing block 3, values indicating the differences in sensitivity between evaluator and user are stored in advance for the respective word items along with evaluator identifiers identifying the respective evaluators responsible.

The evaluator difference data shown in FIG. 5 are defined relative to the user sensitivity. For example, the figure shows that, for the item ENCOURAGING, the sensitivity of the evaluator identified by the identifier e1 is "+0.2" higher than that of the user; that is, as compared to the user, the evaluator e1 tends to be easily encouraged by a degree of "+0.2". More specifically, when watching the same video, the evaluator identified by the identifier e1 will feel more encouraged than the user, and the degree of the tendency, when expressed on a numeric scale of 0 to 1, is "+0.2". Differences in sensitivity between evaluator and user are defined similarly for other word items.

As this step is called, the data shown in FIG. 5 are read one by one in sequence from the top to the bottom. When all the stored data are read out, it is determined in step a4, hereinafter described, that data for all evaluators have been extracted. For example, when this step is called for the first time, the first set of data, (evaluator identifier, ENCOURAGING, MOVING, ENCHANTING, DELIGHTING, GORGEOUS, EXCITING)=(e1, +0.2, −0.1, +0.3, 0, +0.1, −0.1), is read out from among the data shown in FIG. 5.

In step a3, the evaluation points that the user entered in step a1 are corrected on the basis of the data extracted in step a2. In a specific method of correction, the values in the data extracted in step a2, excluding the evaluator identifier, are subtracted from the evaluation points entered by the user.

For example, when the evaluation points entered by the user in step a1 are (ENCOURAGING, MOVING, ENCHANTING, DELIGHTING, GORGEOUS, EXCITING)=(0.5, 0.7, 0.1, 0.9, 0.5, 0.3), and the values in the data read out in step a2 are (evaluator identifier, ENCOURAGING, MOVING, ENCHANTING, DELIGHTING, GORGEOUS, EXCITING)=(e1, +0.2, −0.1, +0.3, 0, +0.1, −0.1), then the result is (0.5, 0.7, 0.1, 0.9, 0.5, 0.3)−(+0.2, −0.1, +0.3, 0, +0.1, −0.1)=(0.3, 0.8, −0.2, 0.9, 0.4, 0.4). If, as a result of the subtraction, there occurs an evaluation point yielding a value outside the range of 0 to 1, a value smaller than 0 is rounded to 0 and a value larger than 1 is rounded to 1. Accordingly, in the above example, the value outside the range of 0 to 1 is thus rounded, and the result is (0.3, 0.8, 0.0, 0.9, 0.4, 0.4). Further, in this step, the result of the subtraction is combined with the evaluator identifier read out in step a2, to obtain (e1, 0.3, 0.8, 0.0, 0.9, 0.4, 0.4) as the final corrected result. This corrected result is stored in the main storage device 12 for use in step a5 hereinafter described.

Steps a2 to a4 are repeated, until it is determined in step a4 that there is no data remaining to be read out from the evaluator difference data storing block 3. If there is no remaining data, the process proceeds to step a5. Otherwise, the process returns to a2.

In step a5, retrieval criteria are generated using the corrected results stored in step a3. More specifically, a criterion "EVALUATOR IDENTIFIER=IDENTIFIER and ATTRIBUTE 1=EVALUATION VALUE 1 and ATTRIBUTE 2=EVALUATION VALUE 2 and . . . and ATTRIBUTE N=EVALUATION VALUE N" is generated from each corrected result (IDENTIFIER, EVALUATION VALUE 1, EVALUATION VALUE 2, . . . , EVALUATION VALUE N) stored in step a3. Here, EVALUATOR IDENTIFIER, ATTRIBUTE 1, ATTRIBUTE 2, . . . , ATTRIBUTE N are attributes of the sensibility database.

Consider, for example, the sensibility database shown in FIG. 6. In the sensibility database of FIG. 6, video title data are stored. The generated criteria are then coupled by OR, to form the retrieval criteria. For example, if the data stored in step a3 is {(e1, 0.3, 0.8, 0.0, 0.9, 0.4, 0.4.), (e2, 0.6, 0.5, 0.3, 1.0, 0.5, 0.2), (e3, 0.5, 0.7, 0.0, 0.9, 0.7, 0.3), (e4, 0.4, 0.6, 0.1, 0.9, 0.5, 0.2), (e5, 0.6, 0.6, 0.3, 0.9, 0.6, 0.3)}, then the retrieval criteria shown in Equation 3 are generated.

Equation 3:

(EVALUATOR IDENTIFIER=e1 and ENCOURAGING= 0.3 and MOVING=0.8 and ENCHANTING=0.0 and DELIGHTING=0.9 and GORGEOUS=0.4 and EXCITING=0.4) or (EVALUATOR IDENTIFIER=e2 and ENCOURAGING=0.6 and MOVING=0.5 and ENCHANTING=0.3 and DELIGHTING=1.0 and GORGEOUS=0.5 and EXCITING=0.2) or (EVALUATOR IDENTIFIER=e3 and ENCOURAGING=0.5 and MOVING=0.7 and ENCHANTING=0.0 and DELIGHTING=0.9 and GORGEOUS=0.7 and EXCITING=0.3) or (EVALUATOR IDENTIFIER=e4 and ENCOURAGING=0.4 and MOVING=0.6 and ENCHANTING=0.1 and DELIGHTING=0.9 and GORGEOUS=0.5 and EXCITING=0.2) or (EVALUATOR IDENTIFIER=e5 and ENCOURAGING=0.6 and MOVING=0.6 and ENCHANTING=0.3 and DELIGHTING=0.9 and GORGEOUS=0.6 and EXCITING=0.3)

In step a6, the sensibility database 2 is retrieved in accordance with the retrieval criteria generated in step a5. In the sensibility database of FIG. 6, "title name" and "leading actor" may be considered as the data attributes to be retrieved. In this embodiment, for "=" in the retrieval criteria generated in step a5, the following convention is adopted: that is, when "ATTRIBUTE 1=0.5", for example, the criteria are said to be satisfied if the value of ATTRIBUTE 1 falls within a range between (0.5−α) and (0.5+α) inclusive. This is in consideration of the fact that finding an exact match in terms of numeric values for each evaluation point does not have much meaning in itself, when, for data in the sensibility database, the evaluator gives evaluation points based on his own subjective evaluation criteria and the user gives evaluation points as retrieval criteria based on his own evaluation criteria. Also considered is the fact that an exact match would result in reducing the number of data items to be retrieved. Therefore, a predetermined constant α is used to allow a margin for satisfying the criteria. A predetermined value, for example, 0.1, is given as the constant α. As an example, when the sensibility database of FIG. 6 is retrieved using the retrieval criteria of the Equation 3 with α=0.1, title names {N2, N5}, etc. are retrieved.

In step a7, the results of the retrieval conducted in step a6 are displayed on the output block 4. An example of the display is shown in FIG. 7. In the example of FIG. 7, the retrieved data are numbered consecutively, making it easy to keep track of the number of data items retrieved.

It is also possible to include objective evaluation criteria in the data attributes of the sensibility database 2. For example, if the sensibility database of FIG. 6 is a video title database, the playing time, the number of spectators drawn, etc. may be included in the data attributes of the sensibility database. Then, the user can retrieve video titles whose playing time is, for example, 30 minutes or less and that match the sensibilities entered in accordance with the method described in connection with step a1. In a specific method of retrieval, first only those video titles whose playing time is 30 minutes or less are retrieved based on the attribute value of the playing time in the sensibility database by using an ordinary retrieval technique used in a conventional database system, and then, the retrieved data are retrieved using the sensibility-based retrieval technique described in the present embodiment.

According to this embodiment, database retrieval can be performed based on user-entered subjective evaluation points even for objects from which objective numeric values related to subjective evaluation criteria are difficult to extract. Furthermore, not only the subjective evaluation is quantified, but data retrieval can be performed by considering differences in subjective evaluation criteria between the user and the designated critic that gave evaluation points to data in the database. This achieves flexible retrieval, permitting data retrieval to be conducted by just entering subjective evaluation points, even for objects from which objective numeric values related to subjective evaluation criteria are difficult to extract.

Figure 8:
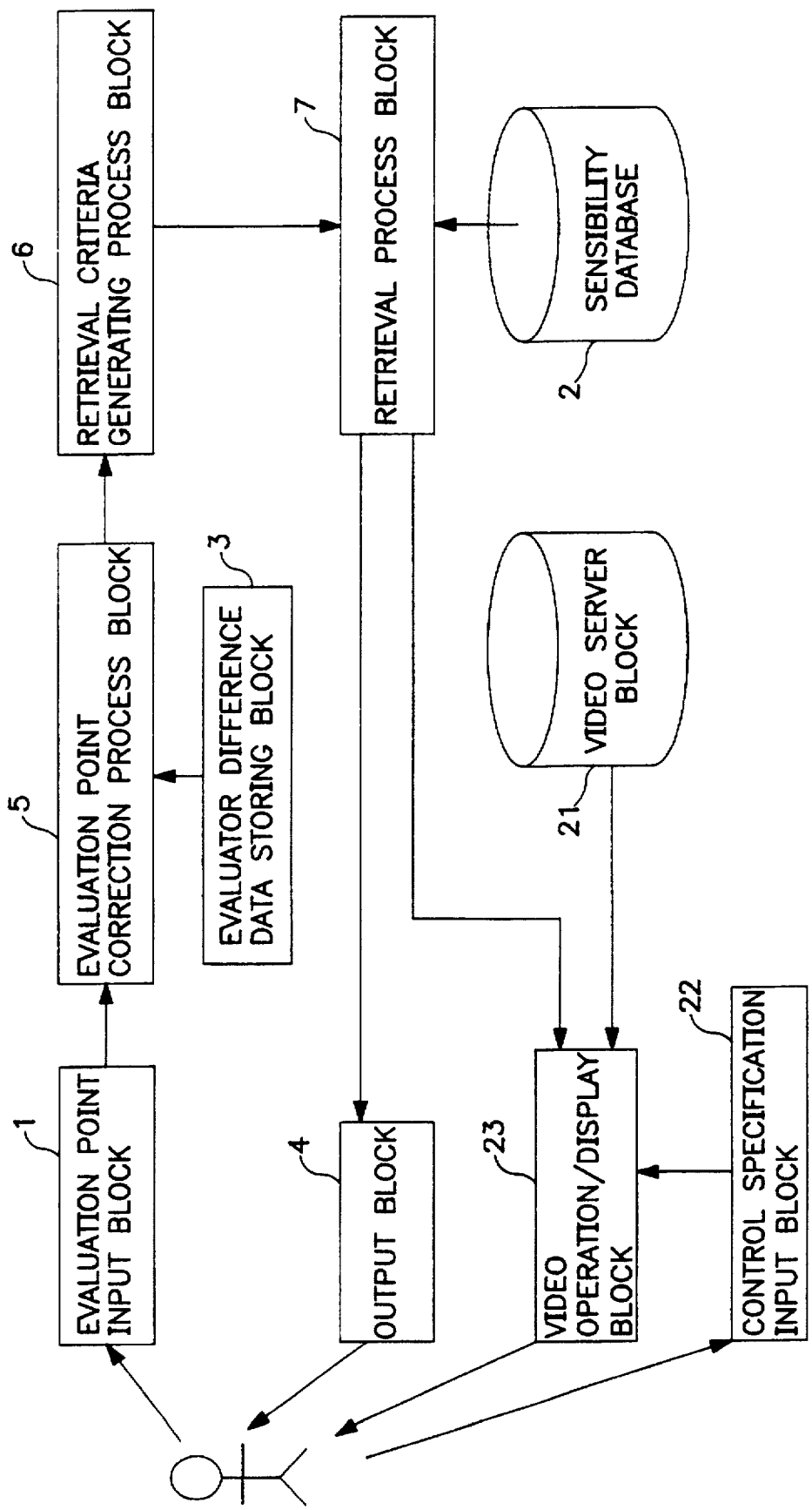
FIG. 8 is a block diagram showing a second embodiment of the data retrieval apparatus according to the present invention.

Referring to FIG. 8, there is shown therein a block diagram showing a second embodiment of the data retrieval apparatus according to the present invention. The same blocks as those shown in FIG. 1 are designated by the same reference numerals, and explanations of such blocks will not be repeated here. Different blocks will be explained below. Reference numeral 21 is a video server block for storing video data whose video title data are also stored in the sensibility database 2; 22 is a control specification input block for accepting a user input specifying the operation or display of video data selected from the retrieval results displayed on the output block 4; and 23 is a video operation/display block for retrieving video data from the video server block 21 in accordance with the user input supplied from the control specification input block 22, and for displaying or performing a designated operating on the video.

With reference to corresponding relationship between each block in the second embodiment, which constitute the difference from the configuration of FIG. 1, and each means in the data retrieval apparatus of the present invention, the video server block 21 corresponds to a server, the control specification input block 22 corresponds to specifying means, and the video operation/display block 23 corresponds to evaluation target display means.

Figure 9:
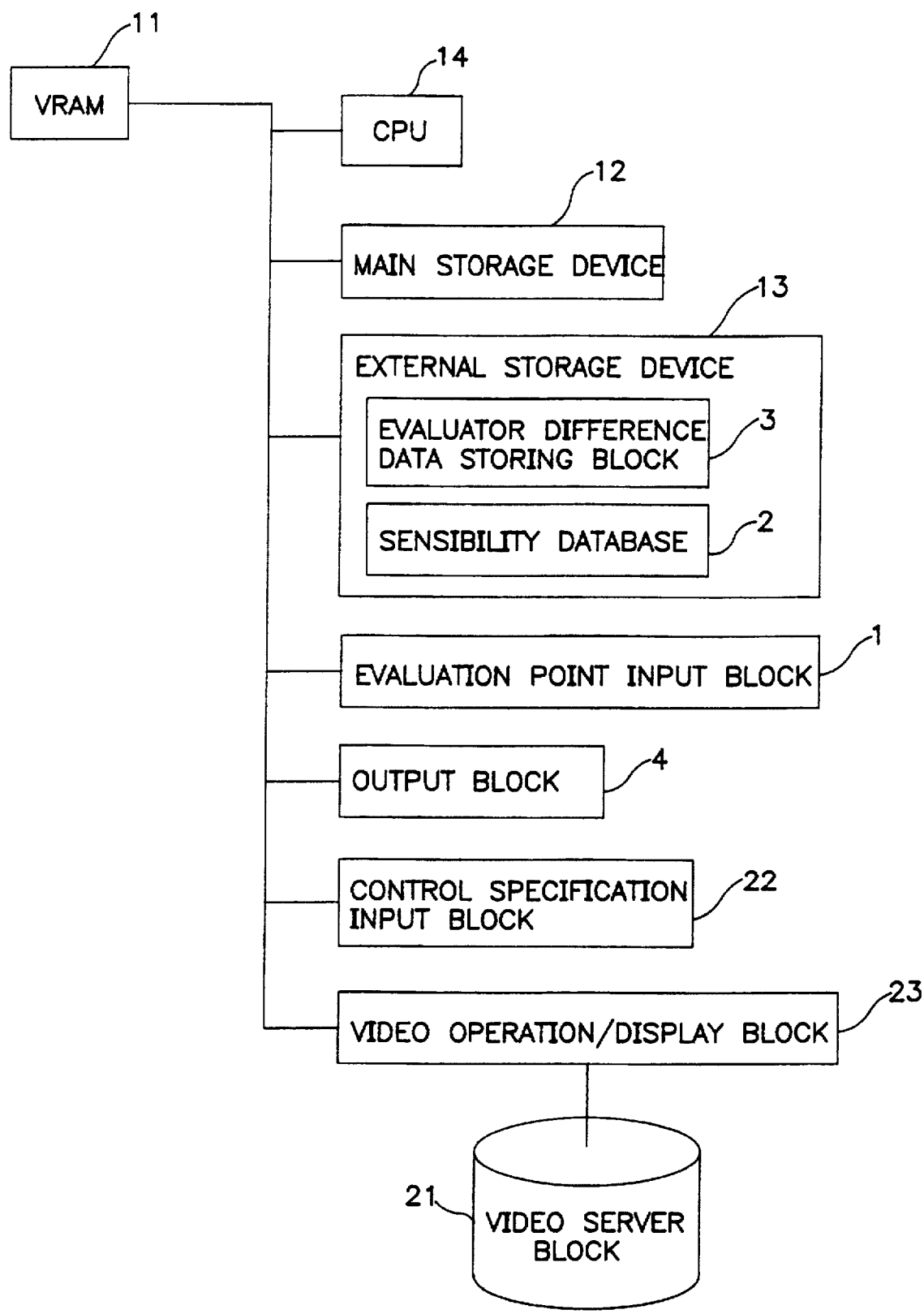
FIG. 9 is another block diagram illustrating the same embodiment.

FIG. 9 is another block diagram illustrating this embodiment, wherein the same blocks as those shown in FIGS. 2 and 8 are designated by the same reference numerals, and explanations of such blocks will not be repeated. The video server block 21 is implemented as a separate block from the external storage device 13, but this may be contained in the external storage device 13.

The operation of this embodiment having the above configuration will be described below with reference to the flowchart of FIG. 10.

Figure 3:
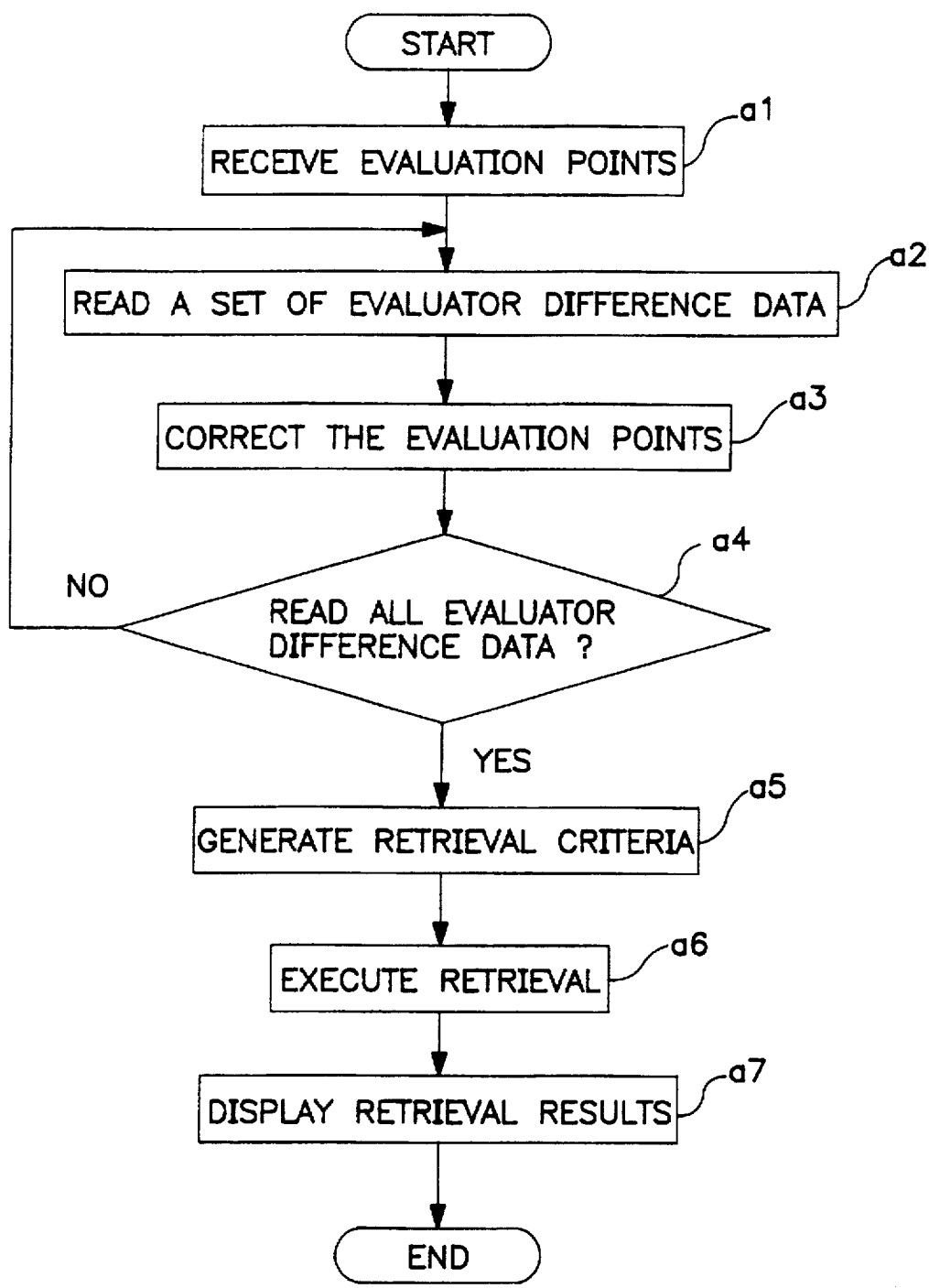
FIG. 3 is a flowchart illustrating the sequence of operations according to the same embodiment.

Steps b1 to b7 perform the same processing as in steps a1 to a7 illustrated in FIG. 3.

Figure 11:
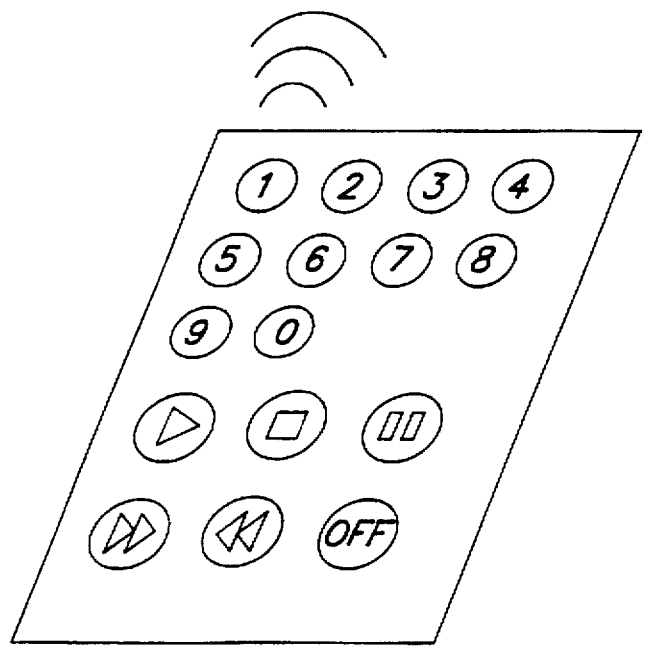
FIG. 11 is a diagram showing an implementation of a control specification input block 32 by a remote controller according to the same embodiment.

In step b8, the control specification input block 22 accepts an input of a video data operation command or display command from the user. For example, when the display shown in FIG. 7 is produced, the user can specify a video title number from the retrieval results and an operation such as fast forward, rewind, or playback, by using a remote controller such as the one shown in FIG. 11 as an example of the control specification input block 22. In this embodiment, the remote controller shown in FIG. 11 is taken as an example of the control specification input block 22, but alternatively, a graphical user interface (GUI) may be displayed on the screen, allowing the user of a pointing device, such as a mouse, joy stick, track ball, etc., for input.

In step b9, the user input accepted in step b8 is checked to determine whether the input means termination. If it means termination, the process shown in the flowchart of FIG. 10 is terminated. Otherwise, the process proceeds to step b10. For example, in the example shown in FIG. 11, pressing the OFF button which means termination is judged as a termination command in step b9.

When the input accepted in step b8 is not a termination command, step b10 is performed to execute the accepted command. The command specifies an operation to be performed on the video data; for example, when the remote controller shown in FIG. 11 is used as the control specification input block 22, the command includes the specification of a video title number and an operation such as playback, stop, fast forward, or pause. The execution of the command is performed using the same control method as employed in conventional AV equipment such as a videotape deck, laser disk player, video CD deck, etc. For example, a disk medium, such as an optical disk, is used as the video server block 21, and video data corresponding to each video title is recorded on a designated track. In this case, data is read from the track corresponding to the video title specified by number in step b8, and the specified control operation is performed in step b10. After performing the operation on the video data in step b10, the process returns to step b8. Step b10 is performed in the video operation/display block 23. An image display apparatus is required to display video data for playback, etc. In this embodiment, the video operation/display block 23 is used for displaying video data. Alternatively, provisions may be made to display video data on the output block 4.

According to this embodiment, video titles can be retrieved based on subjective evaluation criteria. As a result, flexible retrieval based on subjective criteria can be performed to select desired videos in video-on-demand or video rental situations. In this way, as compared to conventional keyword retrieval or the like, even users who have no prior knowledge of video titles can efficiently retrieve desired videos from a large number of videos by just entering subjective evaluation criteria such as MOVING.

Figure 12:
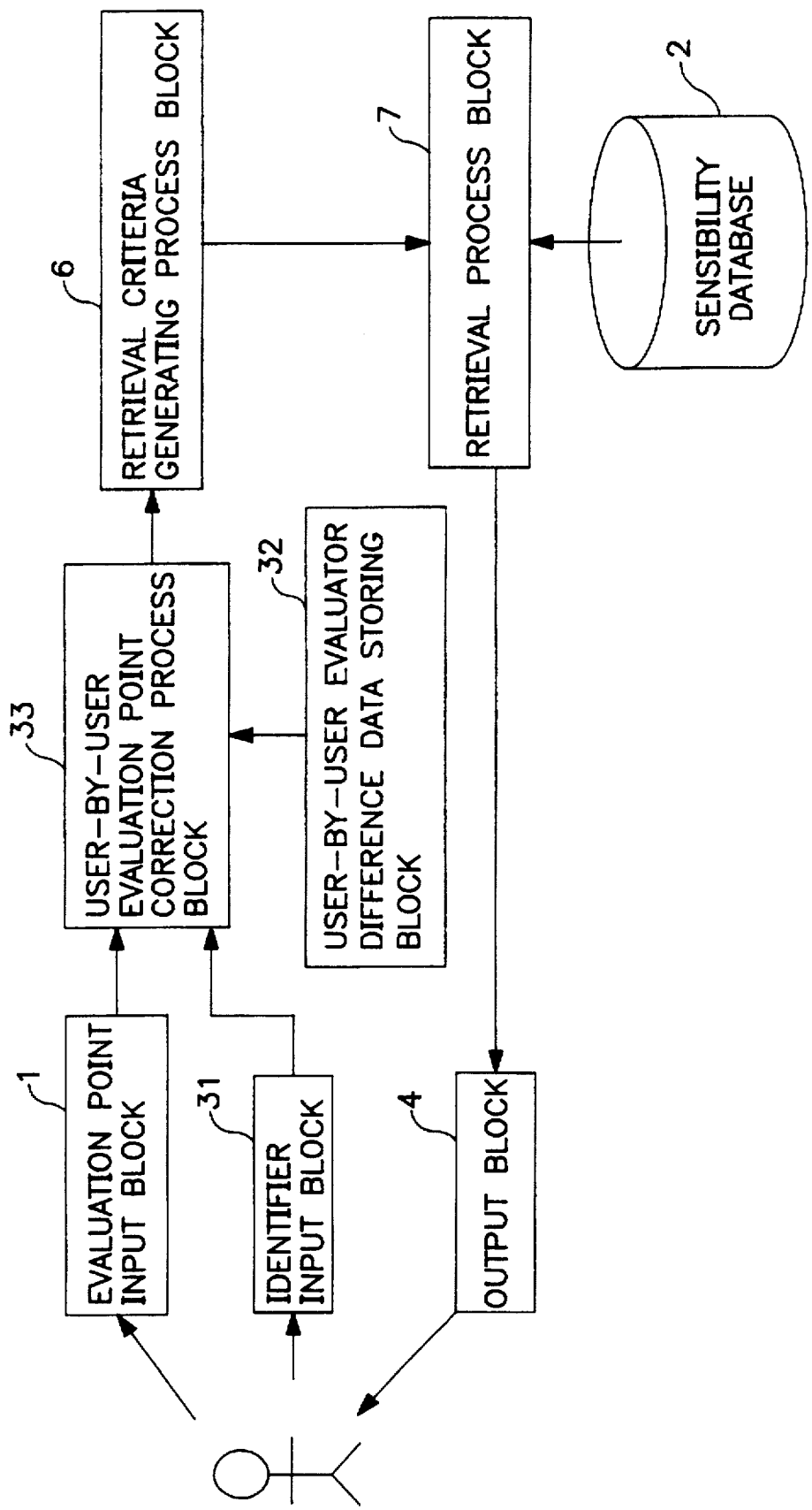
FIG. 12 is a block diagram showing a third embodiment of the data retrieval apparatus according to the present invention.

Referring to FIG. 12, there is shown therein a block diagram showing a third embodiment of the data retrieval apparatus according to the present invention. The same blocks as those shown in FIG. 1 are designated by the same reference numerals, and explanations of such blocks will not be repeated here. Different blocks will be explained below. Reference numeral 31 is an identifier input block for accepting an input of a user identifier for identifying a user from the user; 32 is a user-by-user evaluator difference data storing block for storing on a user-by-user basis evaluator difference data representing differences in evaluation points which differ between evaluators; and 33 is a user-by-user evaluation point correction process block for correcting the user-entered evaluation points, based on the evaluation points and user identifier, and on the evaluator difference data stored in the user-by-user evaluator difference data storing block 32.

With reference to corresponding relationship between each block in this embodiment, which constitute the difference from the configuration of FIG. 1, and each means in the data retrieval apparatus of the present invention, the identifier input block 31 corresponds to user identification means, the user-by-user evaluator difference data storing block 32 corresponds to evaluation gap storing means, and the user-by-user evaluation point correction process block 33 corresponds to selection key correction means.

Figure 13:
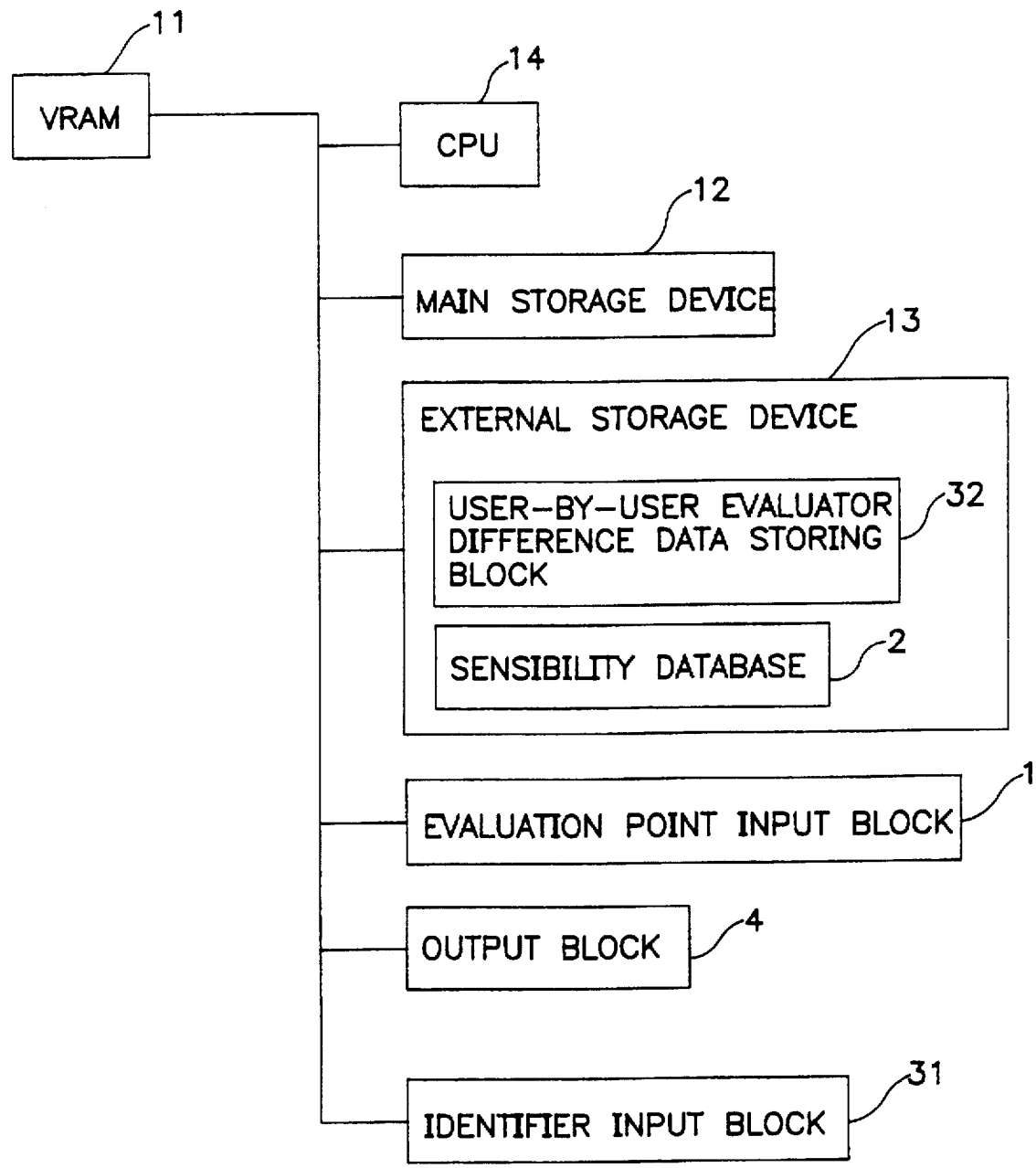
FIG. 13 is another block diagram illustrating the same embodiment.

FIG. 13 is another block diagram illustrating this embodiment, wherein the same blocks as those shown in FIGS. 2 and 12 are designated by the same reference numerals, and explanations of such blocks will not be repeated.

The operation of this embodiment having the above configuration will be described below with reference to the flowchart of FIG. 14.

In step c1, the identifier input section 31 accepts an input of a user identifier. The identifier is input, for example, by keying in a user name from a keyboard. Alternatively, a user identification card may be used which is passed through a reader to read the identifier. Other methods are also possible; for example, in one method, the user enters his identification number, and in another, predefined identifiers are displayed for selection by the user. In this embodiment, a user identifier is selected, using a selection button or a mouse, from among predefined user identifiers, FATHER, MOTHER, MYSELF, etc. as shown in FIG. 15. In the present invention, any of the above-stated methods may be used.

Step c2 performs the same processing as in step a1 in FIG. 3.

In step c3, the processing is fundamentally the same as that performed in step a2 in FIG. 3, except that in step c3 the evaluator difference data is read from the user-by-user evaluator difference data storing block 32. This step reads out only data having the same identifier as the user identifier accepted in step c1. For example, data such as shown in FIG. 16 are stored in the user-by-user evaluator difference data storing block 32. The data structure shown in FIG. 16 is different from that of the evaluator difference data shown in FIG. 5 in that a user identifier attribute field is added. User identifiers {FATHER, MOTHER, MYSELF} are stored in this attribute field. When reading the evaluator difference data in step c3, only data whose value of this attribute field is equal to the user identifier accepted in step c1 are read out. For example, if the user identifier accepted in step c1 is MYSELF, only data whose user identifier value is MYSELF are read out in sequence from the data of FIG. 16.

Step c4 performs the same processing as in step a3 in FIG. 3.

In step c5, the processing is fundamentally the same as that performed in step a4 in FIG. 3. However, as noted in the explanation of step c3, data to be read out in step c3 are only those whose user identifier attribute value is equal to the value accepted in step c1. Therefore, in step c5, whether all the evaluator difference data have been read out is determined by checking whether all the data designated for readout in step c3 have been read out.

Steps c6 to c8 perform the same processing as in steps a5 to a7 in FIG. 3.

According to this embodiment, since the differences from the subjective evaluation criteria of the designated critics whose evaluation points are stored in the database can be processed for each individual user, the same data retrieval apparatus can be shared among a plurality of users to retrieve data based on their own subjective evaluation criteria. This method eliminates the need to provide the data retrieval apparatus for each individual user.

Figure 17:
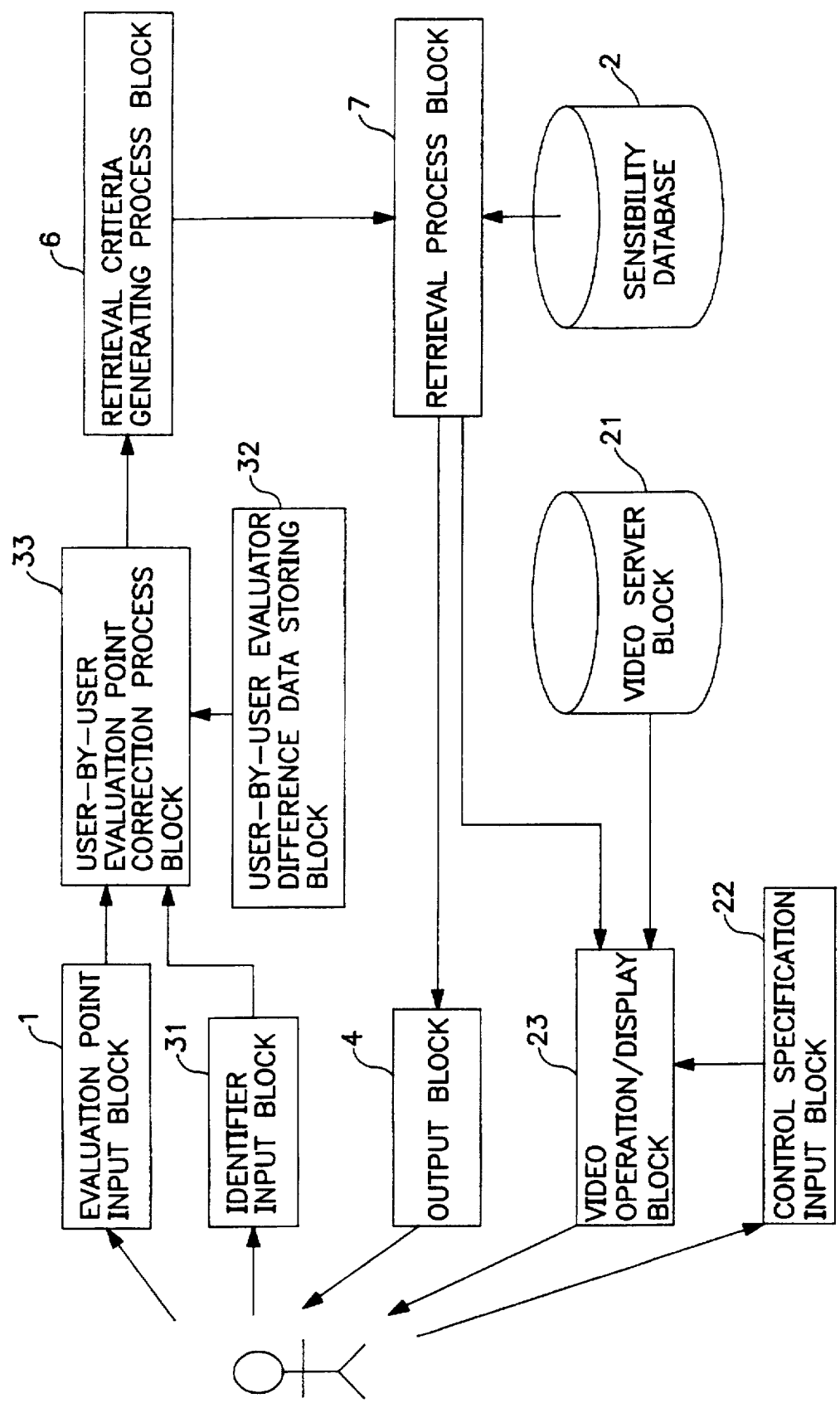
FIG. 17 is a block diagram showing a fourth embodiment of the data retrieval apparatus according to the present invention.

Referring to FIG. 17, there is shown therein a block diagram showing a fourth embodiment of the data retrieval apparatus according to the present invention. The same blocks as those shown in FIGS. 8 and 12 are designated by the same reference numerals, and explanations of such blocks will not be repeated here.

Figure 18:
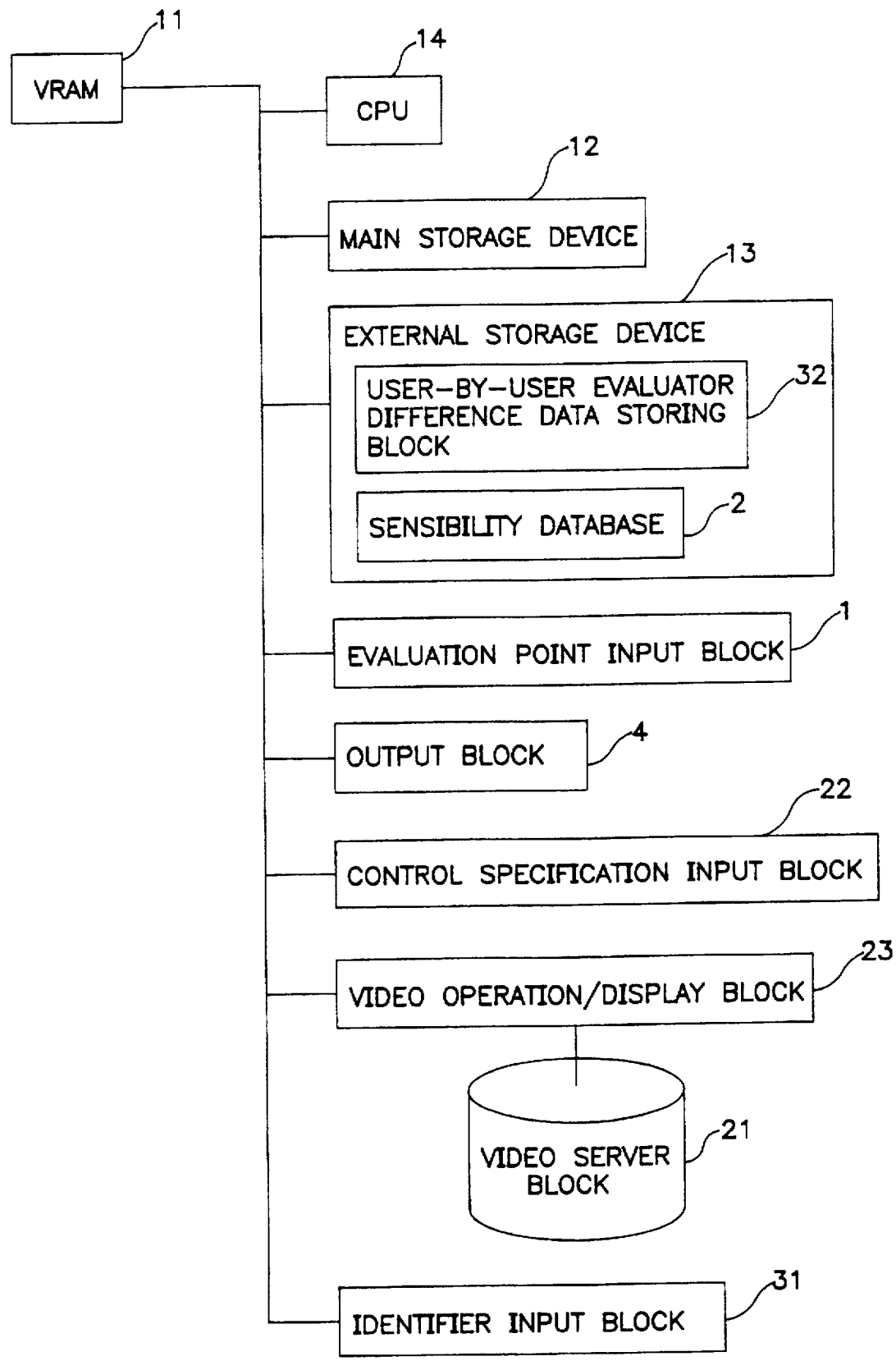
FIG. 18 is another block diagram illustrating the same embodiment.

FIG. 18 is another block diagram illustrating this embodiment, wherein the same blocks as those shown in FIGS. 9 and 17 are designated by the same reference numerals, and explanations of such blocks will not be repeated. The video server block 21 is implemented as a separate block from the external storage device 13, but this may be contained in the external storage device 13.

Figure 19:
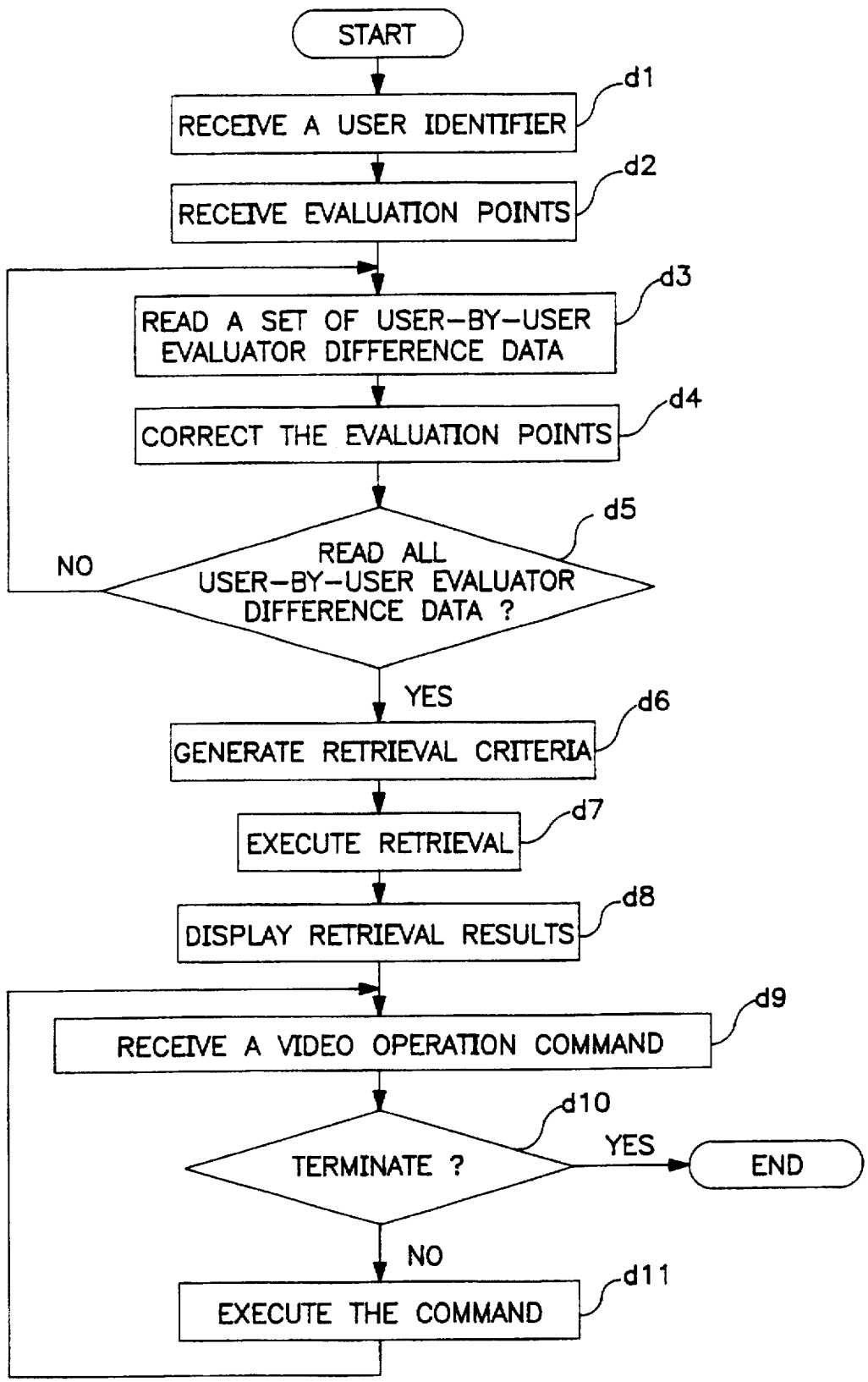
FIG. 19 is a flowchart illustrating the sequence of operations according to the same embodiment.

The operation of this embodiment having the above configuration will be described below with reference to the flowchart of FIG. 19.

Figure 14:
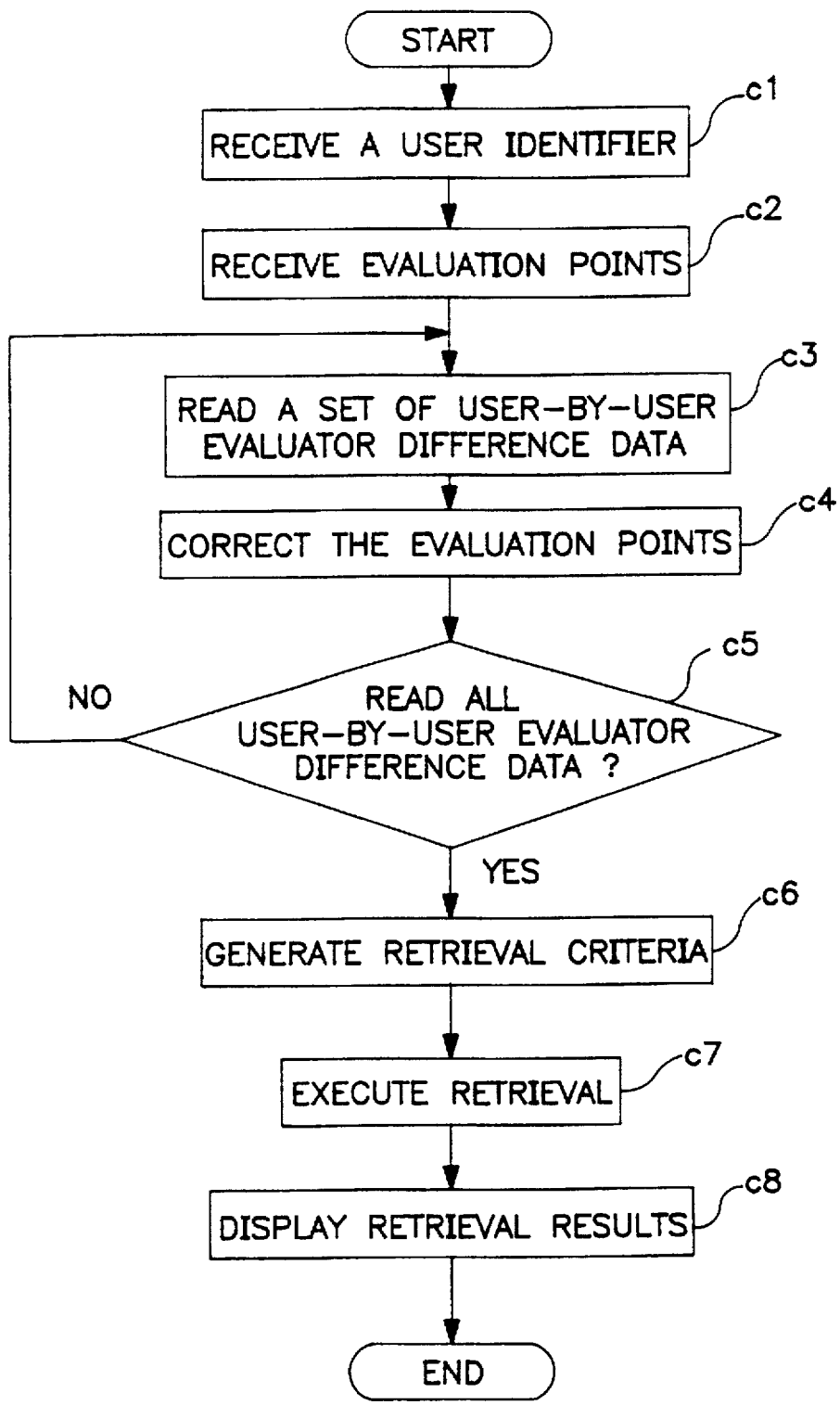
FIG. 14 is a flowchart illustrating the sequence of operations according to the same embodiment.

Steps d1 to d8 perform the same processing as in steps c1 to c8 illustrated in FIG. 14.

Figure 10:
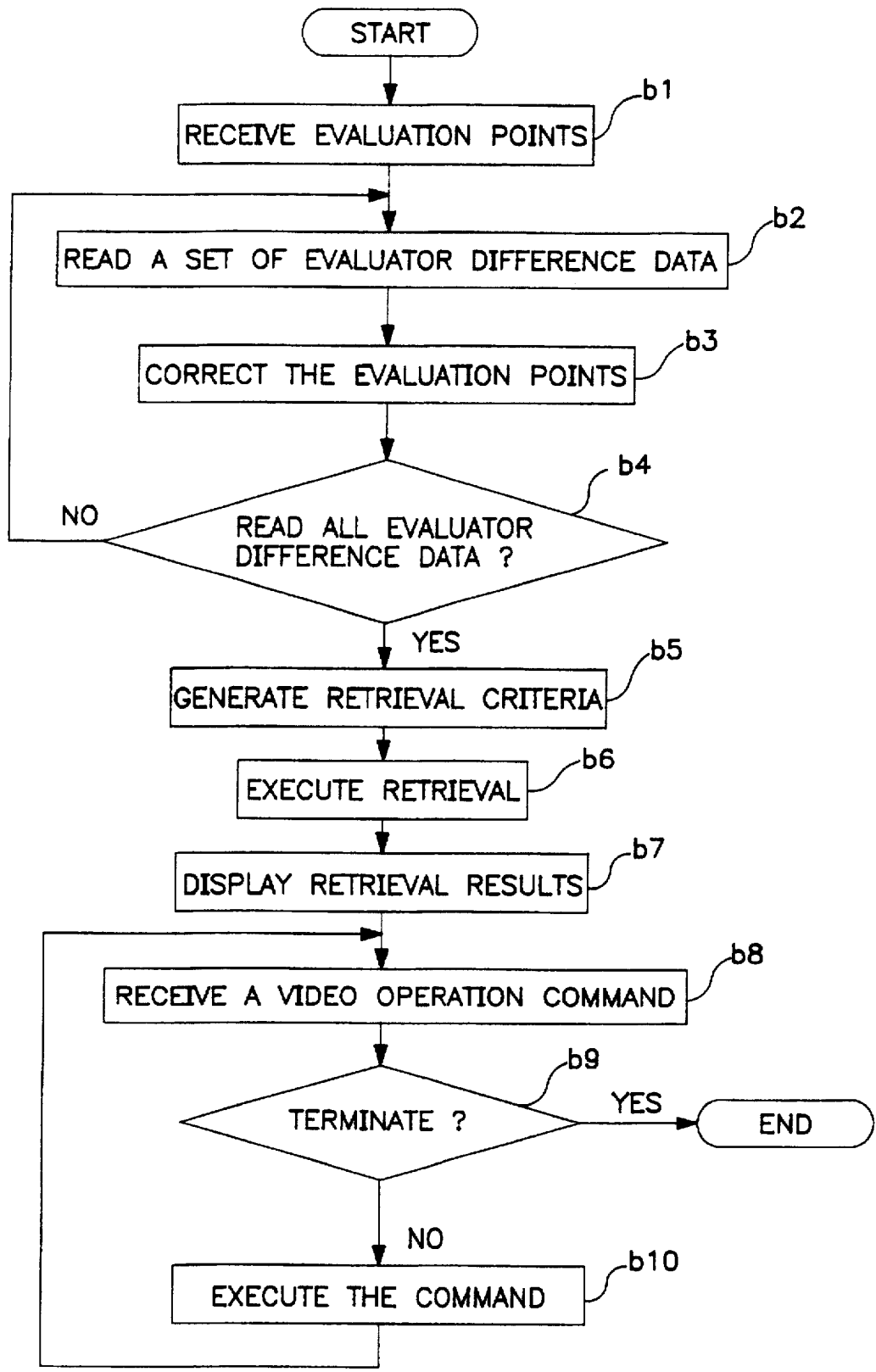
FIG. 10 is a flowchart illustrating the sequence of operations according to the same embodiment.

Steps d9 to d11 perform the same processing as in steps b8 to b10 illustrated in FIG. 10.

According to this embodiment, in a video title retrieval apparatus, the differences from the subjective evaluation criteria of the designated critics whose evaluation points are stored in the data base can be processed for each individual user. Accordingly, when using a video-on-demand terminal in a home, or when installing a video title retrieval apparatus in a video rental store or the like for use by many users, for example, there is no need to provide as many apparatus as there are users.

Figure 20:
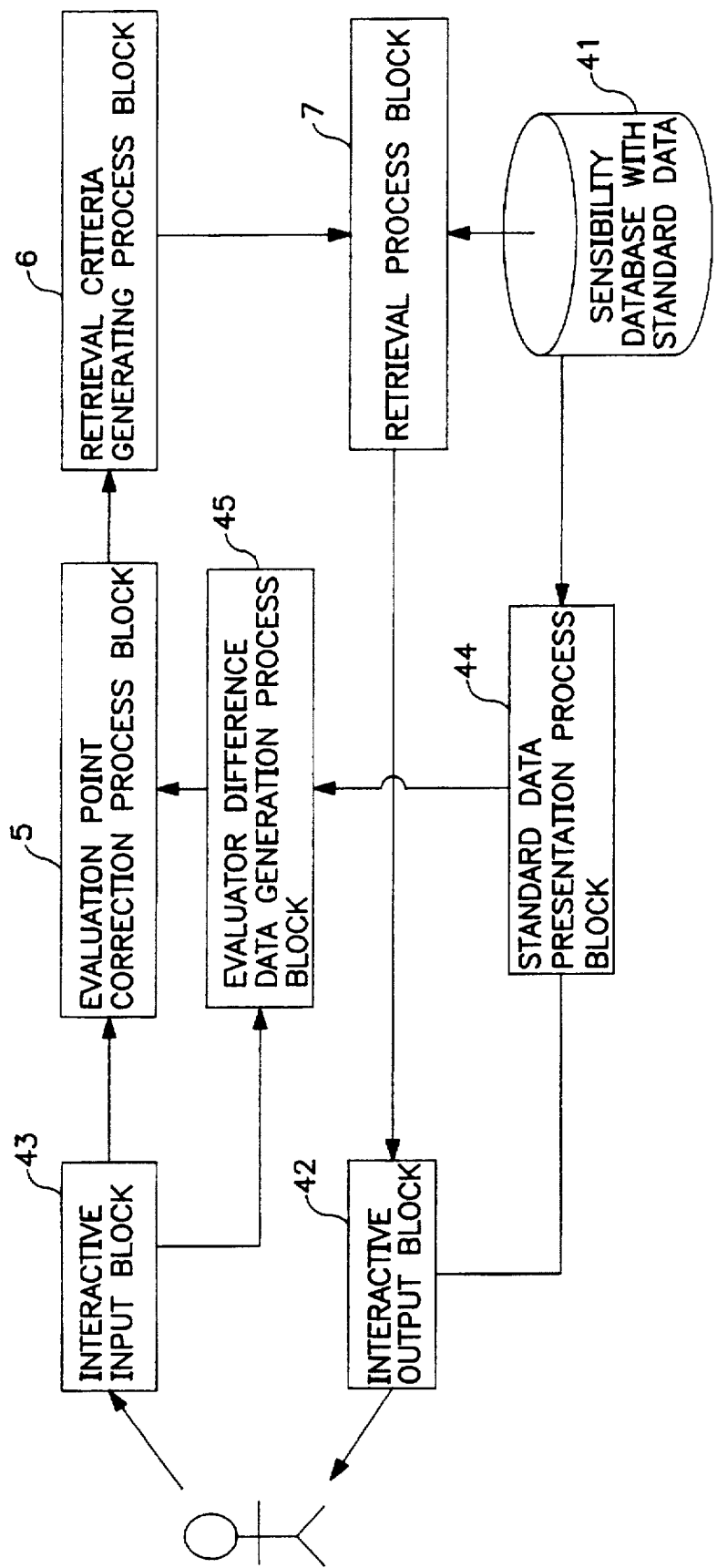
FIG. 20 is a block diagram showing a fifth embodiment of the data retrieval apparatus according to the present invention.

Referring to FIG. 20, there is shown therein a block diagram showing a fifth embodiment of the data retrieval apparatus according to the present invention. The same blocks as those shown in FIG. 1 are designated by the same reference numerals, and explanations of such blocks will not be repeated here. Reference numeral 41 is a sensibility database with standard data for storing data paired with an evaluator identifier and evaluation points, and for storing a prescribed number of stored data pairs as standard data; 42 is an interactive output block for displaying retrieval results or standard data; 43 is an interactive input block for accepting an input of evaluation points that the data to be retrieved should satisfy or an input of evaluation points on standard data; 44 is a standard data presentation process block for presenting the user with standard data stored in the sensibility database with standard data 41; and 45 is an evaluator difference data generation process block for generating evaluator difference data representing differences in evaluation points which differ between evaluators, based on the evaluation points entered against the presented standard data.

With reference to corresponding relationship between each block in this embodiment, which constitute the difference from the configuration of FIG. 1, and each means in the data retrieval apparatus of the present invention, the sensibility database with standard data 41 corresponds to storing means, the interactive output block 42 and standard data presentation process block 44 both correspond to name display means, the interactive input block 43 corresponds to evaluation receiving means, and the evaluator difference data generation process block 45 corresponds to evaluation gap generating means.

Figure 21:
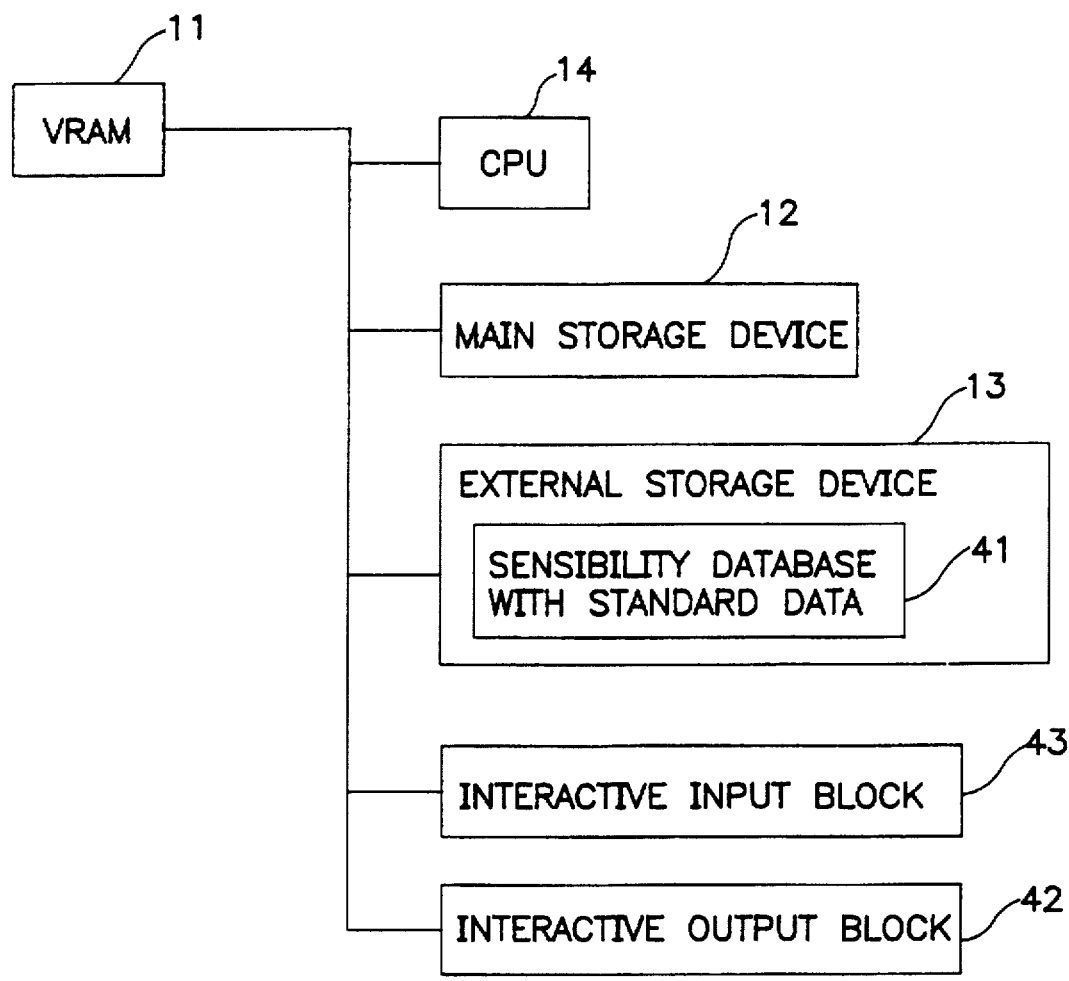
FIG. 21 is another block diagram illustrating the same embodiment.

FIG. 21 is another block diagram illustrating this embodiment, wherein the same blocks as those shown in FIGS. 2 and 20 are designated by the same reference numerals, and explanations of such blocks will not be repeated.

The operation of this embodiment having the above configuration will be described below with reference to the flowchart of FIG. 22.

In step e1, standard data stored in the sensibility database with standard data 41 are displayed on the interactive output block 42. In the sensibility database with standard data 41, a prescribed number of standard data sets are stored in a manner distinguishable from other data. For example, consider the database shown in FIG. 23. In this database, data whose "standard data" attribute is 1 is standard data. For the standard data, all the evaluators entered in the database give their own evaluation points for storage in the database. For example, if there are three evaluators, e1 to e3, entered in the database, for the standard data all the three evaluators give their own evaluation points for storage in the database. In step e1, all the standard data are extracted from a sensibility database with standard data 41 similar to the one shown in FIG. 23, and the evaluation points for the words expressing sensibilities (ENCOURAGING, MOVING, ENCHANTING, DELIGHTING, GORGEOUS, EXCITED) and the "standard data" attribute value identifying the standard data are removed from the data to be presented. The thus extracted standard data are stored in the main storage device 12 for subsequent use in step e3. For example, in the case of the database of FIG. 23, only the attributes "title name" and "leading actor" will be displayed on the interactive output block 42. In displaying the data, only one set of data is selected for display from the same kind of data. That is, in the database, since all the evaluators give their evaluation points for the standard data, for the same video title there are as many data as there are evaluators in the case of the standard data, as shown in the example of FIG. 23. If such data carrying the same "title name" and "leading actor" are all displayed, the number of displayed data will increase unnecessarily; therefore, only one set of data is selected for display from the same kind of data. From the database of FIG. 23, for example, {(S1, A2), (S2, A1), (S3, A5), (S4, A7), (S5, A4)} are displayed as standard data. An example of the display is shown in FIG. 24.

Figure 4:
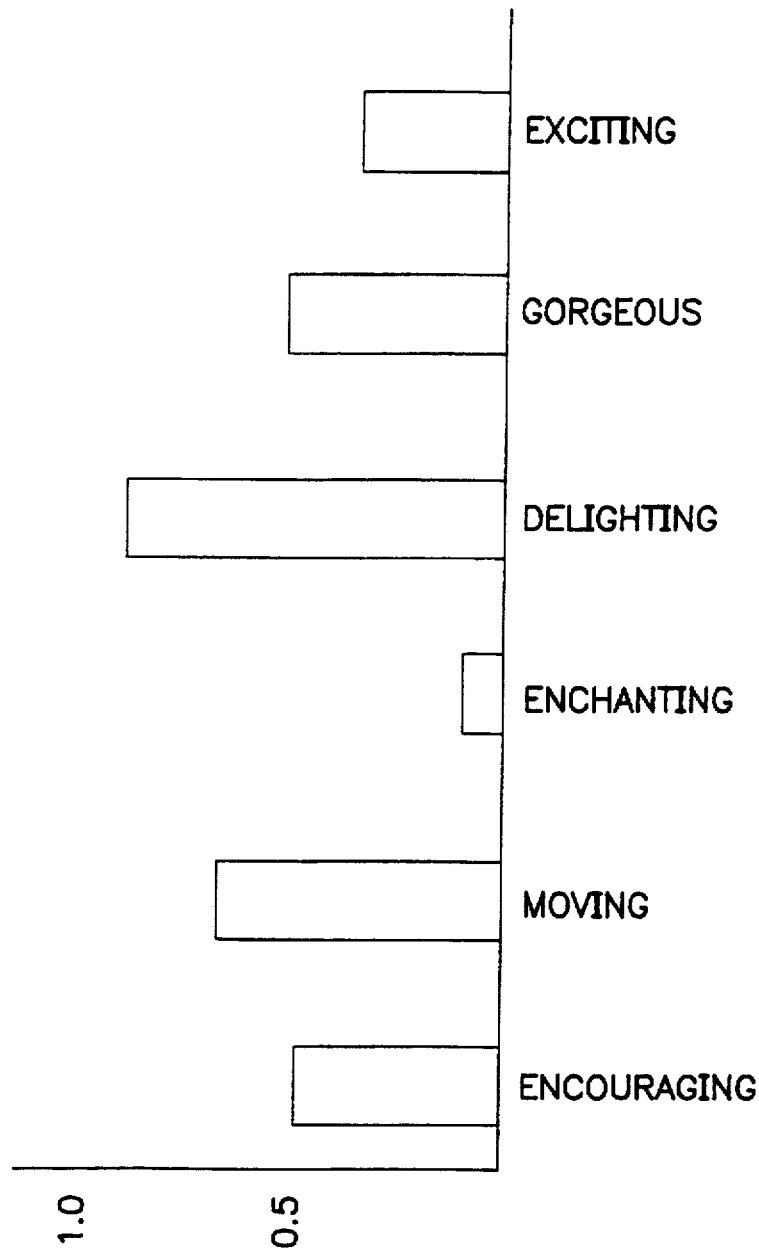
FIG. 4 is a histogram showing an example of an evaluation point input screen according to the same embodiment.

In step e2, the user enters his evaluation values for the standard data displayed in step e1. In the case of the display of FIG. 24, for example, the user enters his evaluation points for the words expressing sensibilities (ENCOURAGING, MOVING, ENCHANTING, DELIGHTING, GORGEOUS, EXCITED) for each set of data. Each evaluation point is entered from a numeric keypad or the like, using numeric values between 0 and 1. The evaluation points may be input in other ways, such as shown in FIG. 4.

In step e3, evaluator difference data is generated using the evaluation points entered in step e2 and the standard data stored in the main storage device in step e1. In a specific method of difference data generation, "(evaluator's evaluation points)−(evaluation points entered in step e2)" is calculated for each standard data for all the evaluators. For example, suppose that, for standard data (title name, leading actor)=(S1, A2) in the sensibility database with standard data shown in FIG. 23, the user entered (0.7, 0.8, 0.4, 0.7, 0.2, 0.5) as evaluation points for (ENCOURAGING, MOVING, ENCHANTING, DELIGHTING, GORGEOUS, EXCITED) on the input screen shown in FIG. 24. In this case, if "(evaluator's evaluation points)−(evaluation points entered in step e2)" is calculated for the evaluator e2, the result will be (0.8, 0.8, 0.3, 0.8, 0.2, 0.6)−(0.7, 0.8, 0.4, 0.7, 0.2, 0.5)=(+0.1, 0, −0.1, +0.1, 0, +0.1). For the evaluator e1, the same calculation is performed on the other standard data S2, S3, S4, and S5. Then, the average of the values thus calculated for the respective standard data is calculated for each evaluator, and the resulting data is combined with the evaluator identifier, thus generating the evaluator difference data. For example, when the values obtained by performing the calculation "(evaluator's evaluation points)−(evaluation points entered in step e2)" on the standard data S1, S2, S3, S4, and S5 for the evaluator e1 are {(+0.1, 0, −0.1, +0.1, 0, +0.1), (0, 0, −0.1, +0.2, 0, +0.1), (+0.1, +0.1, 0, +0.1, 0, −0.1), (0, 0, −0.2, −0.1, 0, +0.2), (+0.1, +0.2, +0.1, +0.1, +0.2, +0.1)}, the average of these values is calculated and combined with the evaluator identifier, producing (e1, +0.06, +0.06, −0.06, +0.08, +0.04, +0.08) as the evaluator difference data for the evaluator e1. Evaluator difference data are calculated for all the evaluators in the above manner.

Steps e4 to e10 perform the same processing as in steps a1 to a7 illustrated in FIG. 3, except that in step e6 the processing is performed on the evaluator difference data generated in step e3.

According to this embodiment, when performing data retrieval by considering the differences in subjective evaluation criteria between the user and designated critics, there is no need to prestore the differences in subjective evaluation criteria as data. This permits an unspecified number of users to use the same apparatus for data retrieval based on their subjective evaluation criteria.

Figure 25:
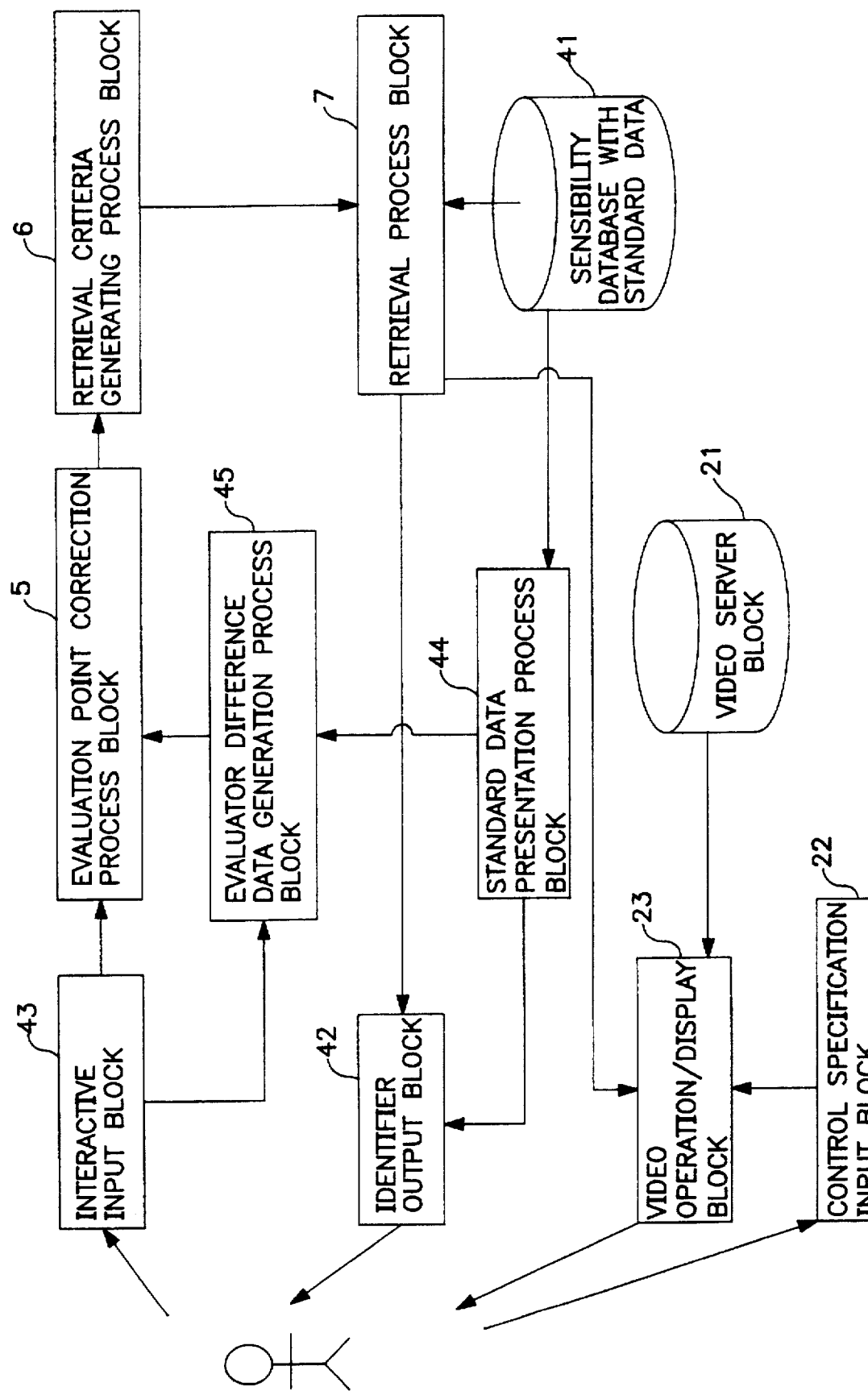
FIG. 25 is a block diagram showing a sixth embodiment of the data retrieval apparatus according to the present invention.

Referring to FIG. 25, there is shown therein a block diagram showing a sixth embodiment of the data retrieval apparatus according to the present invention. The same blocks as those shown in FIGS. 20 and 8 are designated by the same reference numerals, and explanations of such blocks will not be repeated here. In the second embodiment of the data retrieval apparatus of the invention, however, the video server block 21 stores video data whose video title data are stored in the sensibility database 2, but in the sixth embodiment, the video server block 2 stores video data whose video title data are stored in the sensibility database with standard data 41.

Figure 26:
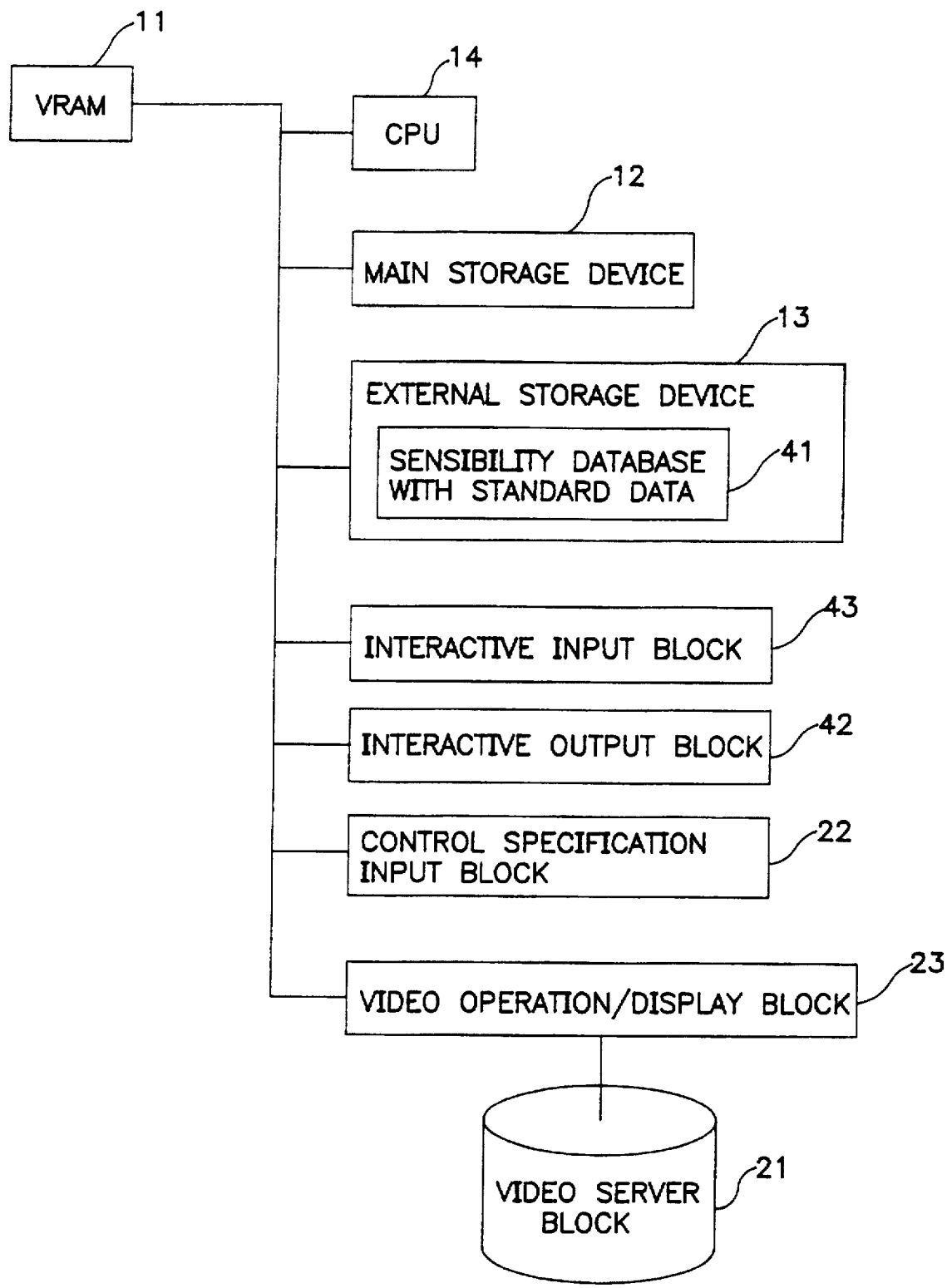
FIG. 26 is another block diagram illustrating the same embodiment.

FIG. 26 is another block diagram illustrating this embodiment, wherein the same blocks as those shown in FIGS. 21 and 25 are designated by the same reference numerals, and explanations of such blocks will not be repeated. The video server block 21 is implemented as a separate block from the external storage device 13, but this may be contained in the external storage device 13.

Figure 27:
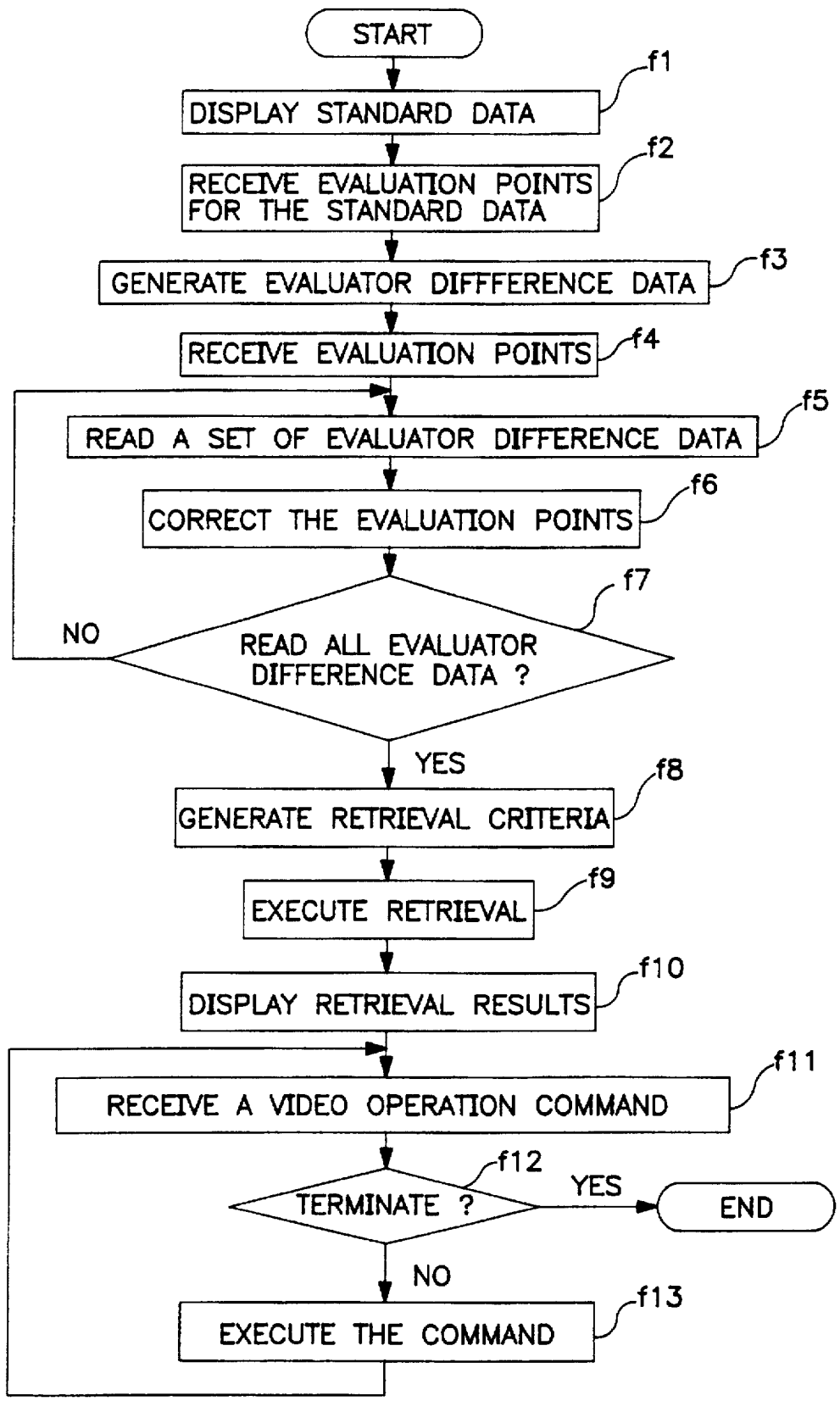
FIG. 27 is a flowchart illustrating the sequence of operations according to the same embodiment.

The operation of this embodiment having the above configuration will be described below with reference to the flowchart of FIG. 27.

Figure 22:
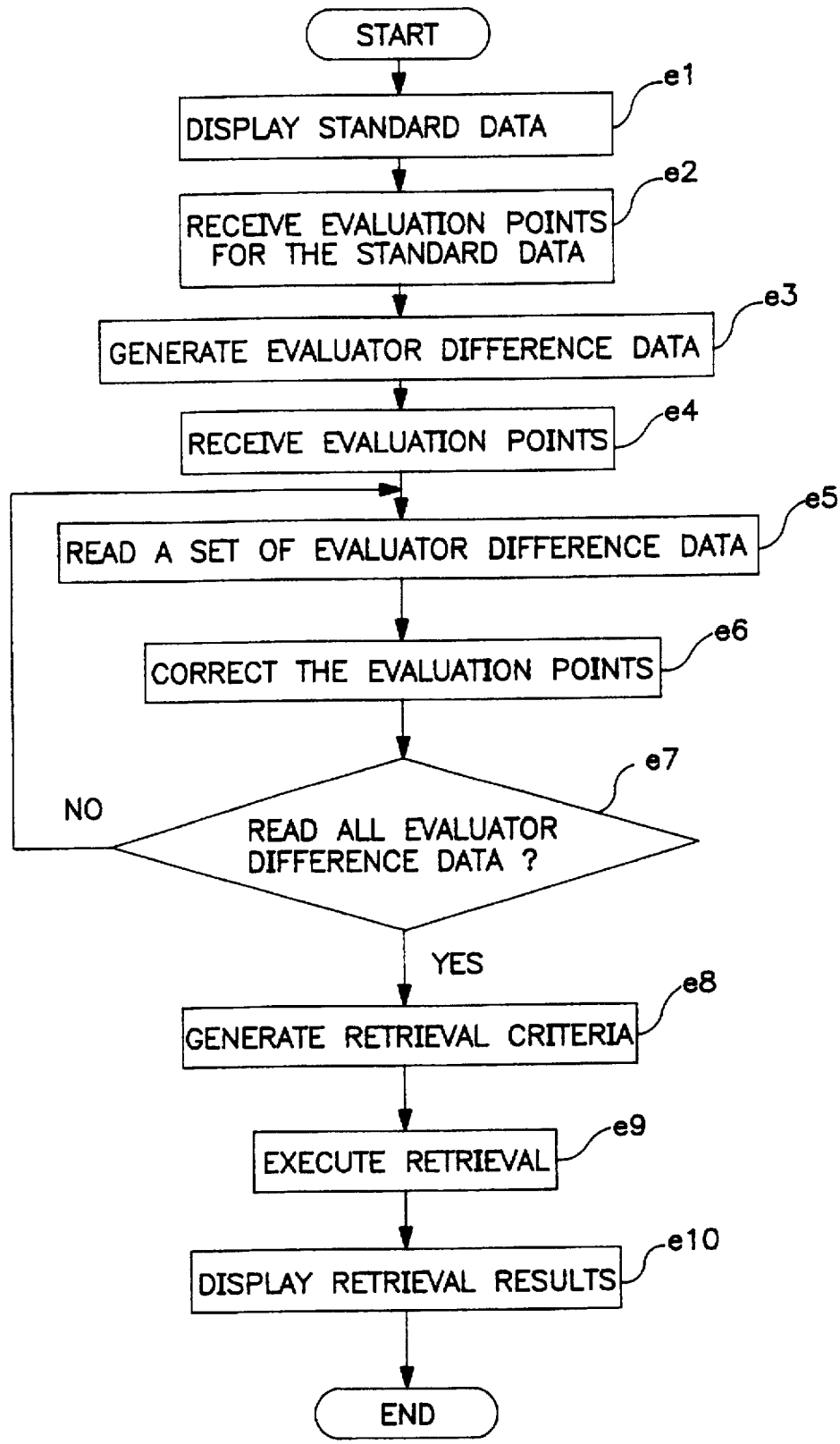
FIG. 22 is a flowchart illustrating the sequence of operations according to the same embodiment.

Steps f1 to f10 perform the same processing as in steps e1 to e10 illustrated in FIG. 22.

Steps f11 to f13 perform the same processing as in steps b8 to b10 illustrated in FIG. 10.

According to this embodiment, a video title retrieval apparatus, capable of performing video title retrieval based on user subjective evaluation criteria and considering differences in criteria between users, can be provided for use in a video sale store or rental store where unspecified users are expected to use the apparatus.

Figure 28:
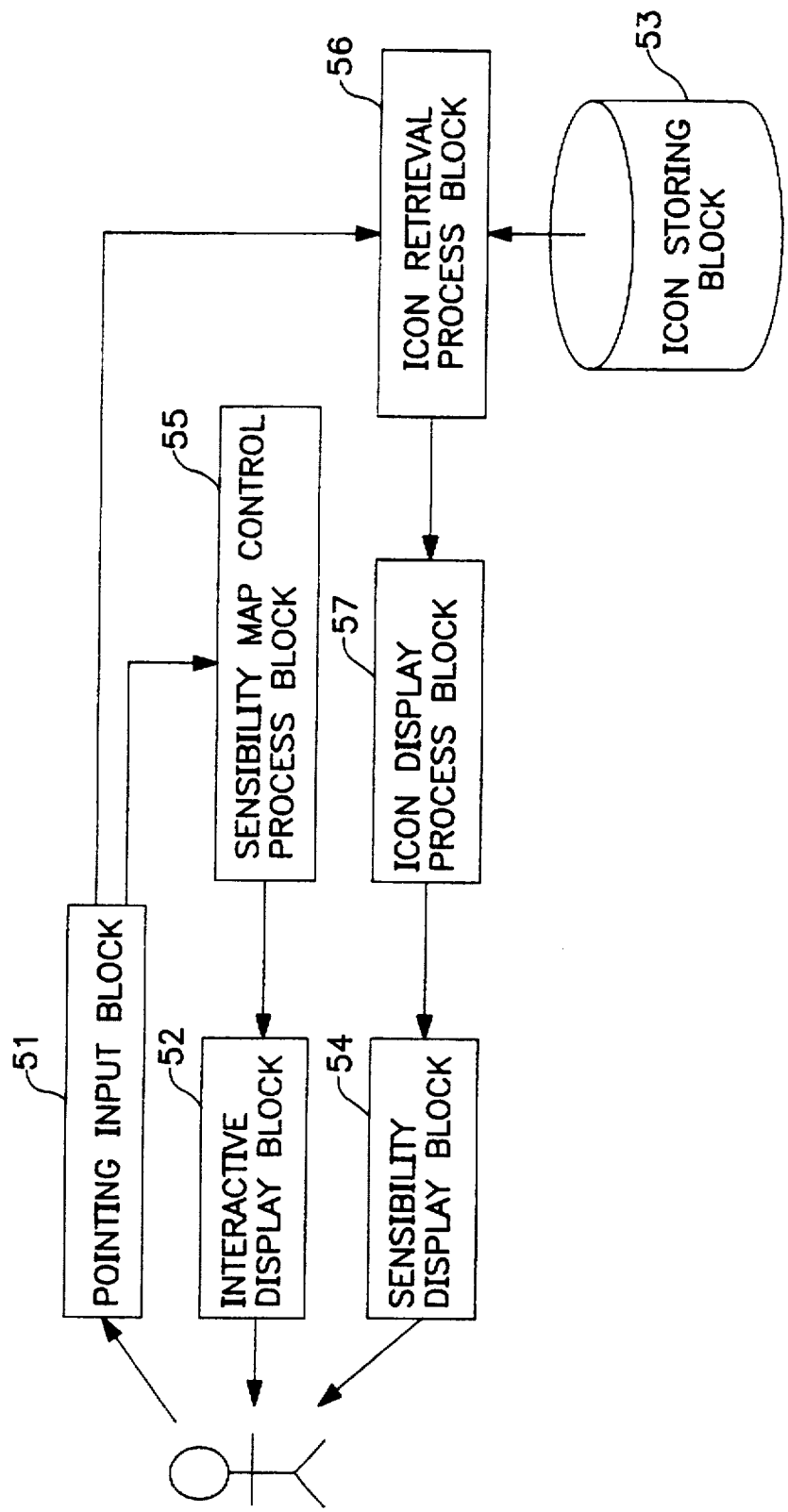
FIG. 28 is a block diagram showing one embodiment of an evaluation entry apparatus and a sensibility entry apparatus according to the present invention.

Referring to FIG. 28, there is shown therein a block diagram showing a first embodiment of the evaluation entry apparatus and sensibility entry apparatus according to the present invention. In FIG. 28, reference numeral 51 is a pointing input block for a user to specify a movement of an object on screen; 52 is an interactive display block for displaying graphic containing the movable object; 53 is an icon storing block for storing a plurality of icons as graphical symbols for communicating sensibility to the user; 54 is a sensibility display block for displaying one of the icons; 55 is a sensibility map control process block for repositioning the object displayed on the interactive display block 52 in accordance with the specification of the movement input from the pointing input block 51; 56 is an icon retrieval process block for retrieving an appropriate icon from the icon storing block 53 on the basis of the position of the object; and 57 is an icon display process block for displaying on the sensibility display block 54 the icon retrieved by the icon retrieval process block 56.

With reference to corresponding relationship between each block in FIG. 28 and each means in the evaluation entry apparatus of the present invention, the pointing input block 51 corresponds to pointing input means, the interactive display block 52 and the sensibility map control process block 55 both correspond to evaluation region display means, the icon storing block 53 corresponds to icon storing means, the icon retrieval process block 56 corresponds to icon selecting means, and the sensibility display block 54 and the icon display process block 57 both correspond to icon display means.

Further, with reference to corresponding relationship between each block in FIG. 28 and each means in the sensibility entry apparatus of the present invention, the pointing input block 51 corresponds to pointing input means, and the interactive display block 52 corresponds to sensibility input display means.

Furthermore, with reference to corresponding relationship between each block in FIG. 28 and each means in the data retrieval apparatus of the present invention, the pointing input block 51 corresponds to pointing input means, the interactive display block 52 and the sensibility map control process block 55 both correspond to evaluation region display means, the icon storing block 53 corresponds to icon storing means, the icon retrieval process block 56 corresponds to icon selecting means, and the sensibility display block 54 and the icon display process block 57 both correspond to icon display means.

Figure 29:
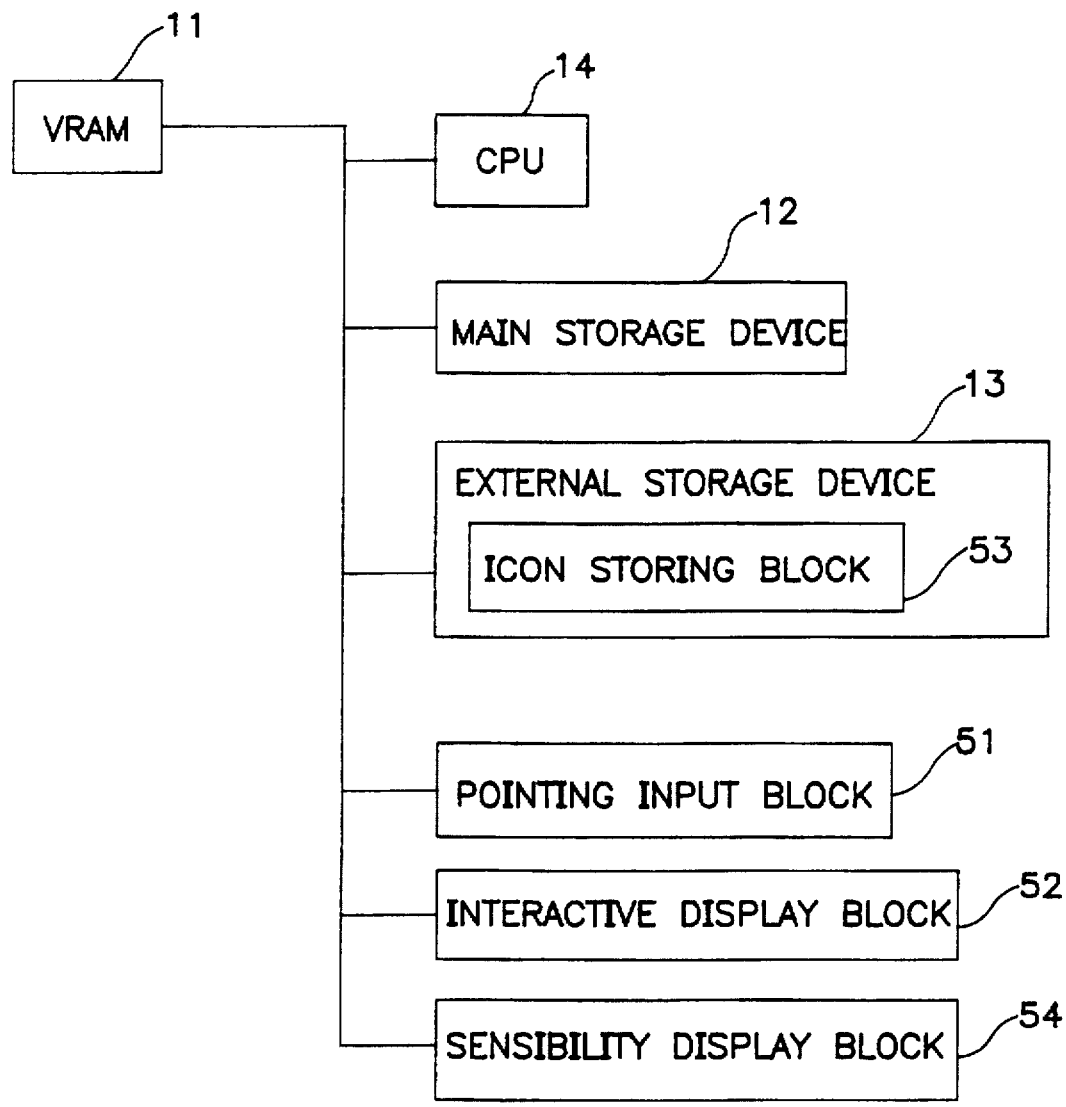
FIG. 29 is another block diagram illustrating the same embodiment.

FIG. 29 is another block diagram illustrating this embodiment, wherein the same blocks as those shown in FIGS. 2 and 28 are designated by the same reference numerals, and explanations of such blocks will not be repeated.

The operation of this embodiment having the above configuration will be described below with reference to the flowchart of FIG. 30.

Figure 31:
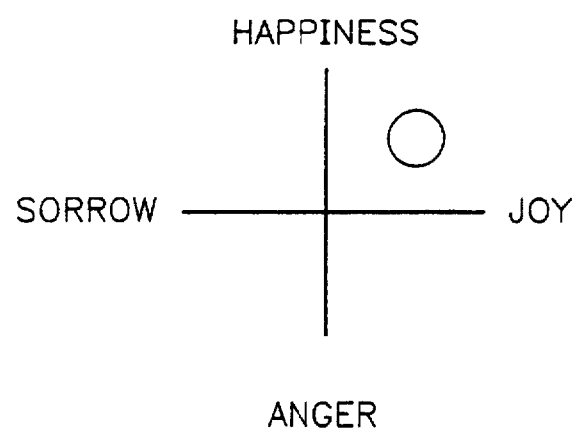
FIG. 31 is a diagram showing an example of a sensibility input screen according to the same embodiment.

In step g1, the graphic with words expressing sensibilities arranged thereon is displayed on the interactive display block 52. The graphic to be displayed here is predetermined one; an example is shown in FIG. 31. The graph shows a two-dimensional coordinate plane, with words SORROW and JOY disposed at both ends of the x-axis and words HAPPINESS and ANGER at both ends of the y-axis. The user can operate the pointing input block 51 to move the object on the graph. In FIG. 31, the object is represented by a black solid circle.

Figure 32:
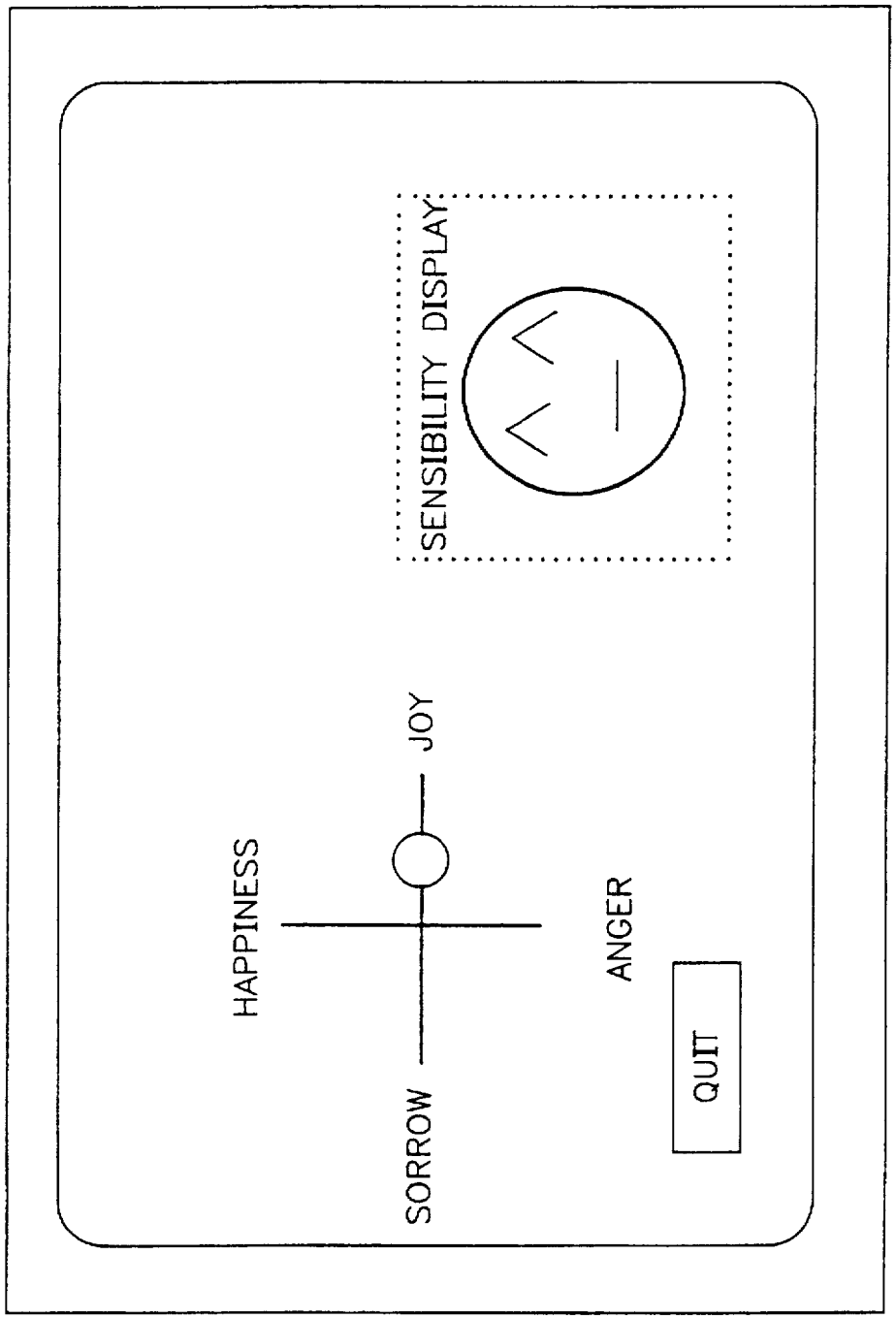
FIG. 32 is a diagram showing an example of a sensibility input screen according to the same embodiment.

In step g2, an input from the user is accepted by the pointing input block 51. This step waits for the occurrence of an input from the user. In this embodiment, the graphic such as the one shown in FIG. 32 is displayed on the interactive display block 52. The user uses a mouse to drag the object across the screen and to select an on-screen button "Quit" designating the end of an input operation. This embodiment assumes the use of a mouse as the pointing input block 51, but it will be appreciated that another type of pointing device, such as a trackball, touch panel, or joystick, may be used.

In step g3, it is determined whether the operation accepted in step g2 means the end of an input operation. If it means the end of an input, the process is terminated; otherwise, the process proceeds to step g4. For example, when the screen shown in FIG. 32 is displayed on the interactive display block 52, if the user selects the "Quit" button designating the end of an input operation, it is determined that the user has performed an operation to end the input, and the process is terminated accordingly. In FIG. 32, the interactive display block 52 and the sensibility display block 54 are implemented on the same display, but these may be implemented using different devices. For example, the interactive display block 52 may be implemented on a small-size liquid crystal display having a tablet which the user can touch with a finger or a pen for pointing, and the sensibility display block 54 may be implemented on a large-screen television receiver.

Step g4 is performed when the user operation means a movement of the object, not the end of an input. In this step, in accordance with the user operation the object is repositioned on the screen, while calculating the position of the object. For example, when the object indicated by the black solid circle is repositioned on the screen shown in FIG. 32, the x, y coordinates in the two-dimensional coordinate plane are calculated. The coordinate values vary within a predetermined range. For example, for HAPPINESS, ANGER, SORROW, and JOY, the coordinate range is set from −1 to 1. In the example of FIG. 32, the object is located at an intermediate point along the JOY axis, its x-coordinate being 0.5 and y-coordinate 0.

In step g5, an icon is retrieved based on the coordinate values calculated in step g4. In the icon storing block 53, icons are stored each together with x- and y-coordinate ranges. For example, data as shown in FIG. 33 are stored. In icon retrieval, retrieval is made for icon data where the x-coordinate is larger than the attribute value of XL but not larger than the attribute value of XH and the y-coordinate is larger than the attribute value of YL but not larger than the attribute value of YH. In FIG. 33, the icon data are shown as line drawings to facilitate understanding, but in actuality, bit-mapped data representing the icons are stored. Further, when the x and y coordinates are −1, retrieval is conducted using retrieval criteria stating that the x-coordinate is not smaller than the attribute value of XL and not larger than the attribute value of XH and that the y-coordinate is not smaller than the attribute value of YL and not larger than the attribute value of YH.

Figure 34:
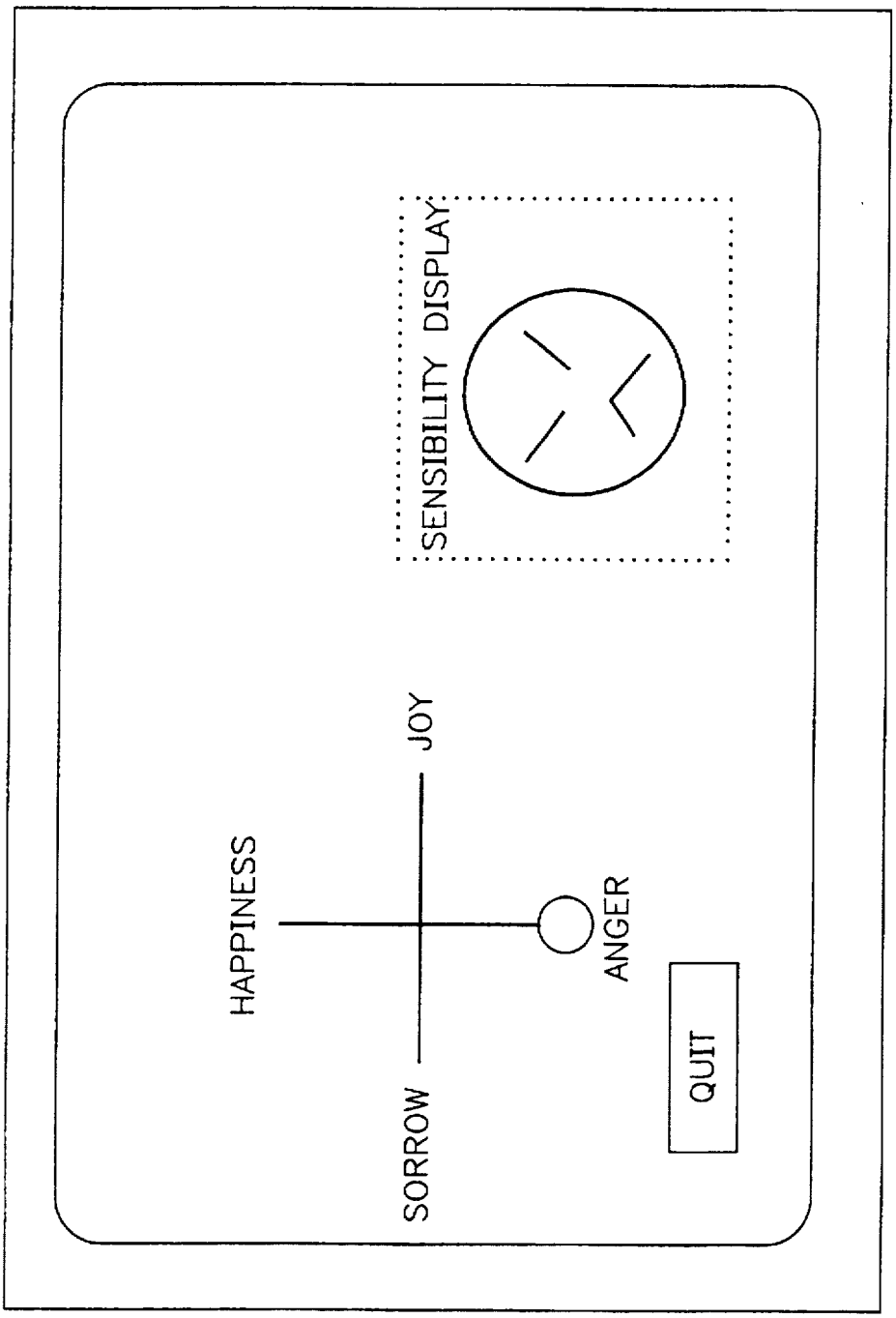
FIG. 34 is a diagram showing an example of a sensibility input screen according to the same embodiment.

In step g6, the icon data retrieved in step g5 is displayed on the sensibility display block 54. An example of the display is shown in FIG. 34. FIG. 34 shows the display after the user moved the object on the screen of FIG. 32; as shown, the icon shown on the sensibility display block is changed.

According to this embodiment, a user interface easy to understand intuitively can be presented by using words expressing sensibilities in combination with an icon when the user enters his subjective evaluation criteria.

Figure 35:
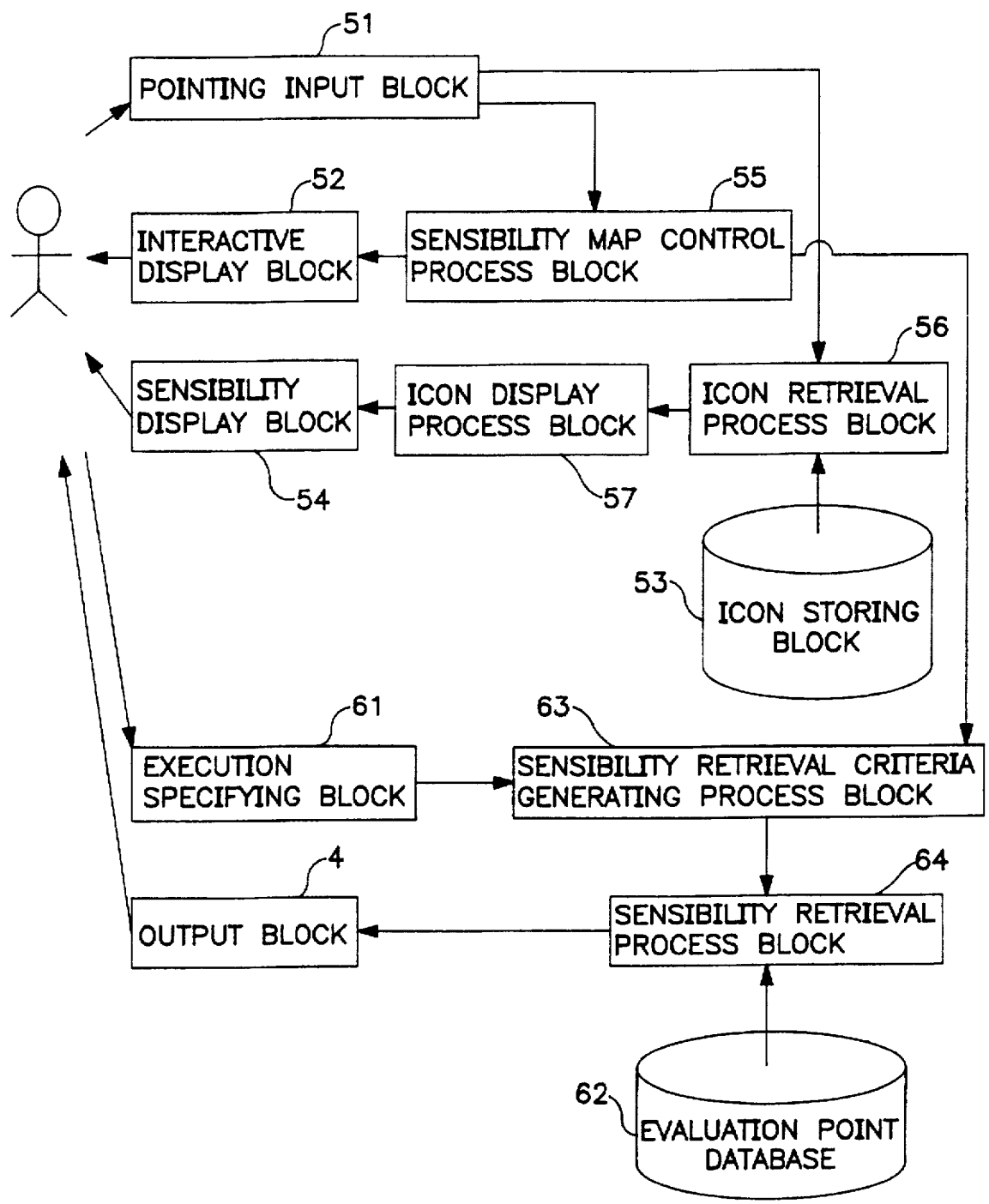
FIG. 35 is a block diagram showing a seventh embodiment of the data retrieval apparatus according to the present invention.

Referring to FIG. 35, there is shown therein a block diagram showing a seventh embodiment of the data retrieval apparatus according to the present invention. The same blocks as those shown in FIG. 28 are designated by the same reference numerals, and explanations of such blocks will not be repeated here. Reference numeral 61 is an execution specifying block for accepting an input from the user specifying the execution of retrieval operation; 62 is an evaluation point database for storing data paired with evaluation points; 63 is a sensibility retrieval criteria generating process block for generating retrieval criteria based on the position of the object; and 64 is a sensibility retrieval process block for retrieving the evaluation point database 62 using the generated retrieval criteria, and for displaying the results of the retrieval on the output block 4.

With reference to corresponding relationship between each block in this embodiment shown in FIG. 35, which constitute the difference from the configuration of FIG. 28, and each means in the data retrieval apparatus of the present invention, the evaluation point database 62 corresponds to storing means, the sensibility retrieval criteria generating process block 63 corresponds to retrieval criteria generating means, and the sensibility retrieval process block 64 corresponds to retrieving means.

Figure 36:
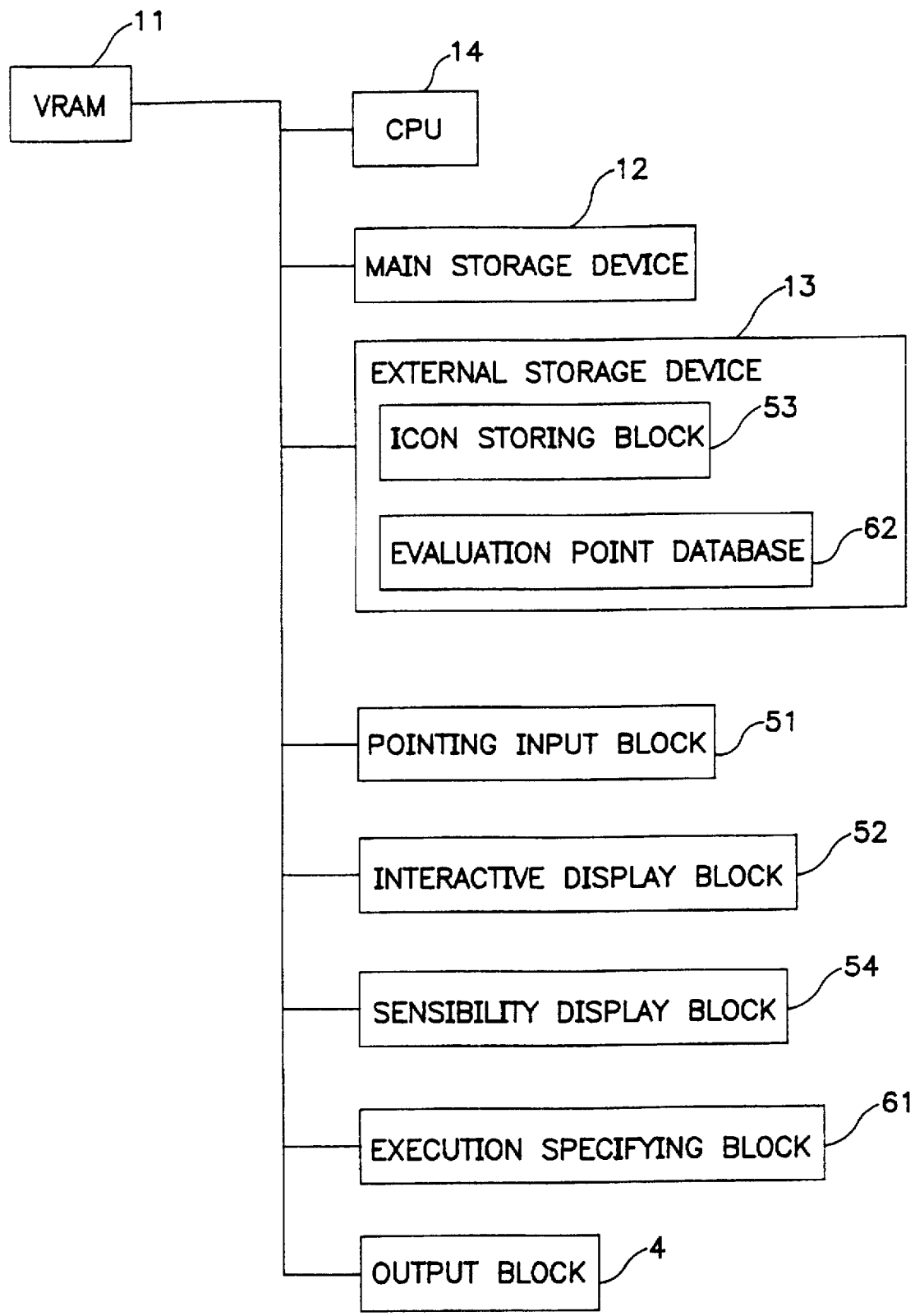
FIG. 36 is another block diagram illustrating the same embodiment.

FIG. 36 is another block diagram illustrating this embodiment, wherein the same blocks as those shown in FIGS. 2 and 35 are designated by the same reference numerals, and explanations of such blocks will not be repeated.

The operation of this embodiment having the above configuration will be described below with reference to the flowchart of FIG. 37.

Figure 30:
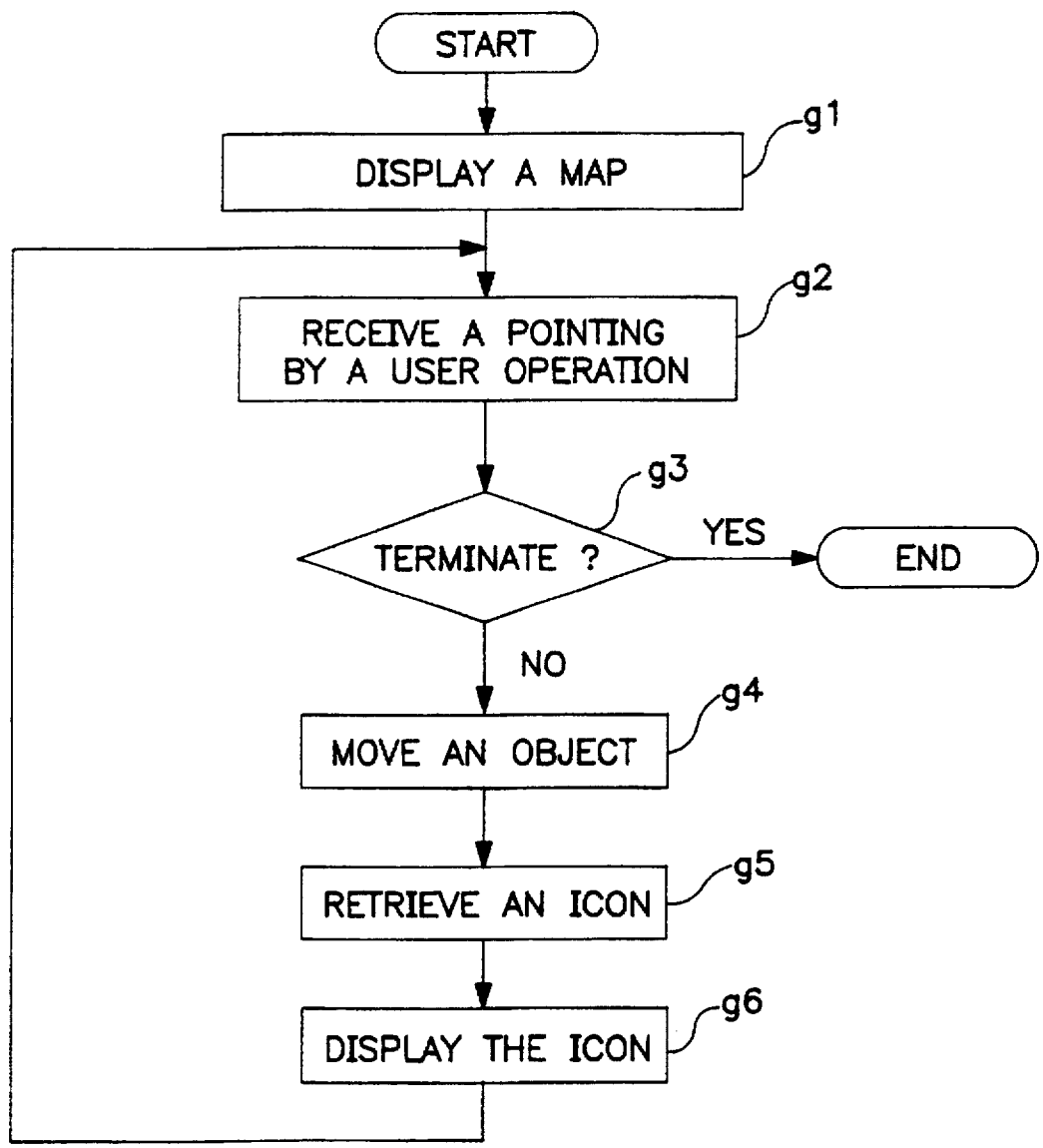
FIG. 30 is a flowchart illustrating the sequence of operations according to the same embodiment.

Steps h1 and h2 perform the same processing as in steps g1 and g2 illustrated in FIG. 30, except that in the present embodiment a SEARCH button is displayed instead of the "Quit" button when an output, such as the one shown in FIG. 32, is displayed on the interactive display block 52.

In step h3, if the input from the user accepted in step h2 is the selection of the SEARCH button, then the process proceeds to step h7; otherwise, the process proceeds to step h4.

Steps h4 to h6 perform the same processing as in steps g4 to g6 illustrated in FIG. 30.

In step h7, retrieval criteria is generated using the x, y coordinates calculated in step h2. Retrieval criteria generation is performed using a predefined criteria generation table. An example of the criteria generation table is shown in FIG. 38. The criteria generation table is retrieved by comparing the x coordinate with attributes XL and XH and the y coordinate with attributes YL and YH. More specifically, retrieval is made for data where the x-coordinate is larger than the attribute value of XL but not larger than the attribute value of XH and the y-coordinate is larger than the attribute value of YL but not larger than the attribute value of YH, and the values of the data attributes (ENCOURAGING, MOVING, ENCHANTING, DELIGHTING, GORGEOUS, EXCITING) are retrieved. Further, when the x and y coordinates are −1, retrieval is conducted using retrieval criteria stating that the x-coordinate is not smaller than the attribute value of XL and not larger than the attribute value of XH and that the y-coordinate is not smaller than the attribute value of YL and not larger than the attribute value of YH. The retrieval criteria is generated based on the thus retrieved values; that is, the attributes (ENCOURAGING, MOVING, ENCHANTING, DELIGHTING, GORGEOUS, EXCITING) in the database such as shown in FIG. 39 are each joined by "=" with the corresponding value in the retrieved values. For example, when the retrieved values are (ENCOURAGING, MOVING, ENCHANTING, DELIGHTING, GORGEOUS, EXCITING)=(0.3, 0.8, 0.0, 0.9, 0.4, 0.4), the retrieval criteria are generated as "ENCOURAGING=0.3 and MOVING=0.8 and ENCHANTING=0.0 and DELIGHTING=0.9 and GORGEOUS=0.4 and EXCITING=0.4.1."

The criteria generation table is defined so that, for the x, y coordinates when the object is moved close to SORROW in FIG. 32, for example, the value of ENCOURAGING becomes large. This means that when the user is in the mood of SORROW, videos that are encouraging for him are retrieved. Similarly, for the x, y coordinates when the user moves the object close to ANGER in the HAPPINESS/ANGER/SORROW/JOY chart shown in FIG. 32, the value of DELIGHTING becomes large. By defining the table in this way, when the user inputs his mood on the screen such as shown in FIG. 32, data can be retrieved in accordance with the input mood.

In this way, the criteria generation table can be designed in such a manner as to reflect the intention of the retrieval system designer as to what data is to be retrieved against the mood input from the user. For example, in the above-described example, the intention of the designer is such that when the object is moved close to SORROW in the input screen of FIG. 32, that is, when the user is in the mood of SORROW, video titles that are ENCOURAGING for him are retrieved. On the other hand, if the designer intends to make the user forget the sorrow by retrieving video titles that are EXCITING, rather than ENCOURAGING, when the user is in the mood of SORROW, the designer can design the criteria generation table to reflect such intention.

In step h8, the evaluation point database 62 is retrieved in accordance with the retrieval criteria generated in step h7.

When retrieving the evaluation point database where video titles are stored as shown in FIG. 39, for example, the video title name and leading actor fields are retrieved. In the present embodiment, for "=" in the retrieval criteria generated in step h7, the following convention is adopted: that is, when "ATTRIBUTE 1=0.5", for example, the criteria are said to be satisfied if the value of ATTRIBUTE 1 falls within a range between (0.5−α) and (0.5+α) inclusive. This is in consideration of the fact that finding an exact match in terms of numeric values for each evaluation point does not have much meaning in itself, when, for data in the sensibility database, evaluation points are given based on subjective evaluation criteria. Also considered is the fact that an exact match would result in reducing the number of data items to be retrieved. Therefore, a predetermined constant a is used to allow a margin for satisfying the criteria. A predetermined value, for example, 0.1, is given as the constant α. As an example, when the sensibility database of FIG. 39 is retrieved using the above retrieval criteria with α=0.1, title names {N3, N5}, etc. are retrieved.

In step h9, the data retrieved in step h8 is displayed on the output block 4. The display may be produced in the same manner as described in connection with the first embodiment of the data retrieval apparatus of the present invention.

According to this embodiment, by just inputting sensibility using a user interface easy to understand intuitively, the data that matches the input sensibility is retrieved.

Figure 40:
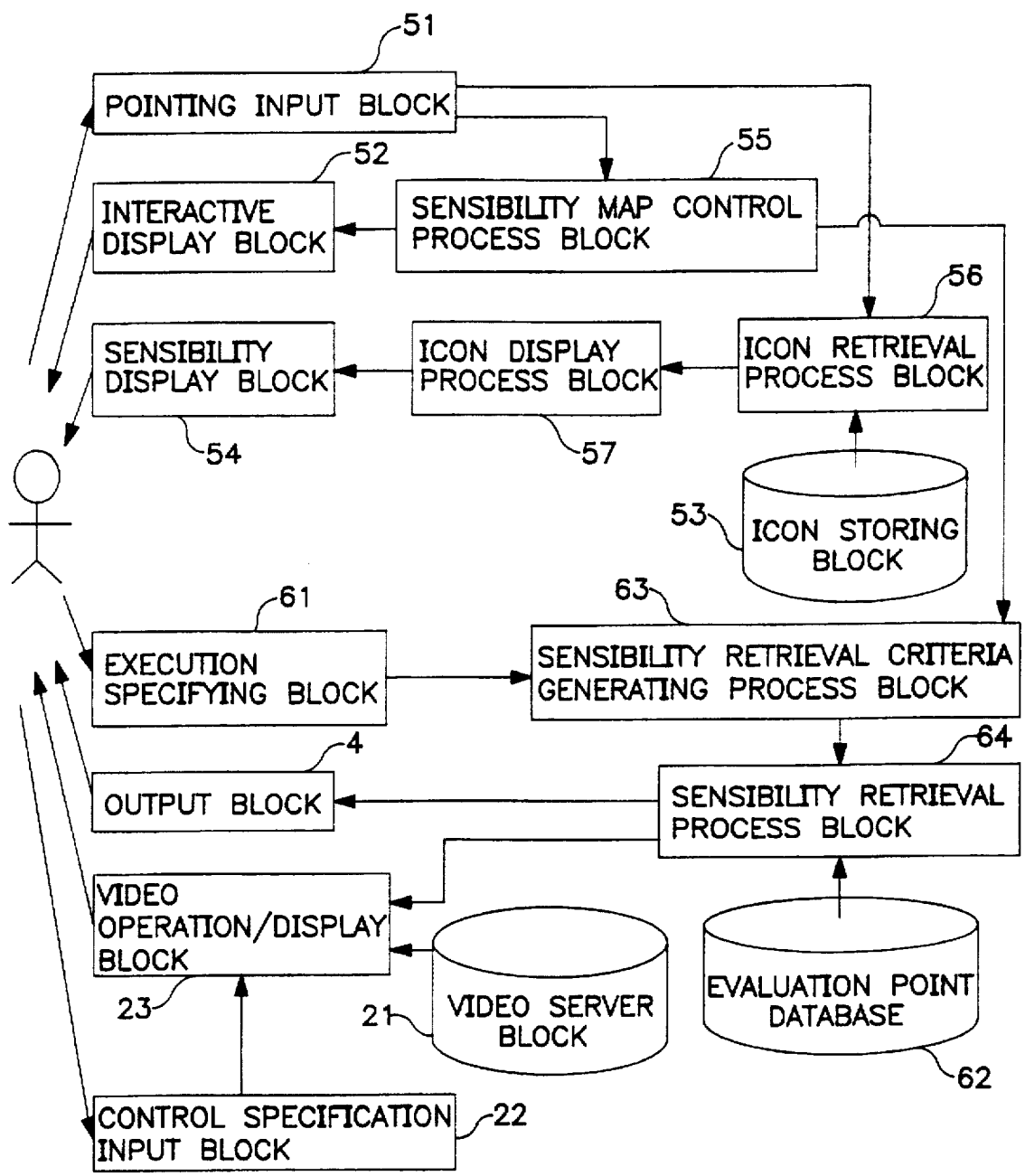
FIG. 40 is a block diagram showing an eighth embodiment of the data retrieval apparatus according to the present invention.

Referring to FIG. 40, there is shown therein a block diagram showing an eighth embodiment of the data retrieval apparatus according to the present invention. The same blocks as those shown in FIGS. 35 and 8 are designated by the same reference numerals, and explanations of such blocks will not be repeated here. While, in the second embodiment of the data retrieval apparatus of the invention, the video server block 21 stores video data whose video title data are stored in the sensibility database 2, in the eighth embodiment the video server block 21 stores video data whose video title data are stored in the evaluation point database 62.

Figure 41:
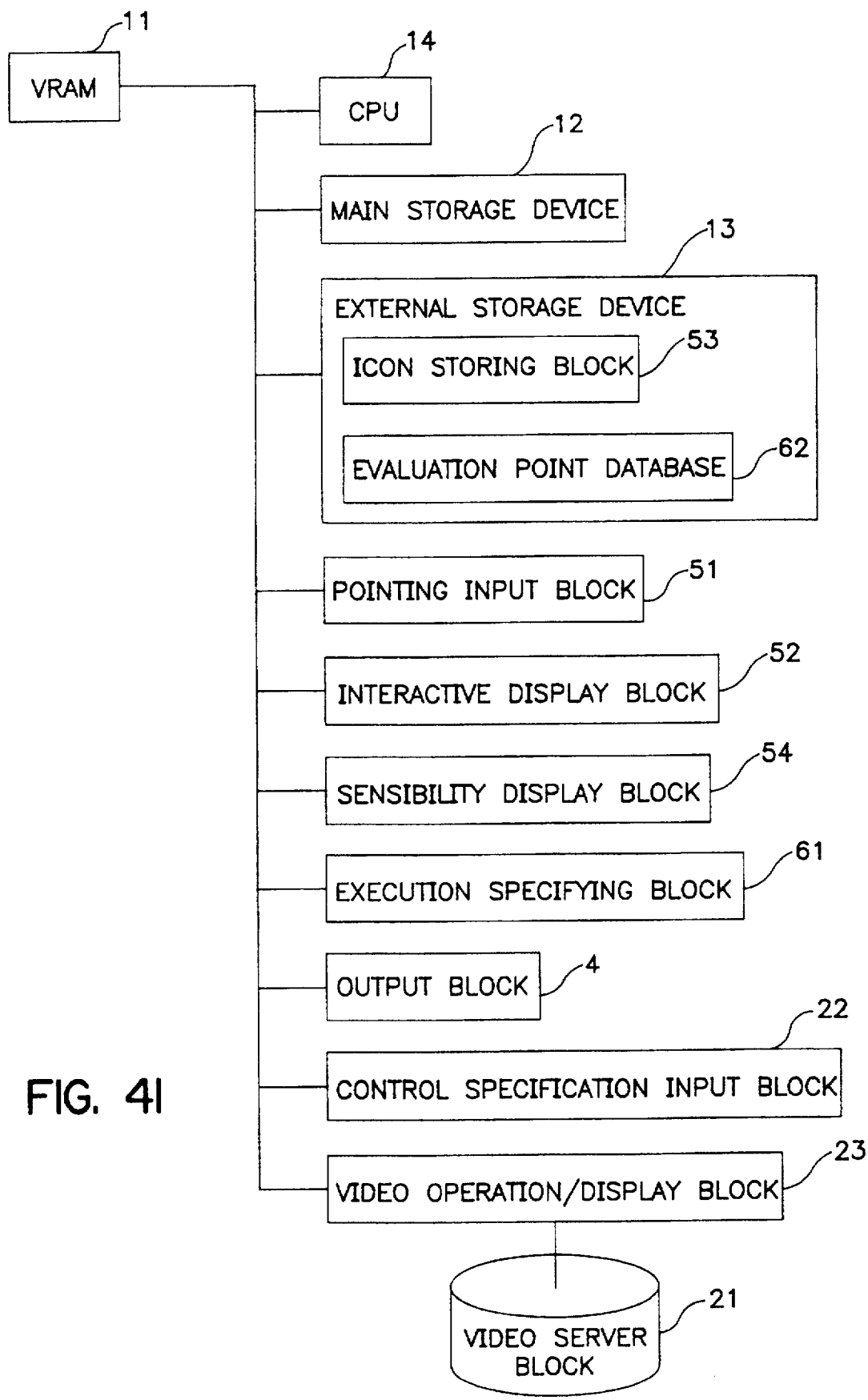
FIG. 41 is another block diagram illustrating the same embodiment.

FIG. 41 is an other block diagram illustrating this embodiment, wherein the same blocks as those shown in FIGS. 36 and 40 are designated by the same reference numerals, and explanations of such blocks will not be repeated. The video server block 21 is implemented as a separate block from the external storage device 13, but this may be contained in the external storage device 13.

Figure 42:
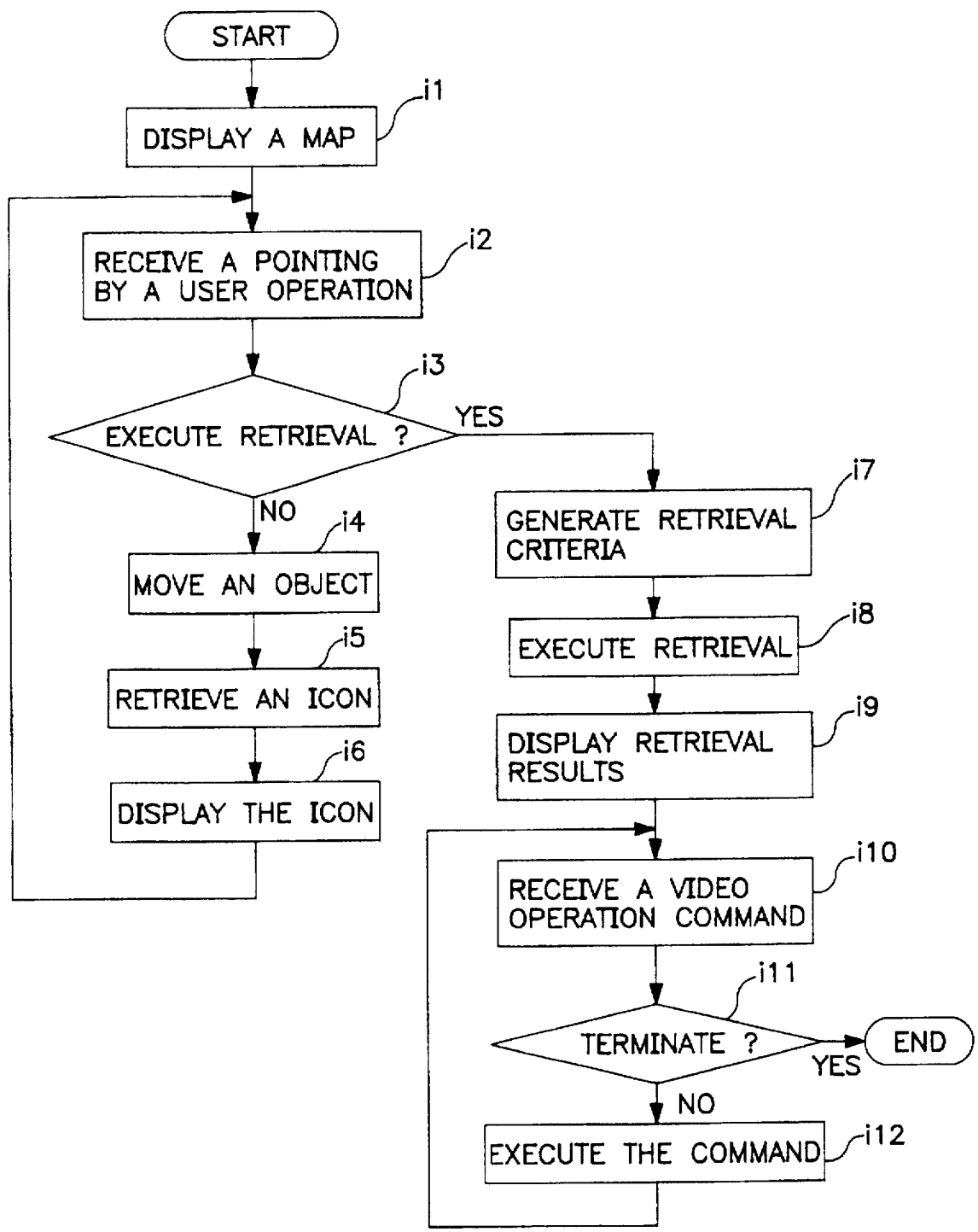
FIG. 42 is a flowchart illustrating the sequence of operations according to the same embodiment.

The operation of this embodiment having the above configuration will be described below with reference to the flowchart of FIG. 42.

Figure 37:
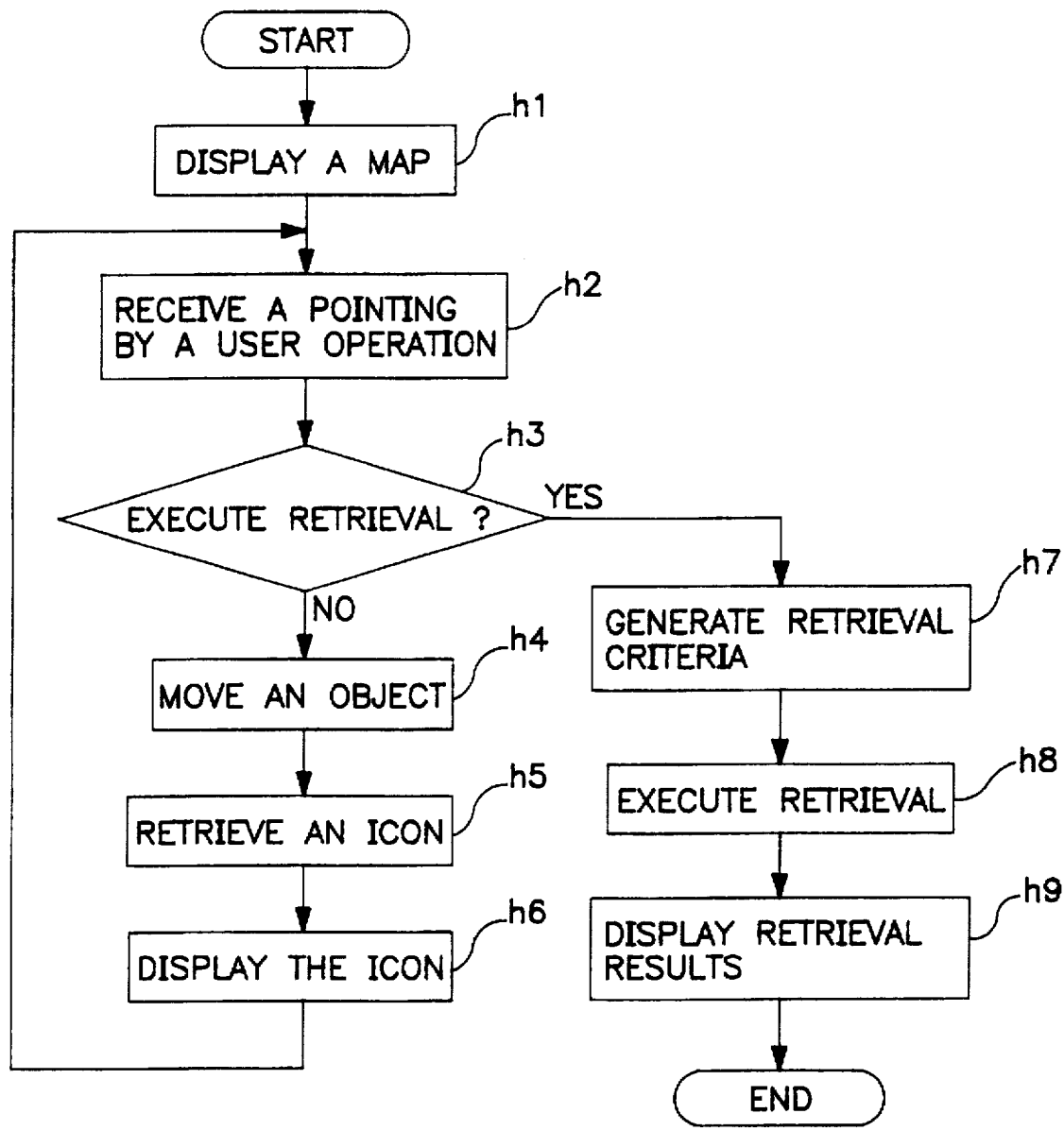
FIG. 37 is a flowchart illustrating the sequence of operations according to the same embodiment.

Steps i1 to i9 perform the same processing as in steps h1 to h9 illustrated in FIG. 37.

Steps i10 to i12 perform the same processing as in steps b8 to b10 illustrated in FIG. 10.

According to the present embodiment, flexible retrieval is implemented in the video title retrieval apparatus; that is, by just inputting sensibility using a user interface easy to understand intuitively, video titles that match the sensibility are automatically retrieved.

Figure 43:
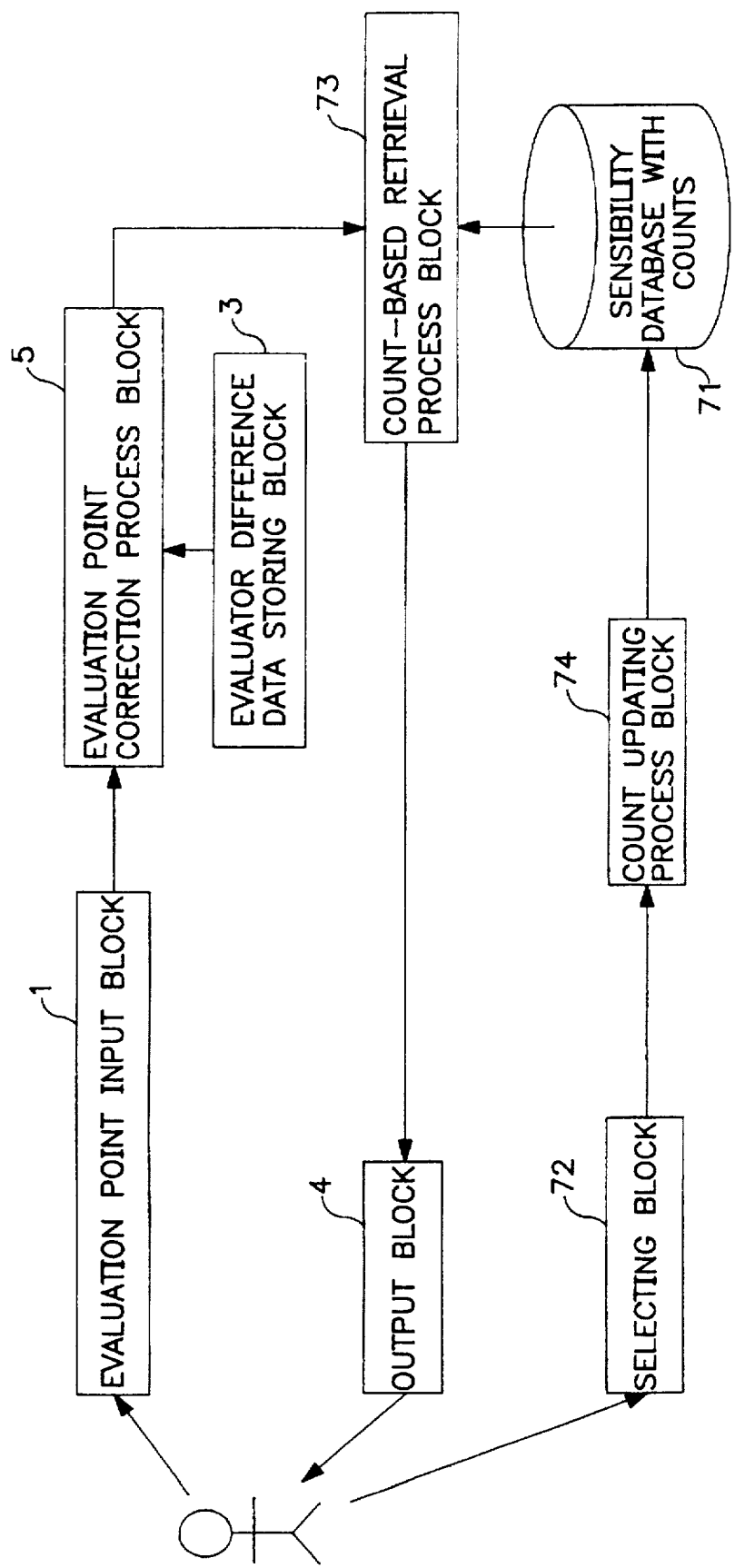
FIG. 43 is a block diagram showing a ninth embodiment of the data retrieval apparatus according to the present invention.

Referring to FIG. 43, there is shown therein a block diagram showing a ninth embodiment of the data retrieval apparatus according to the present invention. The same blocks as those shown in FIG. 1 are designated by the same reference numerals, and explanations of such blocks will not be repeated here. In FIG. 43, reference numeral 71 is a database with counts for storing sets of data, each set consisting of data, evaluator identifier, evaluation points, and the number of times the data has been retrieved; 72 is a selecting block for accepting a selection made from among the retrieval results displayed on the output block 4; 73 is a count-based retrieval process block for retrieving data based on the evaluation points corrected by the evaluation point correction process block 5 and on the per-data retrieval counts stored in the sensibility database with counts 71, and for outputting the results onto the output block 4; 74 is a count updating process block for updating data in the sensibility database with counts 71 on the basis of the selection accepted by the selecting block 72.

With reference to corresponding relationship between each block in this embodiment shown in FIG. 43, which constitute the difference from the configuration of FIG. 1, and each means in the data retrieval apparatus of the present invention, the sensibility database with counts 71 corresponds to storing means, the selecting block 72 corresponds to specifying means, and the count-based retrieval process block 73 corresponds to selecting means.

Figure 44:
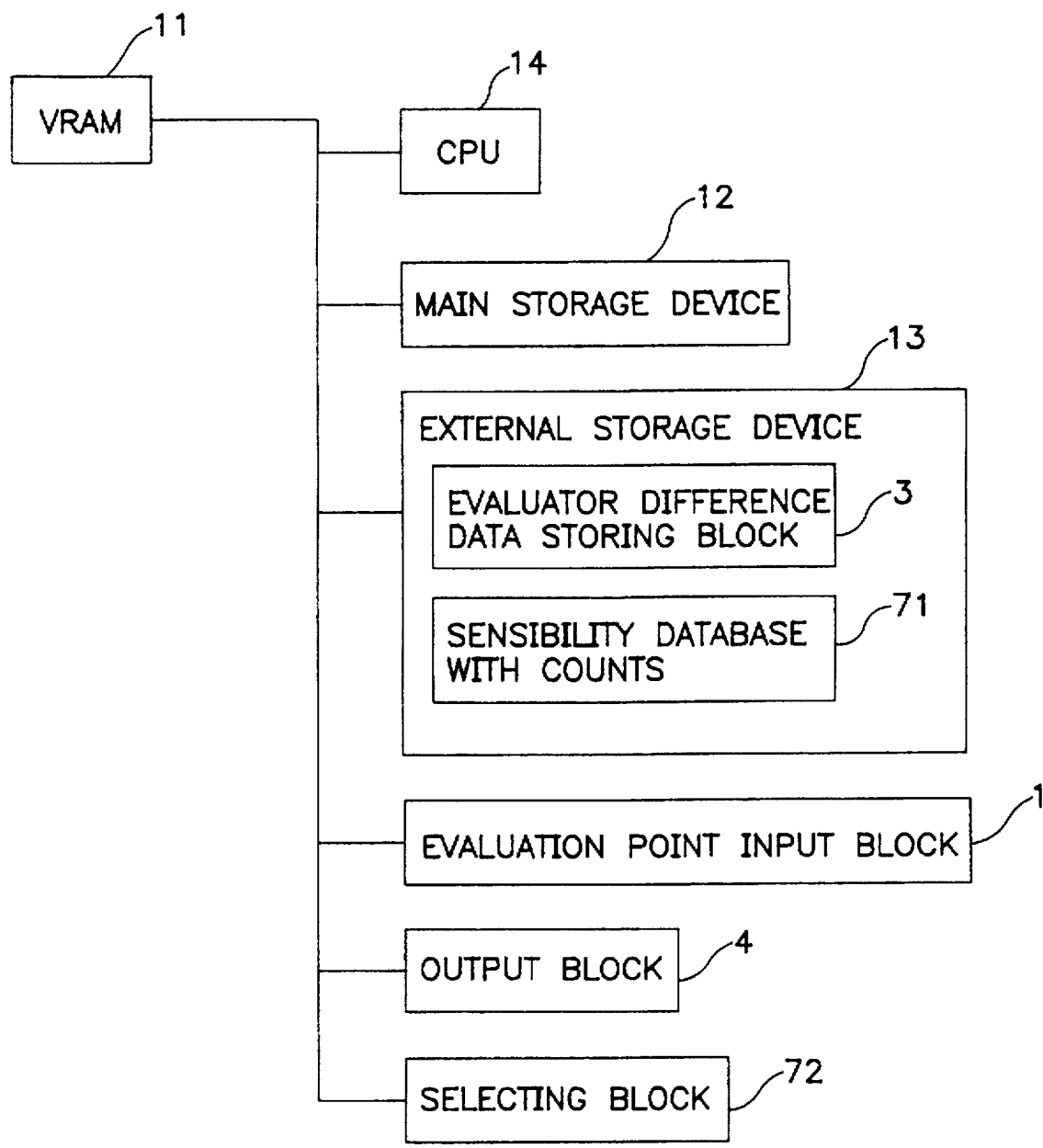
FIG. 44 is another block diagram illustrating the same embodiment.

FIG. 44 is another block diagram illustrating this embodiment, wherein the same blocks as those shown in FIGS. 2 and 43 are designated by the same reference numerals, and explanations of such blocks will not be repeated.

The operation of this embodiment having the above configuration will be described below with reference to the flowchart of FIG. 45.

Steps j1 to j4 perform the same processing as in steps a1 to a4 illustrated in FIG. 3.

In step j5, a count-based overall evaluation is calculated for each data set in the database by using prescribed constants S and T and the corrected result, such as (evaluator identifier, ENCOURAGING, MOVING, ENCHANTING, DELIGHTING, GORGEOUS, EXCITING)=(e1, 0.3, 0.8, 0.0, 0.9, 0.4, 0.4), obtained in step j3, and a prescribed number of data sets in the database are retrieved in sequence in decreasing order of the count-based overall evaluation. The count-based overall evaluation is calculated as follows. First, a data set, hereinafter called data A, is retrieved from the database, and from data A, its evaluator identifier is extracted; next, a corrected result having the same evaluator identifier as the thus extracted evaluator identifier is selected from among the results calculated in step j3. Each attribute value in the selected corrected result, excluding the evaluator identifier, is subtracted from the corresponding attribute value in data A, and the absolute value of the difference is obtained. Then, the absolute values thus obtained are summed, and the sum is multiplied by S to obtain the degree of attribute value match. Further, the value of the RETRIEVAL COUNT attribute in data A is divided by the average of the RETRIEVAL COUNT attribute values of all the data sets stored in the database, and the result is multiplied by T to obtain retrieval frequency. The degree of attribute match and the retrieval frequency are added together to obtain the count-based overall evaluation. Here, the attribute RETRIEVAL COUNT represents the number of times the data has been selected in the past.

Consider, for example, the database with counts shown in FIG. 46, and consider the case where we calculate the count-based overall evaluation for the first data set (N1, A1, e1, 0.2, 0.2, 0.3, 0.8, 0.6, 0.2, 105) in FIG. 46. In this case, assume that the corrected result obtained in step j3 for evaluator e1 shows the corrected evaluation points (ENCOURAGING, MOVING, ENCHANTING, DELIGHTING, GORGEOUS, EXCITING)=(0.3, 0.8, 0.0, 0.9, 0.4, 0.4). Then, the degree of attribute value match is calculated as S×{abs(0.3−0.2)+abs(0.8−0.2)+abs(0.0−0.3)+abs(0.9−0.8)+abs(0.4−0.6)+abs(0.4−0.2)}=S×1.5. Also assume that the average RETRIEVAL COUNT attribute value of the sensibility database with counts is 180. Then, the retrieval frequency is calculated as T×105/180. The two values are added together to obtain the count-based overall evaluation.

If the constant S is made large, emphasis is placed on the input evaluation points, and if the constant T is made large, emphasis is placed on the data retrieval count, that is, the number of times the data has been selected in the past. By placing emphasis on the retrieval count, for example, video titles can be retrieved in order of popularity.

In step j6, after retrieving all data a prescribed number of data sets are retrieved in sequence in decreasing order of the count-based overall evaluation obtained in step j5, and displayed on the output block 4. An output example is shown in FIG. 47.

In step j7, the user selects data that matches his request from among the retrieval results shown in step j6. As shown in the output example of FIG. 47, a "Retrieve again" button is displayed on the screen. If data that matches his request is not found in the displayed data, the user can select this button to bring other data onto the screen.

In step j8, it is determined whether the selection by the user accepted in step j7 is the selection of data or the selection of the "Retrieve again" button. If it is the selection of data, the process proceeds to step j10; otherwise, the process proceeds to step j9.

In step j9, a prescribed number of data sets, excluding those output in step j6, are retrieved in sequence in decreasing order of the count-based overall evaluation calculated in step j5, and are displayed on the output block 4.

In step j10, the RETRIEVAL COUNT attribute value is incremented by 1 for the data selected by the user from among the data stored in the sensibility database with counts 71.

According to the present embodiment, since data retrieval is performed based not only on the request entered by the user but also on the number of times the data has been retrieved in the past, data can be retrieved in order of popularity.

Figure 48:
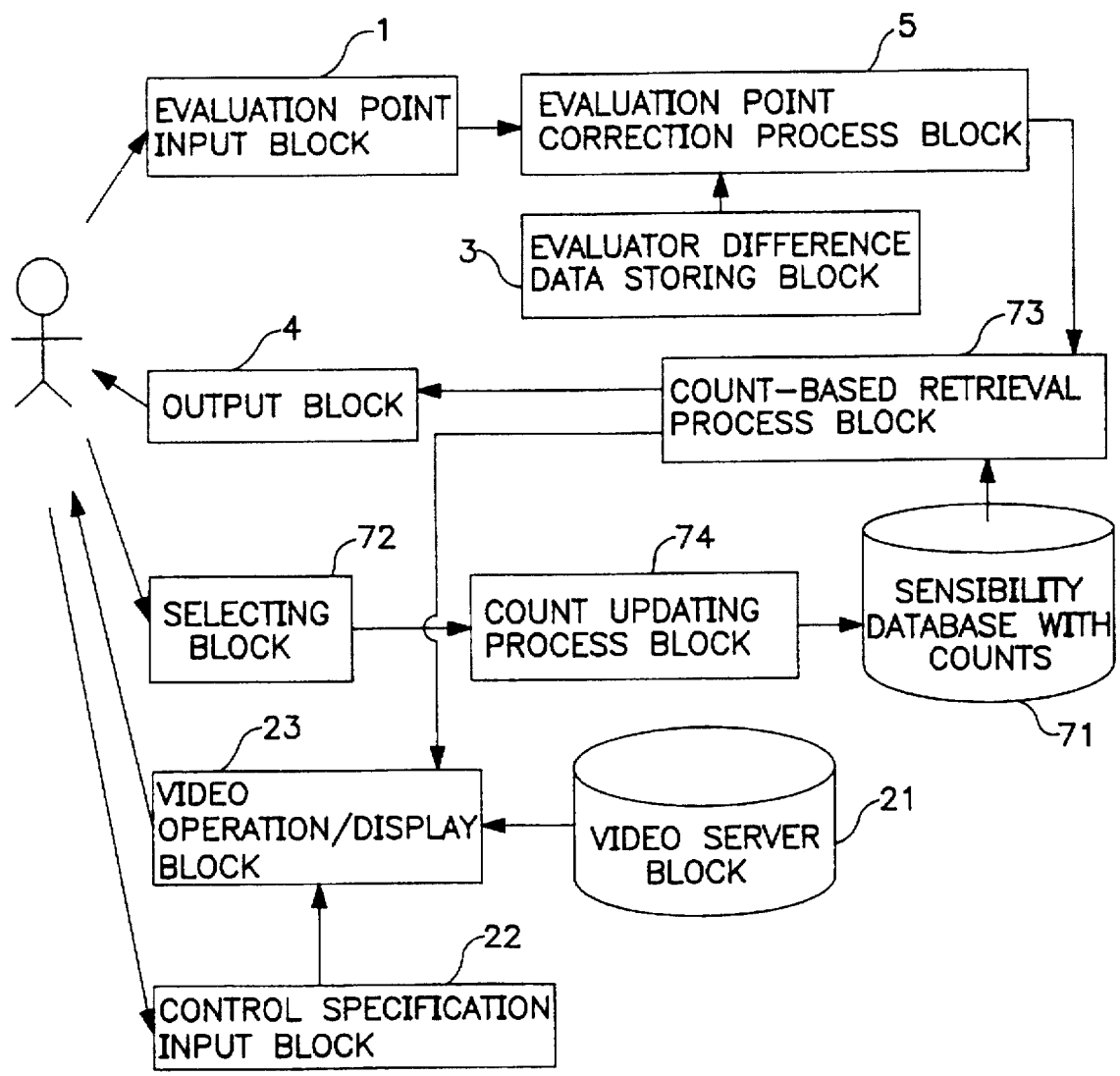
FIG. 48 is a block diagram showing a 10th embodiment of the data retrieval apparatus according to the present invention.

Referring to FIG. 48, there is shown therein a block diagram showing a 10th embodiment of the data retrieval apparatus according to the present invention. The same blocks as those shown in FIGS. 43 and 8 are designated by the same reference numerals, and explanations of such blocks will not be repeated here. While, in the second embodiment of the data retrieval apparatus of the invention, the video server block 21 stores video data whose video title data are stored in the sensibility database 2, in the 10th embodiment the video server block 21 stores video data whose video title data are stored in the sensibility database with counts 71.

Figure 49:
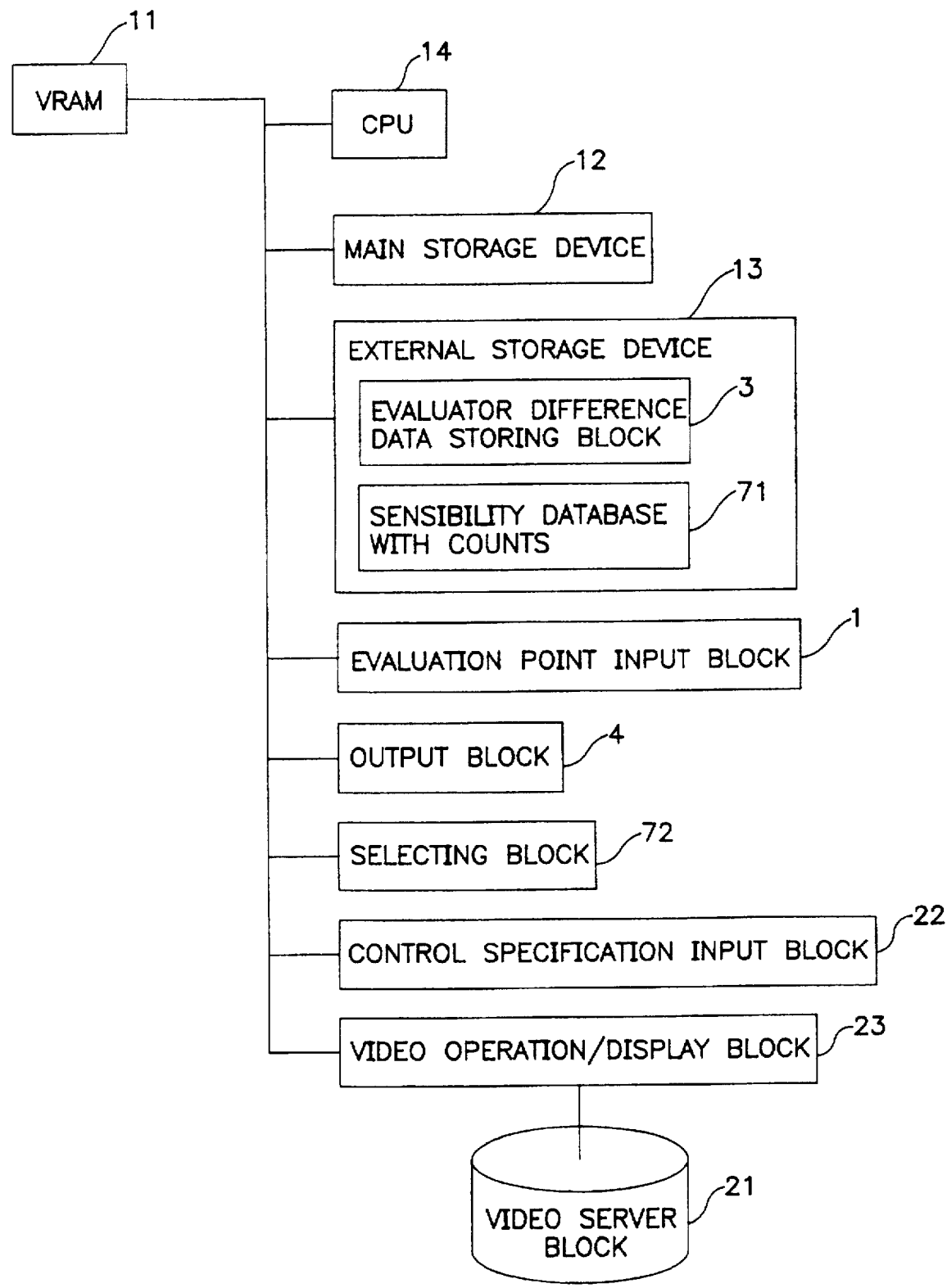
FIG. 49 is another block diagram illustrating the same embodiment.

FIG. 49 is another block diagram illustrating this embodiment, wherein the same blocks as those shown in FIGS. 44 and 48 are designated by the same reference numerals, and explanations of such blocks will not be repeated. The video server block 21 is implemented as a separate block from the external storage device 13, but this may be contained in the external storage device 13.

Figure 50:
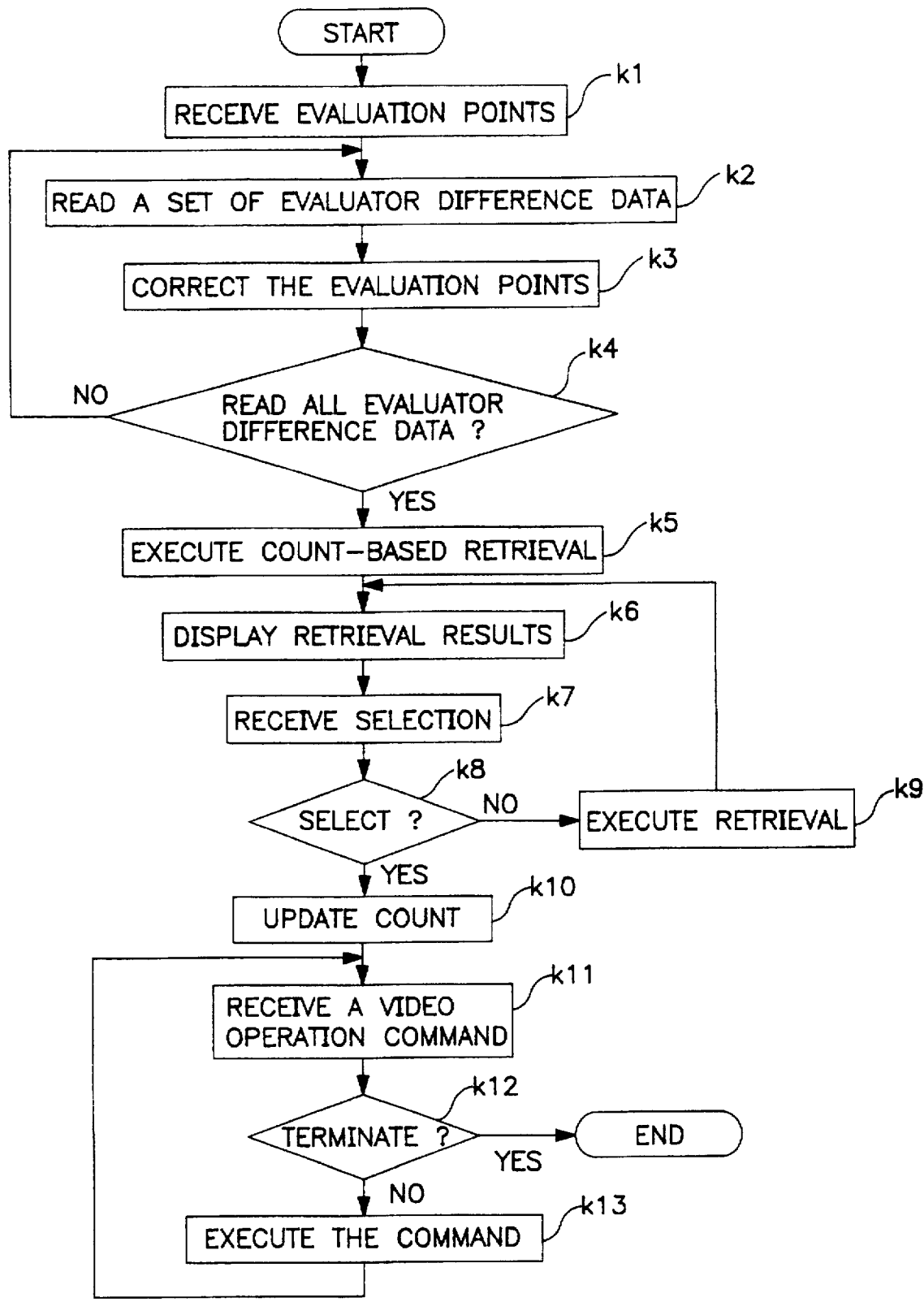
FIG. 50 is a flowchart illustrating the sequence of operations according to the same embodiment.
Figure 51:
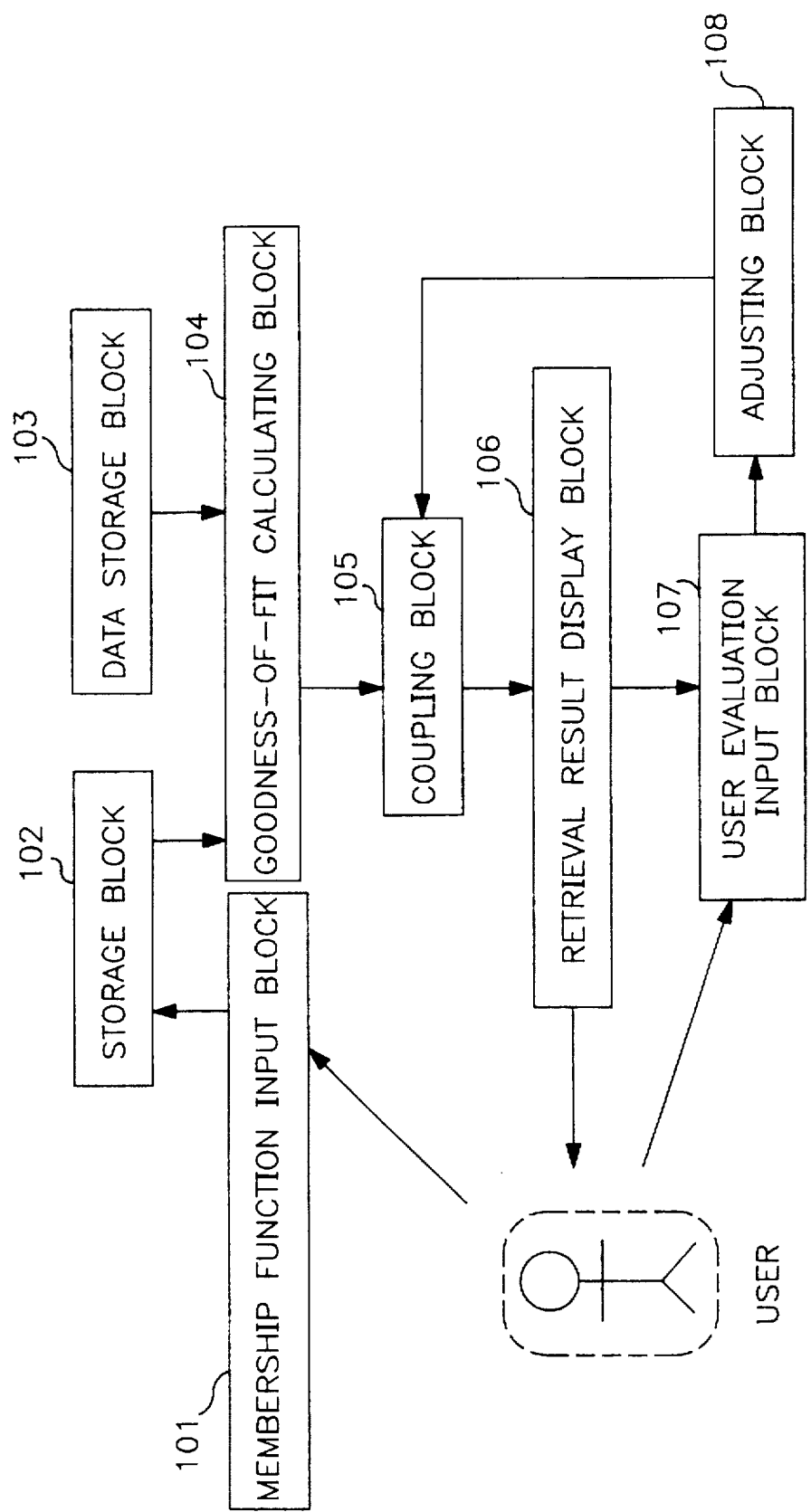
FIG. 51 is a block diagram showing a configuration for implementing a prior art data retrieval technique.

The operation of this embodiment having the above configuration will be described below with reference to the flowchart of FIG. 50.

Figure 45:
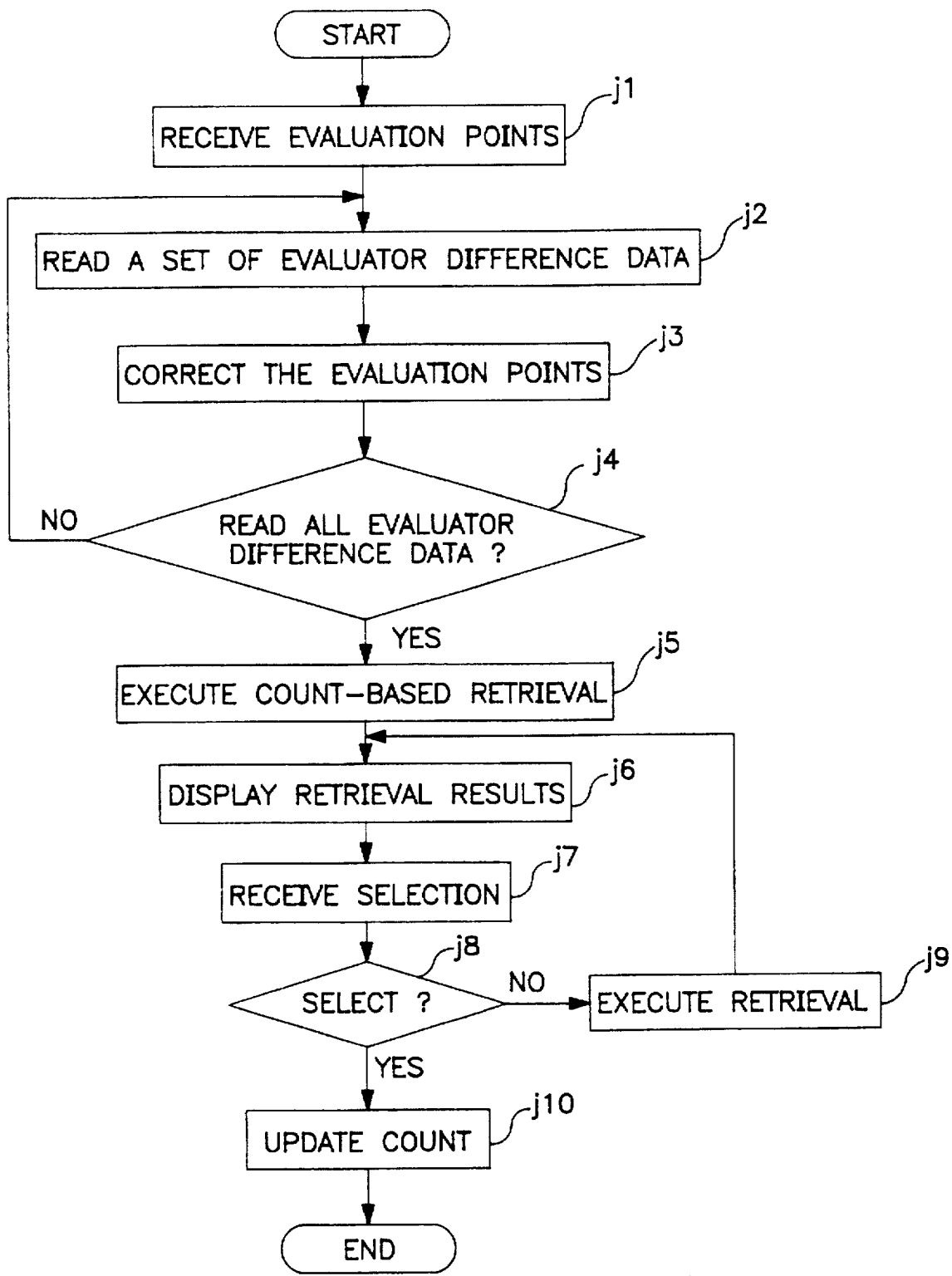
FIG. 45 is a flowchart illustrating the sequence of operations according to the same embodiment.

Steps k1 to k10 perform the same processing as in steps j1 to j10 illustrated in FIG. 45.

Steps k11 to k13 perform the same processing as in steps b8 to b10 illustrated in FIG. 10.

According to this embodiment, in the video title retrieval apparatus, video titles are retrieved in order of popularity. As a result, much-talked-about, popular videos can be selected preferentially.

Of the embodiments of the data retrieval apparatus thus far described, the ninth embodiment can be combined with either the third embodiment or the fifth embodiment. When combined with the third embodiment, data retrieval considering data retrieval counts can be achieved in a multi-user environment. When combined with the fifth embodiment, data retrieval considering data retrieval counts can be achieved in an environment where an unspecified number of users are expected to use the apparatus.

Further, the video data stored in the video server in the second, fourth, sixth, eighth, and 10th embodiments of the data retrieval apparatus, may be either full video data containing full contents of each video title or short video data for advertisement or preview use.

In any of the embodiments so far described, each component block may be implemented in software or may be constructed as dedicated hardware.

What is claimed is:

1. A data retrieval apparatus comprising:

storing means for storing a plurality of names each of which is given for each of a plurality of evaluation targets, and a plurality of evaluations each of which is given in advance by a designated evaluator on a prescribed evaluation item for each of said plurality of evaluation targets;

selection key receiving means for receiving an evaluation given by a user on the evaluation item for a particular evaluation target;

selection key correction means for correcting the evaluation received by said selection key receiving means by using an evaluation gap obtained on the basis of the evaluations given by the evaluator and the user on the evaluation item for the particular evaluation target; and selecting means for selecting information concerning the evaluation target on the basis of the evaluation corrected by said selection key correction means.

2. A data retrieval apparatus according to claim 1, wherein said storing means stores the plurality of the evaluations given by any evaluator of a plurality of the evaluators on a plurality of the evaluation items and an identifier assigned to the evaluator responsible for the plurality of the evaluations, together with each of said plurality of names, said selection key receiving means for receiving a plurality of the evaluations given by the user on the plurality of the evaluation items for the particular evaluation target, said selection key correction means corrects each of the plurality of the evaluations received by said selection key receiving means by using a plurality of the evaluation gaps, each of said plurality of the evaluation gaps represents a difference between the evaluation given by each of the plurality of the evaluators and the evaluation given by the user on each of the plurality of the evaluation items for the particular evaluation target, and said selecting means selects the information concerning the evaluation target on the basis of the plurality of the evaluations each of which is corrected by said selection key correction means.

3. A data retrieval apparatus according to claim 2, further comprising:

a server for storing data of each of said plurality of evaluation targets, selection result display means for, when the information concerning at least one said evaluation target is selected by said selecting means, displaying the information, specifying means for receiving the information selected by the user out of the information displayed on said selection result display means, and evaluation target display means for displaying the evaluation target specified by the information received by said specifying means, and wherein:

each of said plurality of evaluation targets is a work recorded on a video, the information concerning the evaluation target is a title of the video, and each of the plurality of the evaluations is one of a plurality of values classified in advance.

4. A data retrieval apparatus according to claim 3, wherein said selecting means includes:

retrieval criteria generating means for generating retrieval criteria on the basis of the plurality of the evaluations each of which is corrected by said selection key correction means, and retrieving means for selecting the information concerning the evaluation target whose evaluation matches the retrieval criteria.

5. A data retrieval apparatus according to claim 4, further comprising evaluation gap storing means for storing the plurality of the evaluation gaps.

6. A data retrieval apparatus according to claim 5, further comprising:

user identification means for receiving an identifier assigned to the user, and wherein:

said evaluation gap storing means stores the identifier assigned to each of a plurality of the users, and said selection key correction means corrects each of the plurality of the evaluations received by said selection key receiving means, on the basis of the plurality of the evaluation gaps specified by the identifier received by said user identification means.

7. A data retrieval apparatus according to claim 4, further comprising:

name display means for displaying at least one name preselected from among said plurality of names, evaluation receiving means for receiving a plurality of the evaluations given by the user on the plurality of the evaluation items for the evaluation target specified by said at least one name displayed on said name display means, and evaluation gap generating means for generating the plurality of the evaluation gaps on the basis of the plurality of the evaluations received by said evaluation receiving means and each prescribed evaluation, and wherein:

said each prescribed evaluation is the evaluation given in advance by each of the plurality of the evaluators on the plurality of the evaluation items for the evaluation target specified by said at least one name displayed on said name display means.

8. A data retrieval apparatus according to claim 4, wherein said selection key receiving means includes:

evaluation region display means for displaying a region showing each evaluation on each of the plurality of the evaluation items and at least one object capable of moving the region, pointing input means for receiving a position, selected by the user, of said at least one object in the region, and evaluation receiving means for receiving the evaluation on each of the plurality of the evaluation items on the basis of the position of said at least one object received by said pointing input means.

9. A data retrieval apparatus according to claim 8, further comprising:

icon storing means for storing a plurality of icons each of which is predetermined based on the evaluation corresponding to the position of said at least one object in the region, icon selecting means for selecting the icon corresponding to the position of said at least one object received by said pointing input means from said icon storing means, and icon display means for displaying the icon selected by said icon selecting means.

10. A data retrieval apparatus according to claim 3, wherein said storing means further stores a reception count together with each of said plurality of names, said reception count being the number of receptions made by said specifying means, said selecting means selects the information concerning the evaluation target, based on the reception counts and the plurality of the evaluations each of which is corrected by said selection key correction means, and when the information is received by said specifying means, the reception count specified by the information received by the specifying means is updated.

11. A data retrieval apparatus according to claim 2, wherein said selecting means includes:

retrieval criteria generating means for generating retrieval criteria on the basis of the plurality of the evaluations each of which is corrected by said selection key correction means, and retrieving means for selecting the information concerning the evaluation target whose evaluation matches the retrieval criteria.

12. A data retrieval apparatus according to claim 11, further comprising evaluation gap storing means for storing the plurality of the evaluation gaps.

13. A data retrieval apparatus according to claim 12, further comprising:

user identification means for receiving an identifier assigned to the user, and wherein:

said evaluation gap storing means stores the identifier assigned to each of a plurality of the users, and said selection key correction means corrects each of the plurality of the evaluations received by said selection key receiving means, on the basis of the plurality of the evaluation gaps specified by the identifier received by said user identification means.

14. A data retrieval apparatus according to claim 11, further comprising:

name display means for displaying at least one name preselected from among said plurality of names, evaluation receiving means for receiving a plurality of the evaluations given by the user on the plurality of the evaluation items for the evaluation target specified by said at least one name displayed on said name display means, and evaluation gap generating means for generating the plurality of the evaluation gaps on the basis of the plurality of the evaluations received by said evaluation receiving means and each prescribed evaluation, and wherein:

said each prescribed evaluation is the evaluation given in advance by each of the plurality of the evaluators on the plurality of the evaluation items for the evaluation target specified by said at least one name displayed on said name display means.

15. A data retrieval apparatus according to claim 11, wherein said selection key receiving means includes:

evaluation region display means for displaying a region showing each evaluation on each of the plurality of the evaluation items and at least one object capable of moving the region, pointing input means for receiving a position, selected by the user, of said at least one object in the region, and evaluation receiving means for receiving the evaluation on each of the plurality of the evaluation items on the basis of the position of said at least one object received by said pointing input means.

16. A data retrieval apparatus according to claim 15, further comprising:

icon storing means for storing a plurality of icons each of which is predetermined based on the evaluation corresponding to the position of said at least one object in the region, icon selecting means for selecting the icon corresponding to the position of said at least one object received by said pointing input means from said icon storing means, and icon display means for displaying the icon selected by said icon selecting means.

17. A data retrieval apparatus according to claim 2, further comprising:

selection result display means for, when the information concerning at least one said evaluation target is selected by said selecting means, displaying the information, and specifying means for receiving the information selected by the user from the information displayed on said selection result display means, and wherein:

said storing means further stores a reception count together with each of said plurality of names, said reception count being the number of receptions made by said specifying means, said selecting means selects the information concerning the evaluation target, based on the reception counts and the plurality of the evaluations each of which is corrected by said selection key correction means, and when the information is received by said specifying means, the reception count specified by the information received by the specifying means is updated.

18. A data retrieval apparatus comprising:

storing means for storing a plurality of evaluations given by any evaluator of a plurality of evaluators on a plurality of evaluation items and an identifier assigned to the evaluator responsible for the plurality of the evaluations, together with each of a plurality of names each of which is given for each of a plurality of evaluation targets;

selection key receiving means for receiving a plurality of evaluations given by a user on said plurality of evaluation items;

selecting means for selecting the information concerning the evaluation target;

selection result display means for, when the information concerning at least one said evaluation target is selected by said selecting means, displaying the information; and specifying means for receiving the information selected by the user from the information displayed on said selection result display means, and wherein:

said storing means further stores a reception count together with each of said plurality of names, said reception count being the number of receptions made by said specifying means, said selecting means selects the information concerning the evaluation target, based on reception counts and said plurality of evaluations received by said selection key receiving means, and when the information is received by said specifying means, the reception count specified by the information received by the specifying means is updated.

19. A data retrieval apparatus according to claim 18, further comprising:

a server for storing data of each of said plurality of evaluation targets, and evaluation target display means for displaying the evaluation target specified by the information received by said specifying means, and wherein:

each of said plurality of evaluation targets is a work recorded on a video, the information concerning the evaluation target is a title of the video, and each of said plurality of evaluations is one of a plurality of values classified in advance.

20. An evaluation entry apparatus comprising:

evaluation region display means for displaying a region showing each evaluation on at least one evaluation item for an evaluation target, and for displaying an object capable of moving the region, pointing input means for receiving a position, selected by a user, of said object in the region, and evaluation receiving means for receiving the evaluation on said at least one evaluation item on the basis of the position of the object received by said pointing input means.

21. An evaluation entry apparatus according to claim 20, further comprising:

icon storing means for storing a plurality of icons each of which is predetermined based on the evaluation corresponding to the position of the object in the region, icon selecting means for selecting the icon corresponding to the position of the object received by said pointing input means from said icon storing means, and icon display means for displaying the icon selected by said icon selecting means, and wherein:

said evaluation is one of a plurality of ranks classified in advance, and the position of the object in the region corresponds to one of said plurality of ranks.

22. An evaluation entry apparatus according to claim 20, further comprising evaluation converting means for converting a value of the evaluation received by said evaluation receiving means on the basis of a value representing a prescribed evaluation.

23. A sensibility entry apparatus comprising:

sensibility input region display means for displaying sensibility input region in which a region for expressing a prescribed sensibility is expressed in a coordinate system, and an object that can be moved around in the sensibility input region; and pointing input means for receiving a position of the object moved by a user operation in the sensibility input region displayed by said sensibility input region display means, on the basis of said user operation.

* * * * *